US012763953B2

(12) United States Patent
Jakobsson et al.

(10) Patent No.: US 12,763,953 B2
(45) Date of Patent: Oct. 13, 2026

(54) SYSTEMS AND METHODS FOR NODE FACILITATION, COMMUNICATION, AND MAINTENANCE

(71) Applicant: Artema Labs, Inc, Los Angeles, CA (US)

(72) Inventors: Bjorn Markus Jakobsson, New York, NY (US); Keir Finlow-Bates, Eura (FI)

(73) Assignee: Artema Labs, Inc, Los Angeles, CA (US)

( * ) Notice: Subject to any disclaimer, the term of this patent is extended or adjusted under 35 U.S.C. 154(b) by 85 days.

(21) Appl. No.: 18/343,630

(22) Filed: Jun. 28, 2023

(65) Prior Publication Data

US 2023/0421377 A1 Dec. 28, 2023

Related U.S. Application Data

(60) Provisional application No. 63/380,044, filed on Oct. 18, 2022, provisional application No. 63/379,224, filed on Oct. 12, 2022, provisional application No. 63/370,898, filed on Aug. 9, 2022, provisional application No. 63/370,362, filed on Aug. 3, 2022, provisional application No. 63/368,869, filed on Jul. 19, 2022, provisional application No. 63/367,206, filed on Jun. 28, 2022.

(51) Int. Cl.

| | |
|---|---|
| ***H04L 29/06*** | (2006.01) |
| ***H04L 9/00*** | (2022.01) |
| ***H04L 9/32*** | (2006.01) |

(52) U.S. Cl.

CPC .............. *H04L 9/3213* (2013.01); *H04L 9/50* (2022.05); *H04L 2209/603* (2013.01)

(58) Field of Classification Search

CPC .... H04L 9/3213; H04L 9/50; H04L 2209/603

See application file for complete search history.

(56) References Cited

U.S. PATENT DOCUMENTS

| | | | | |
|---|---|---|---|---|
| 11,880,836 | B1 | 1/2024 | Nemethi | |
| 2017/0171754 | A1* | 6/2017 | South | H04W 12/06 |
| 2020/0186523 | A1* | 6/2020 | Kursun | H04L 63/0876 |
| 2021/0112101 | A1* | 4/2021 | Crabtree | G06F 16/2477 |
| 2023/0281604 | A1 | 9/2023 | Robell et al. | |
| 2023/0334446 | A1 | 10/2023 | Fernandes et al. | |

* cited by examiner

*Primary Examiner* — Evans Desrosiers

(74) *Attorney, Agent, or Firm* — KPPB LLP

(57) ABSTRACT

One embodiment includes a method that recovers information on one or more characteristics of a node, wherein the information corresponds to at least one selected from the group consisting of: hardware, software, event history, and functionalities. The method derives one or more characterizations of the node based on the information. The characterizations reflect a current state of a characteristic of the one or more characteristics. Characterizations are expressed as statements on a blockchain. The method recovers, from an assertion unit, an assertion verifying validity of the characterizations. The method derives a reputation score for the assertion unit, wherein the reputation score discloses estimates of verification accuracy for the assertion unit. The method determines a risk score for the node based on the reputation score, the characterizations, and the assertion, wherein the risk score corresponds to a degree of risk associated with transacting with the node.

20 Claims, 44 Drawing Sheets

FIG. 14B
FIG. 14A
motorsport
My NFTs
My Listings
My Bids
Transaction Histo
Share
List For Sale
NFT Title
motorsport
My NFTs
My Listings
My Bids
Transaction Histo
NFT Title
NFT Title
NFT Title
NFT Title

SYSTEMS AND METHODS FOR NODE FACILITATION, COMMUNICATION, AND MAINTENANCE

CROSS-REFERENCE TO RELATED APPLICATIONS

The current application claims the benefit of and priority under 35 U.S.C. § 119(e) to U.S. Provisional Patent Application No. 63/367,206 entitled "Node Characterization and Scoring Method," filed Jun. 28, 2022; U.S. Provisional Patent Application No. 63/368,869 entitled "Blockchain-Based Control and Data Channel Method," filed Jul. 19, 2022; U.S. Provisional Patent Application No. 63/370,362 entitled "System and Method for a Blockchain-based Verifiable Click-Through Agreement," filed Aug. 3, 2022; U.S. Provisional Patent Application No. 63/370,898 entitled "Token Insurance Technique," filed Aug. 9, 2022; U.S. Provisional Patent Application No. 63/379,224 entitled "Registry for Persistence of NFT Metadata and Associated Data," filed Oct. 12, 2022; and U.S. Provisional Patent Application No. 63/380,044 entitled "Content Based Resource Location Filename System and Method," filed Oct. 18, 2022, the disclosures of which are hereby incorporated by reference in their entireties for all purposes.

FIELD OF THE INVENTION

The present invention generally relates to techniques for the facilitation of communication, particularly in the context of Web 3.0 nodes and devices.

BACKGROUND

Web 3.0 (or Web3) refers to a large-scale restructuring of the World Wide Web. Web 3.0 comprises open-source applications maintained by blockchain and operating in a way that is decentralized, yet interconnected. The term contrasts Web 1.0 (the earliest version of the internet where individuals could create web pages digested by wide varieties of consumers) and Web 2.0 (which expanded capabilities towards user-generated content and user-participation).

On a smaller scale, network systems include two or more connected computer systems are able to share data. To facilitate this communication, network nodes are used to create, send, receive, and store data within a network. Nodes may be clients, server, peers, etc. Due to the decentralized nature of Web 3.0, rather than singular servers, data is stored on the network of nodes. The network of nodes, among other functions, is used to maintain the distributed ledgers used to track transactions that occur on Web 3.0.

SUMMARY OF THE INVENTION

Systems and techniques to facilitate node communication within an NFT platform are illustrated. One embodiment includes a method for assessing risk associated with nodes. The method recovers information on one or more characteristics of a node, wherein the information corresponds to at least one selected from the group consisting of: hardware, software, event history, and functionalities. The method derives one or more characterizations of the node based on the information. The characterizations reflect a current state of a characteristic of the one or more characteristics. Characterizations are expressed as statements on a blockchain. The method recovers, from an assertion unit, an assertion verifying validity of the one or more characterizations. The method derives a reputation score for the assertion unit, wherein the reputation score discloses estimates of verification accuracy for the assertion unit. The method determines a risk score for the node based on the reputation score, the one or more characterizations, and the assertion, wherein the risk score corresponds to a degree of risk associated with transacting with the node.

In a further embodiment, the risk score is selected from the group consisting of a financial risk score, a security risk score, an unoriginality risk score, and an insurance risk score.

In another embodiment, a characterization of the one or more characterizations is associated with at least one of a digital rights module (DRM), a trusted execution environment (TEE), a security mechanism, and an operating system (OS).

In another embodiment, a characterization of the one or more characterizations is stored as an augmentation of the node.

In a still further embodiment, the characterization is at least one of: an element included in the node; a meta-token attached to the node; a record stored externally to the node that is referenced by the node; a record accessible by a public key associated with the node; and an independent token that depicts a representation of the characterization.

In another embodiment, determining the risk score includes recovering, from the assertion unit, one or more additional characterizations of the node.

In still another embodiment, a first characterization of the one or more characterizations corresponds to a particular characteristic and is time-stamped for a first timepoint. A second characterization corresponds to the particular characteristic and is time-stamped for a second timepoint. The second timepoint occurs after the first timepoint.

In yet another embodiment, the risk score is part of an array of risk scores wherein each risk score in the array of risk scores corresponds to a specific characterization of the one or more characterizations.

In a further embodiment, each risk score in the array of risk scores corresponds to a different potential vulnerability of the node.

In another embodiment, the risk score is determined using a scoring entity. The scoring entity is associated with a reputation score. The reputation score discloses a reputation for accuracy held by the scoring entity.

One embodiment includes a non-transitory computer-readable medium for assessing risk associated with nodes, wherein program instructions are executable by one or more processors to perform a process. The processor recovers information on one or more characteristics of a node, wherein the information corresponds to at least one selected from the group consisting of: hardware, software, event history, and functionalities. The processor derives one or more characterizations of the node based on the information. The characterizations reflect a current state of a characteristic of the one or more characteristics. Characterizations are expressed as statements on a blockchain. The processor recovers, from an assertion unit, an assertion verifying validity of the one or more characterizations. The processor derives a reputation score for the assertion unit, wherein the reputation score discloses estimates of verification accuracy for the assertion unit. The processor determines a risk score for the node based on the reputation score, the one or more characterizations, and the assertion, wherein the risk score corresponds to a degree of risk associated with transacting with the node.

In a further embodiment, the risk score is selected from the group consisting of a financial risk score, a security risk score, an unoriginality risk score, and an insurance risk score.

In another embodiment, a characterization of the one or more characterizations is associated with at least one of a digital rights module (DRM), a trusted execution environment (TEE), a security mechanism, and an operating system (OS).

In another embodiment, a characterization of the one or more characterizations is stored as an augmentation of the node.

In a still further embodiment, the characterization is at least one of: an element included in the node; a meta-token attached to the node; a record stored externally to the node that is referenced by the node; a record accessible by a public key associated with the node; and an independent token that depicts a representation of the characterization.

In another embodiment, determining the risk score includes recovering, from the assertion unit, one or more additional characterizations of the node.

In still another embodiment, a first characterization of the one or more characterizations corresponds to a particular characteristic and is time-stamped for a first timepoint. A second characterization corresponds to the particular characteristic and is time-stamped for a second timepoint. The second timepoint occurs after the first timepoint.

In yet another embodiment, the risk score is part of an array of risk scores wherein each risk score in the array of risk scores corresponds to a specific characterization of the one or more characterizations.

In a further embodiment, each risk score in the array of risk scores corresponds to a different potential vulnerability of the node.

In another embodiment, the risk score is determined using a scoring entity. The scoring entity is associated with a reputation score. The reputation score discloses a reputation for accuracy held by the scoring entity.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
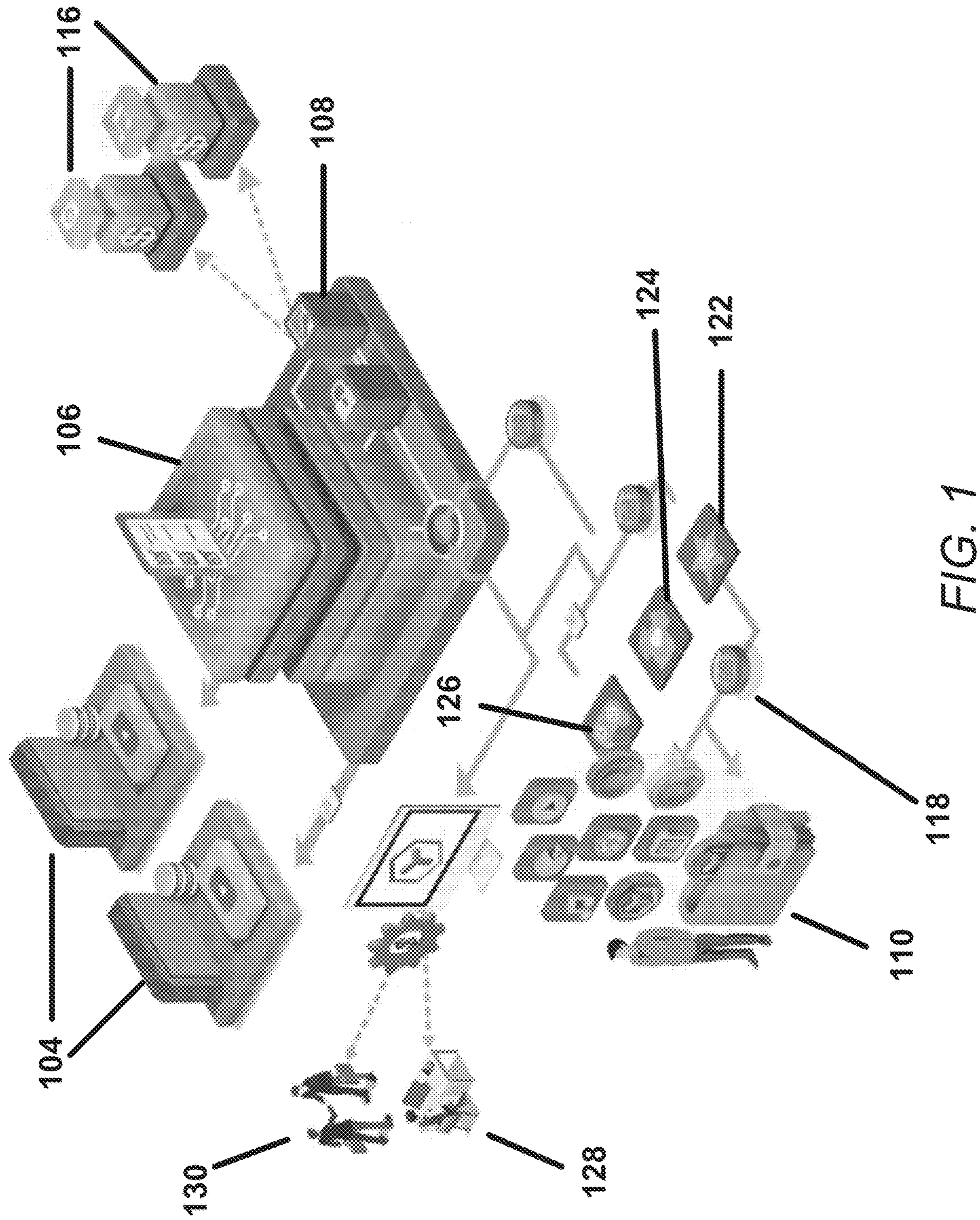
FIG. 1 is a conceptual diagram of an NFT platform in accordance with an embodiment of the invention.

Systems and methods for incorporating node-directed and communication-directed functionalities into non-fungible token (NFT) platforms, in accordance with many embodiments of the invention, are described herein. Such functionality may include, but is not limited to configurations assessing the risk associated with tokens, utilizing nodes to send messages to devices, facilitating awareness of click-through agreements associated with nodes and/or tokens, automated insuring and/or reassigning of tokens, maintaining token registries, and/or resource localization through filename modification.

Node-directed functionality utilized in accordance with various embodiments of the invention may allow communications including but not limited to notice concerning transactions, agreements, and risk scores that accompany interactions with particular nodes. Through the use of characterizations (that characterize various attributes of nodes) and/or assertions (that verify the accuracy of existing characterizations) nodes may derive estimates of risk associated with particular nodes. Such risk may include but is not limited to the risk of malicious contracts and/or the risk of phishing. Additionally or alternatively, communications may be facilitated through messages that are associated with digital assets through the use of identifiers, allowing nodes to provide updates on digital assets over time. Additionally or alternatively, click-through agreements and/or licenses may be accessed by nodes through blockchains through establishing associations between agreements and smart contracts.

Systems and methods directed to monitoring tokens, configured in accordance with some embodiments, may enable the efficient transfer of information in environments including but not limited to NFT platforms. This functionality may be used to recover usage and compliance information for tokens, allowing for protection mechanisms to insure and ensure the safety and ownership of the tokens are maintained. Additionally or alternatively, blockchain monitoring components may be used to recover metadata associated with tokens. Additionally or alternatively, nonces may be implemented in data mining configurations in order to enable the identification of the nature and/or origins of given blockchain-directed content.

While various token and node configurations are discussed above, communication-based functionalities that can be utilized within NFT platforms in accordance with various embodiments of the invention are discussed further below.

Non-Fungible Token (NFT) Platforms

Turning now to the drawings, systems and methods for implementing blockchain-based Non-Fungible Token (NFT) platforms in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g. one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g. transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger. In many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users can be content creators that are vetted by an administrator of networks that may be responsible for deploying and maintaining the NFT blockchain. Once the NFTs are minted, users can obtain and conduct transactions with the NFTs. In several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. The media wallet application could also be provided by a browser, or by a dedicated hardware unit executing instructions provided by a wallet manufacturer. The different types of wallets may have slightly different security profiles and may offer different features, but would all be able to be used to initiate the change of ownership of tokens, such as NFTs. In many embodiments, the fungible tokens can be fully converted into fiat currency and/or other cryptocurrency. In several embodiments, the fungible tokens are implemented using split blockchain models in which the fungible tokens can be issued to multiple blockchains (e.g. Ethereum). As can readily be appreciated, the fungible tokens and/or NFTs utilized within an NFT platform in accordance with various embodiments of the invention are largely dependent upon the requirements of a given application.

In several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users 128. In addition, content creators can directly issue NFTs to the media wallets of specific users (e.g. by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the user. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications can request authentication of the NFT directly based upon the public key of the content creator and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platform Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned blockchains are closed systems that are limited to publicly inaccessible transactions. In many embodiments, the permissioned blockchain can be in the form of distributed ledgers, while the blockchain may alternatively be centralized in a single entity.

Figure 2:
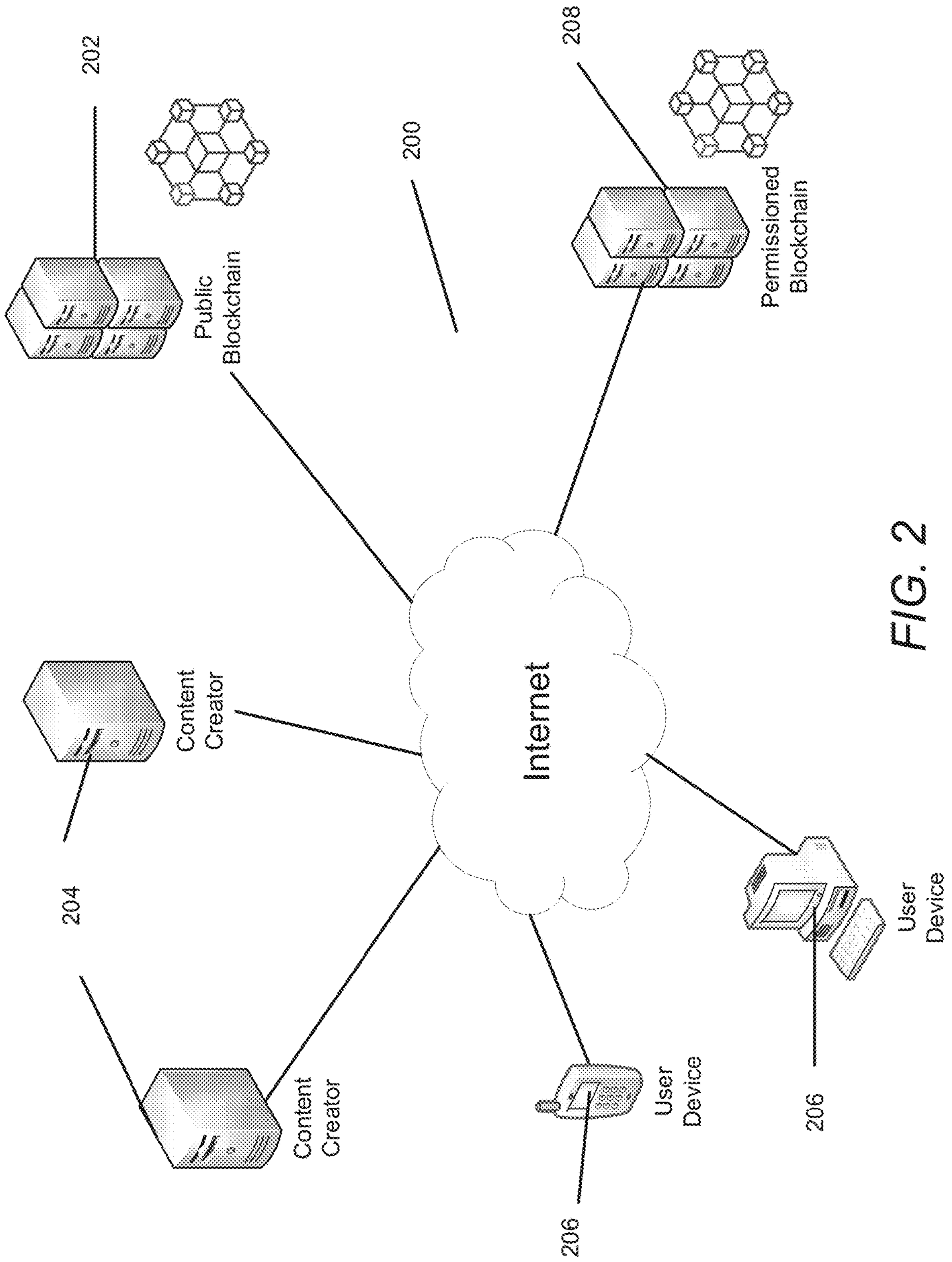
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public blockchain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In many embodiments, media wallets are smart device enabled, front-end applications for fans and/or consumers, central to all user activity on an NFT platform. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data can be accessed by the media wallet application. In this way, users control access to entries in the permissioned blockchain 208 describing the user's NFT transaction. In several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In several embodiments, the permissioned blockchain 208 supports access control lists and users can utilize a media wallet application to modify permissions granted by way of the access control list. In many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the permissioned blockchain. In several embodiments, the access to the data is determined by computer systems that implement permission-based data access services.

In many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
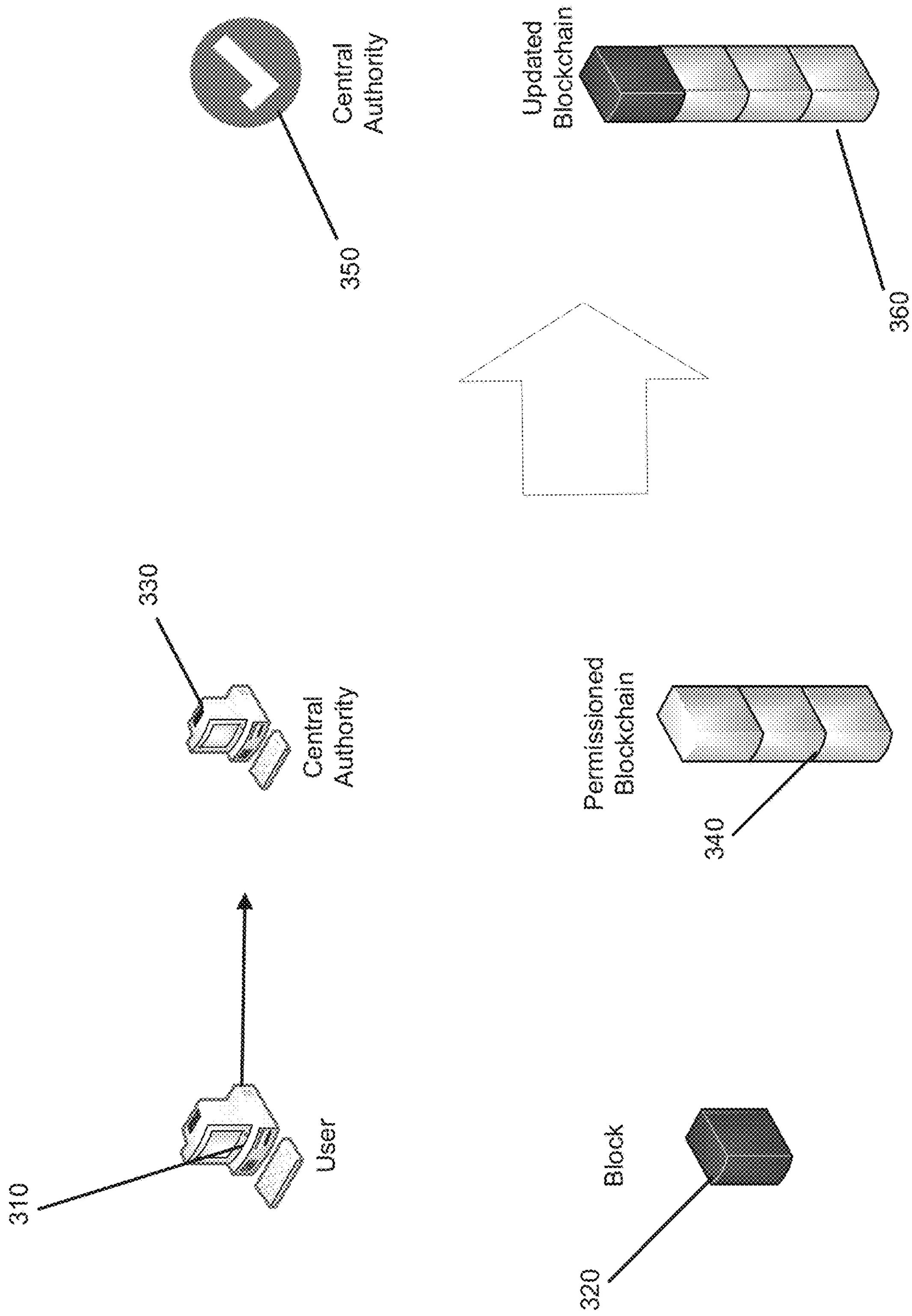
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

Figure 4:
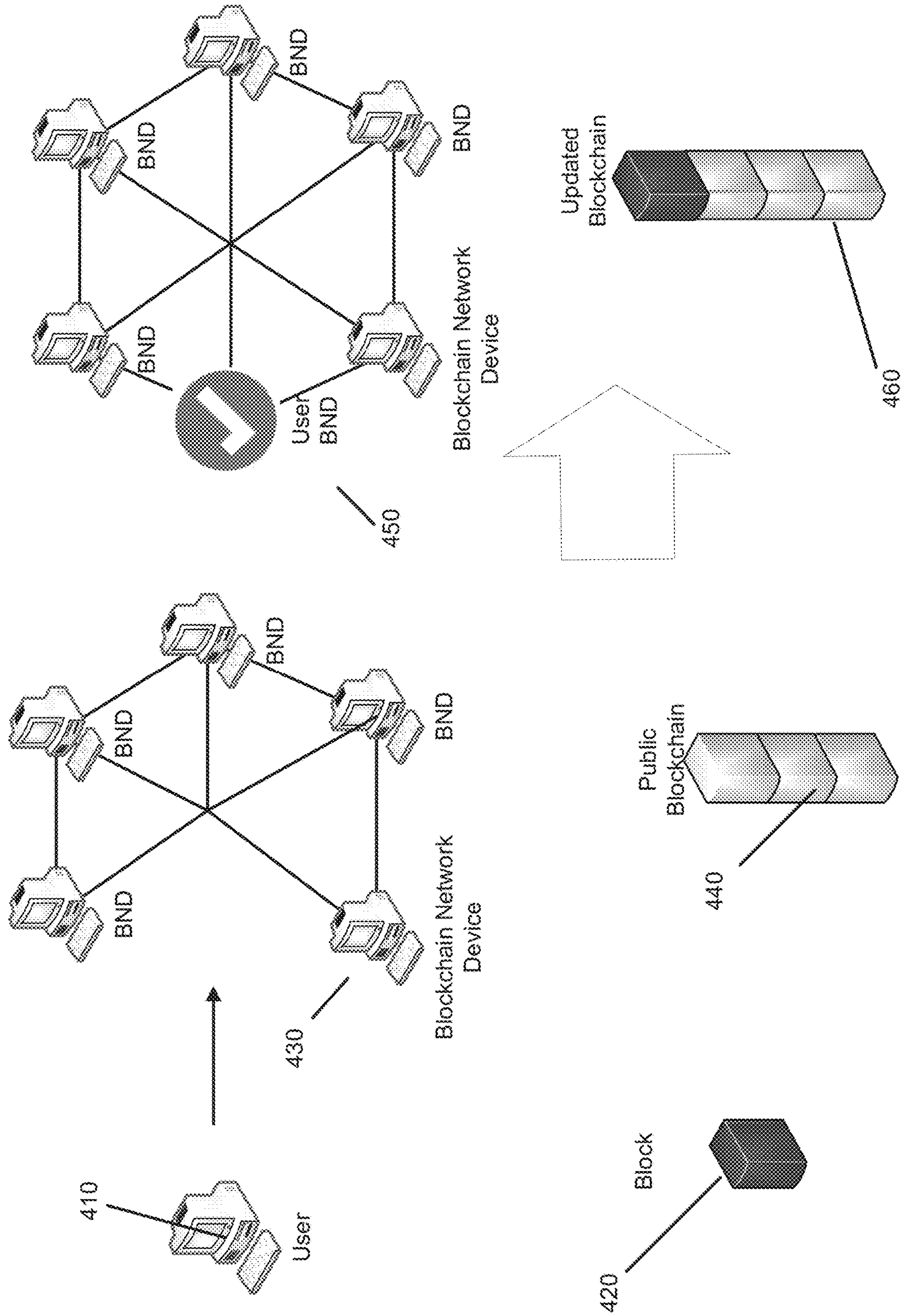
FIG. 4 is a conceptual diagram of a permissionless blockchain in accordance with an embodiment of the invention.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In many decentralized blockchains, many blockchain network devices 430, in the decentralized system may have copies of the blockchain, allowing the ability to validate transactions. In many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, Proof of Stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
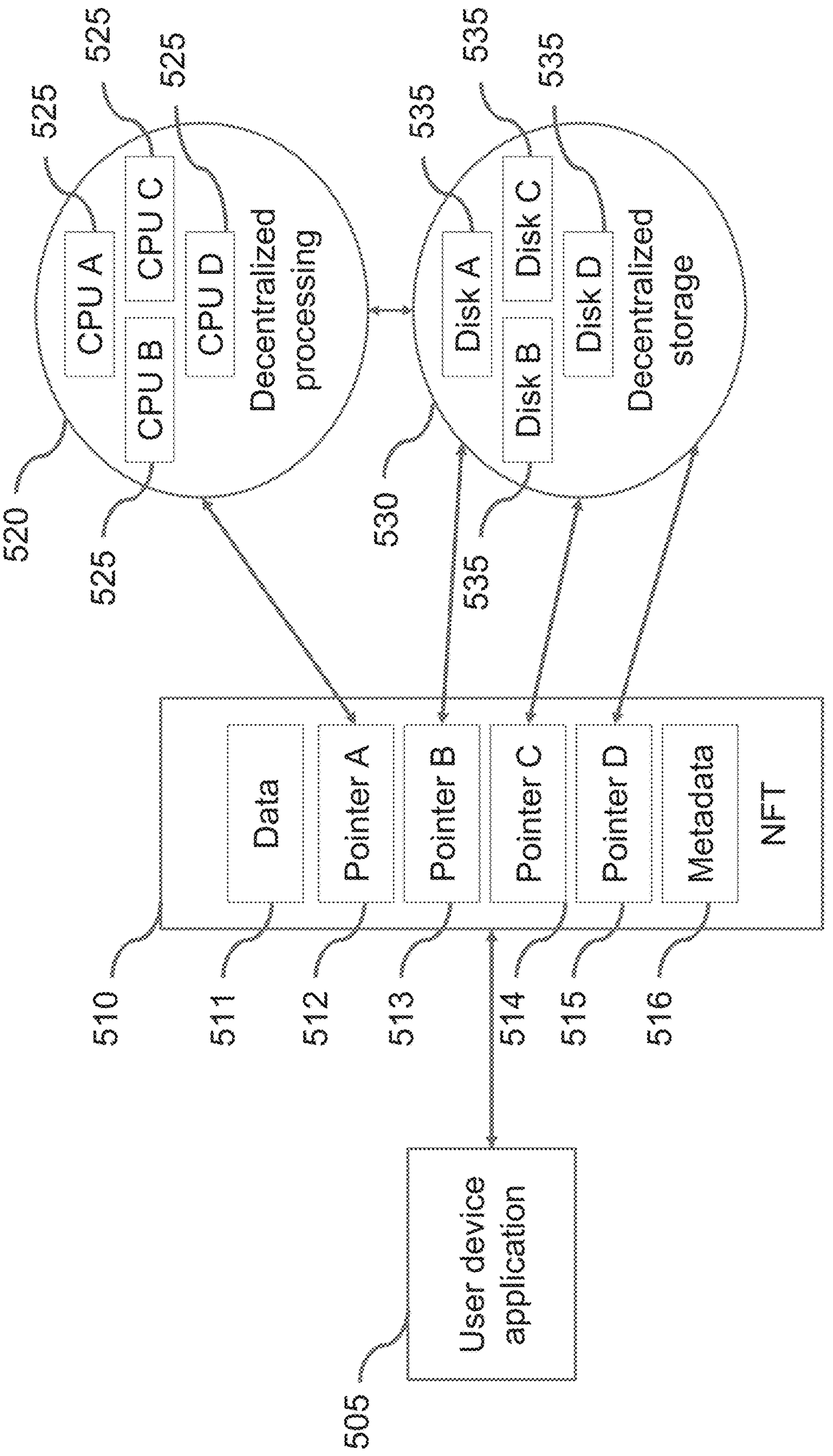
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g. URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
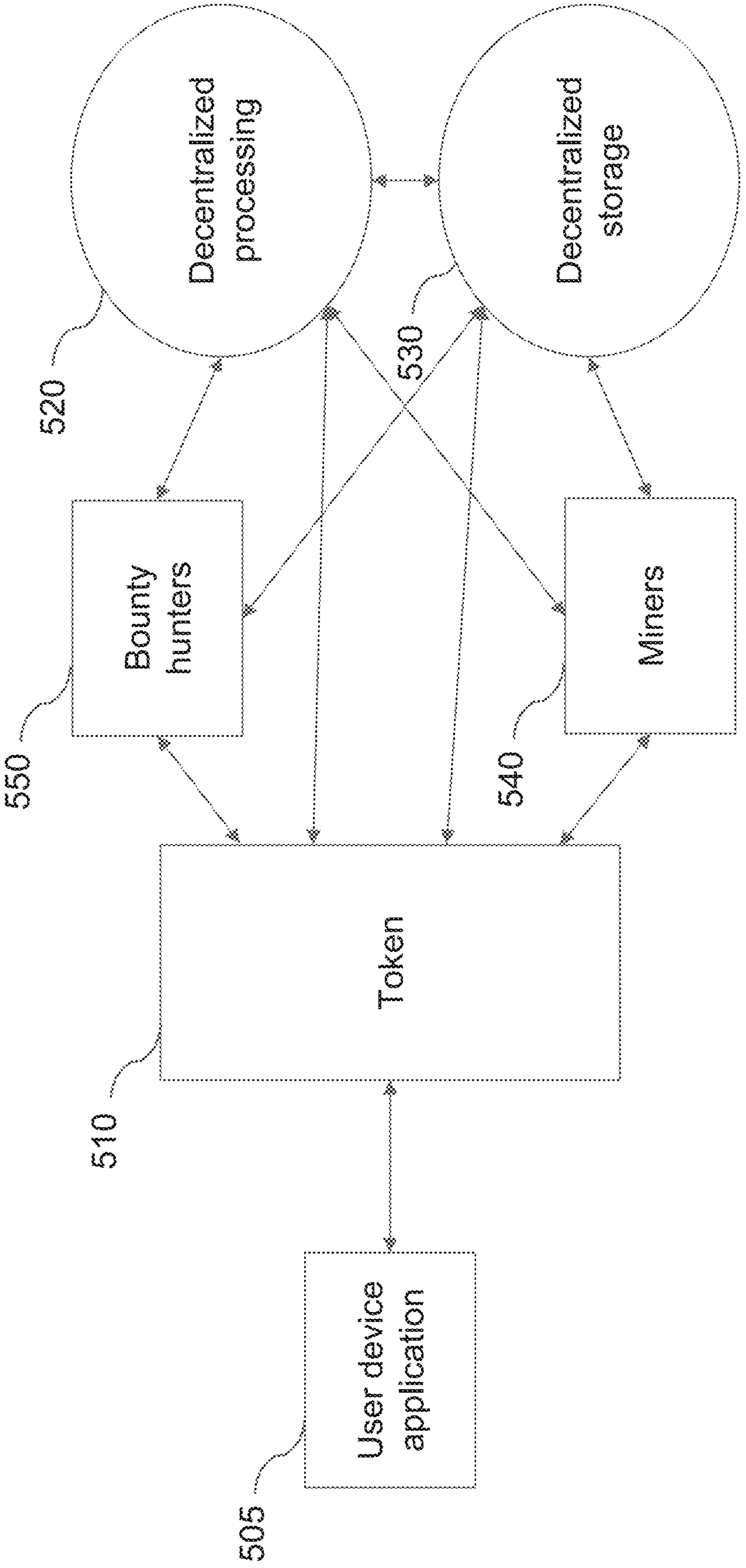

Dual blockchains may additionally incorporate methods for detection of abuse, essentially operating as a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platform Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (PoS) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
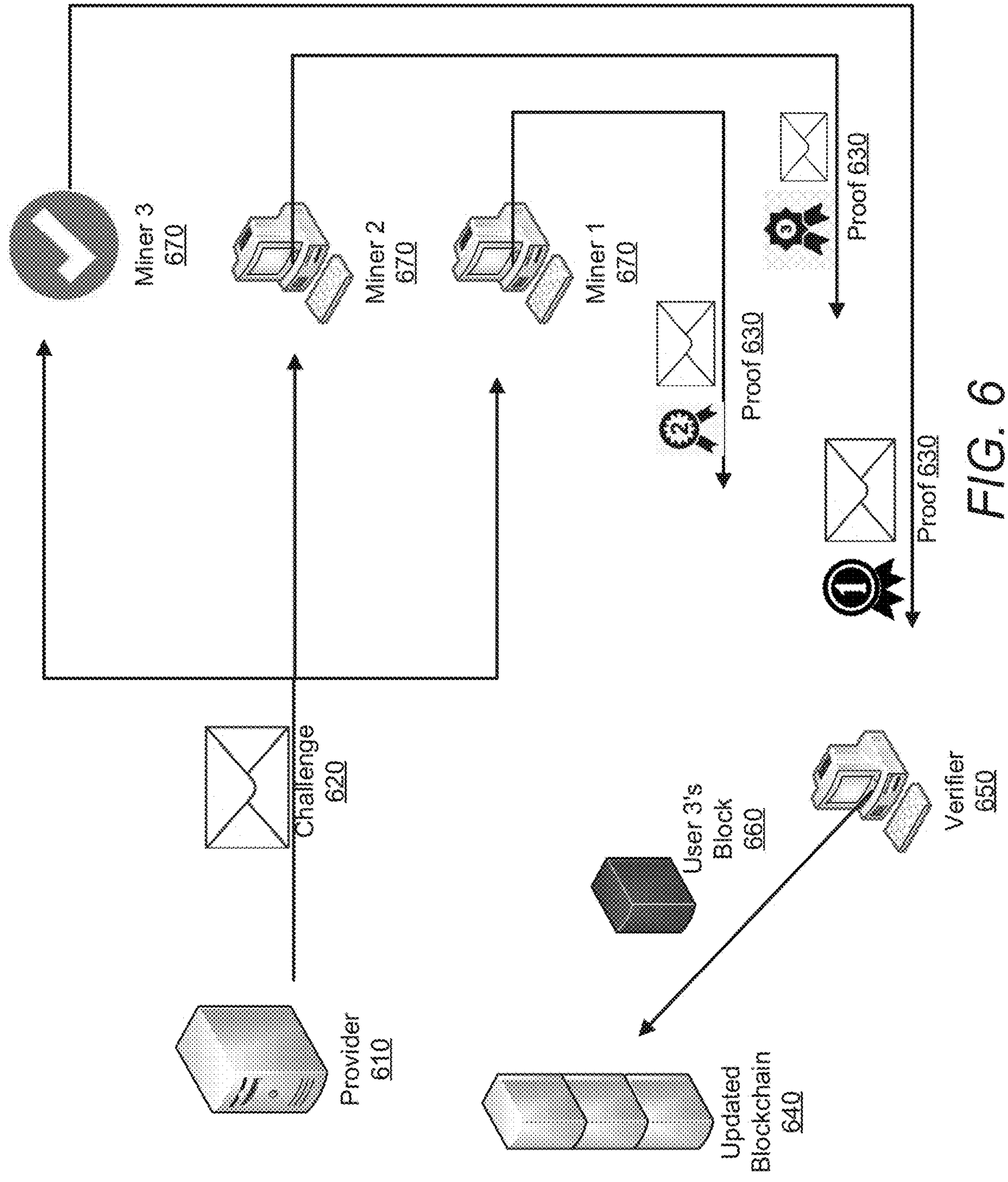
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge-response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 to the blockchain 630. As such, under a Proof of Work consensus mechanism, each miner involved can have a success probability proportional to the computational effort expended.

Figure 7:
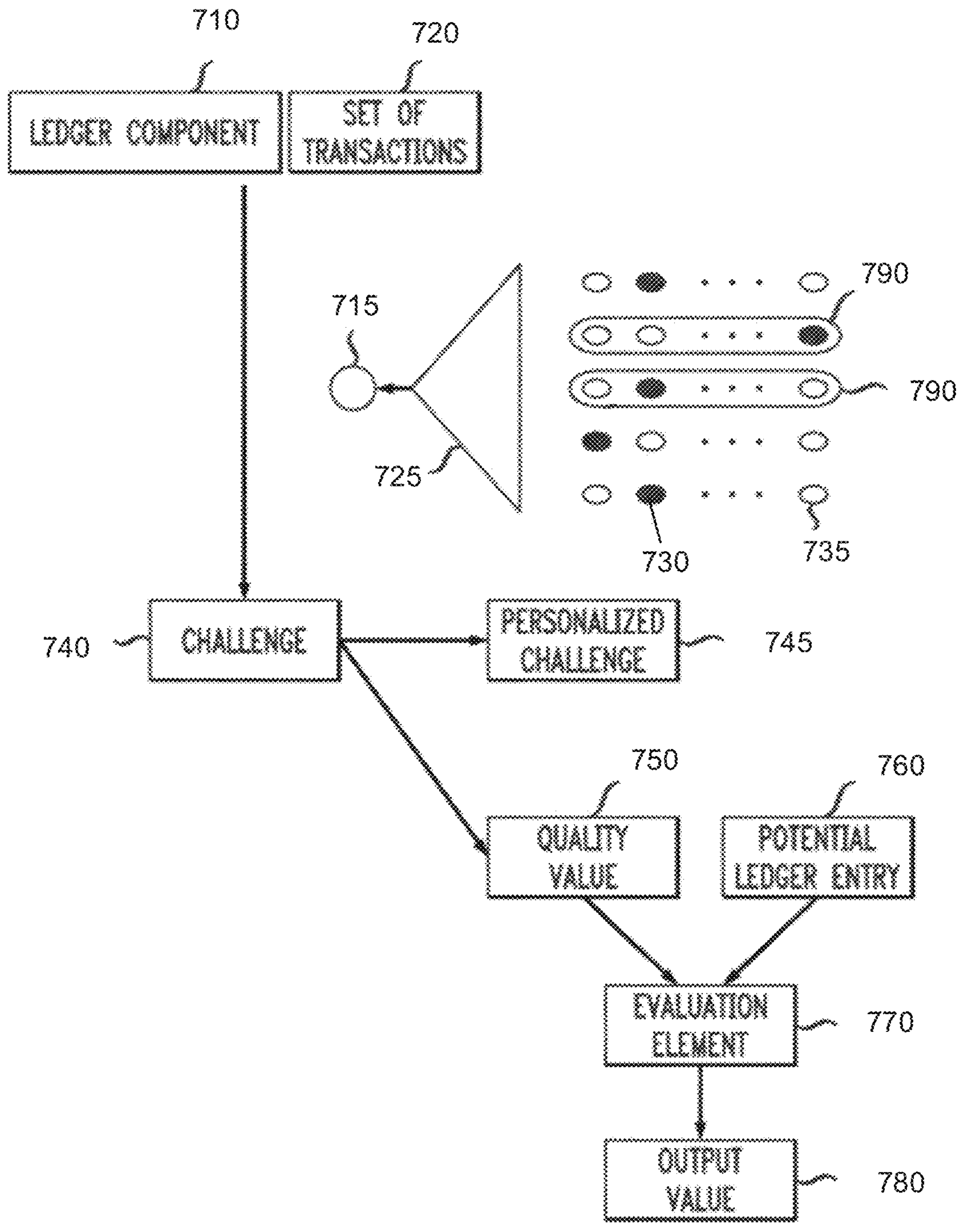
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

In some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In some embodiments, non-proportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 can also correspond to public keys. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
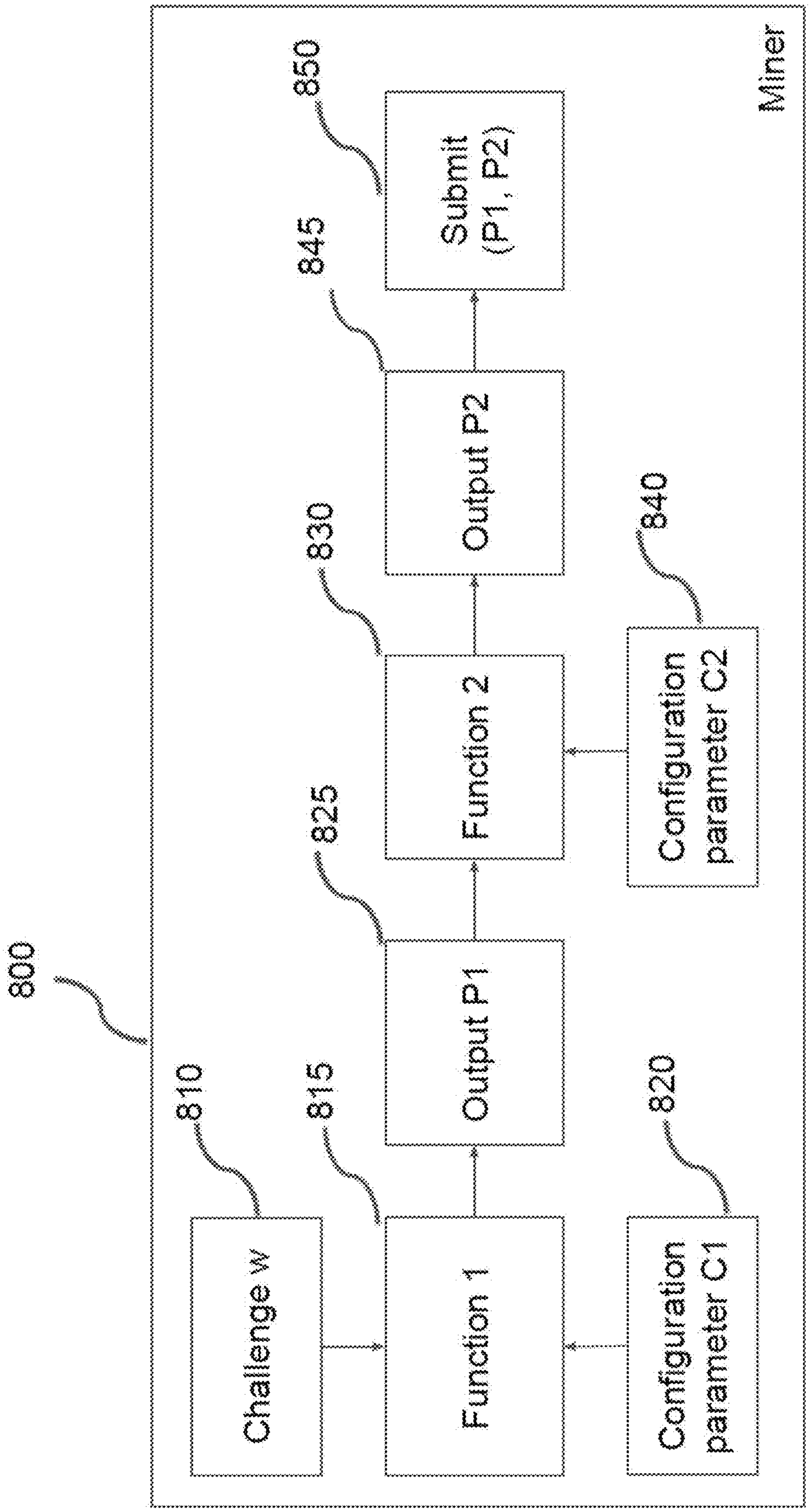
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone(™) or Intel SGX(™) may provide assurances exist of integrity by virtue of incorporating private/isolated processing environments.

Figure 9:
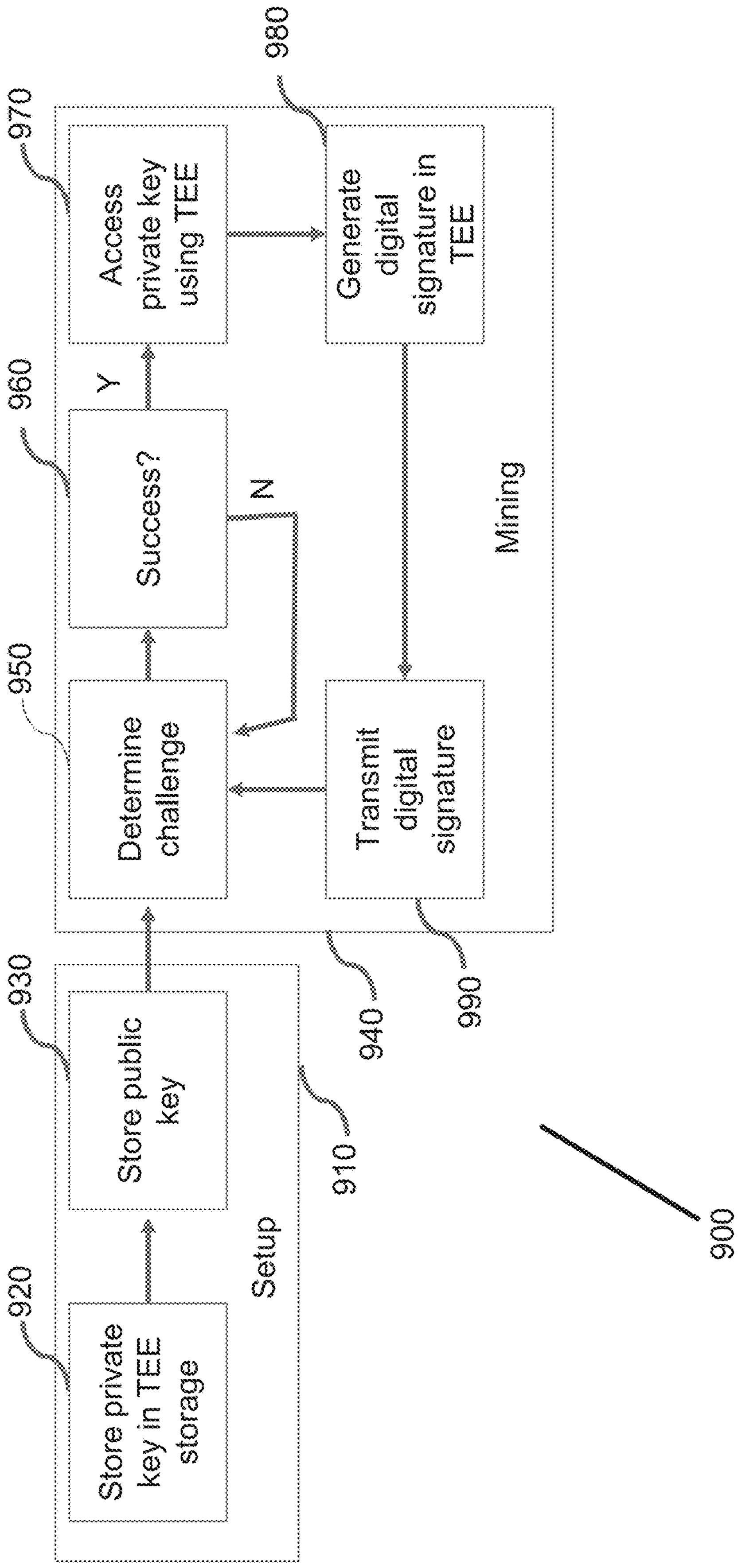
FIG. 9 illustrates a process followed by a Trusted Execution Environment-based consensus mechanism in accordance with some embodiments of the invention

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g. the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge. In this context, process 900 can determine (950) a new challenge after the ledger contents have been updated and/or a time-based observation is performed. In several embodiments the determination of a new challenge may come from any of a number of approaches appropriate to the requirements of specific applications, including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed. Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. In several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, Proof of Stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

NFT Platform Constituent Devices and Applications

A variety of computer systems that can be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
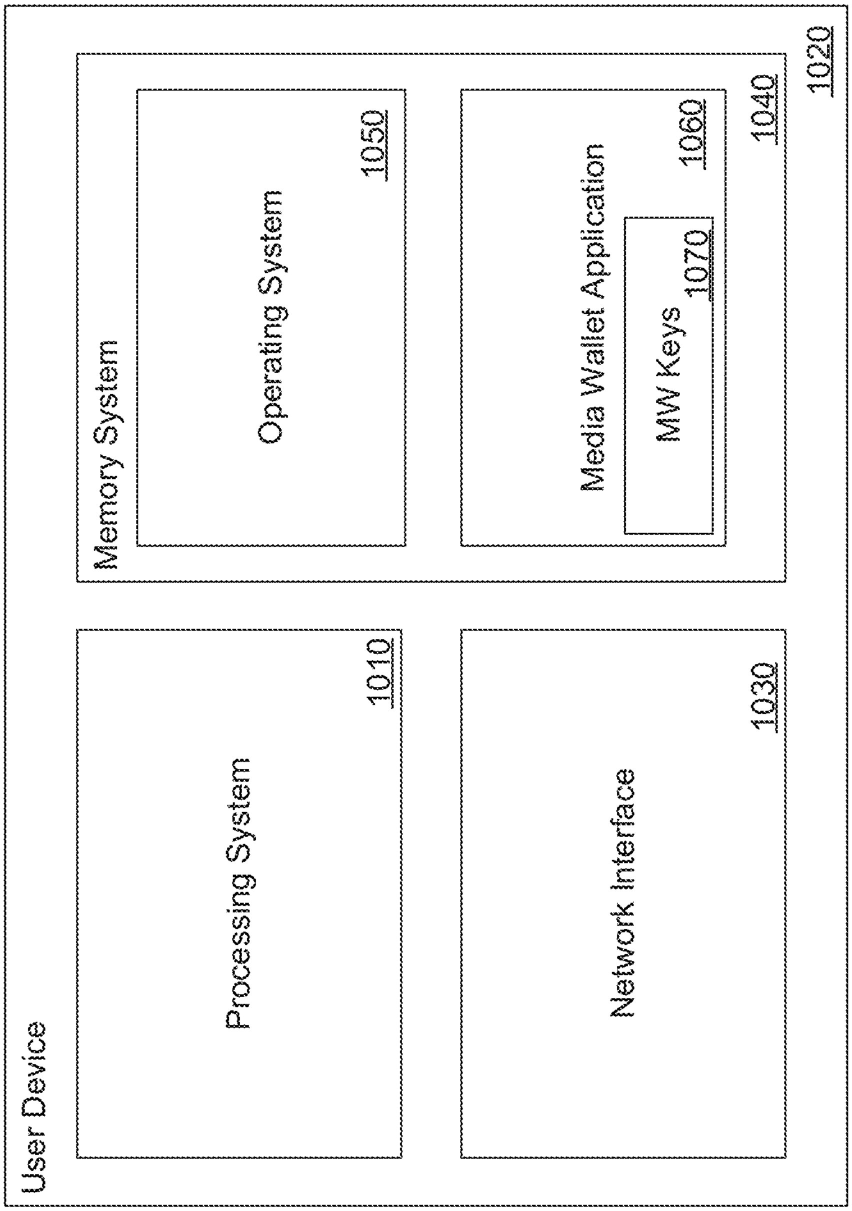
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
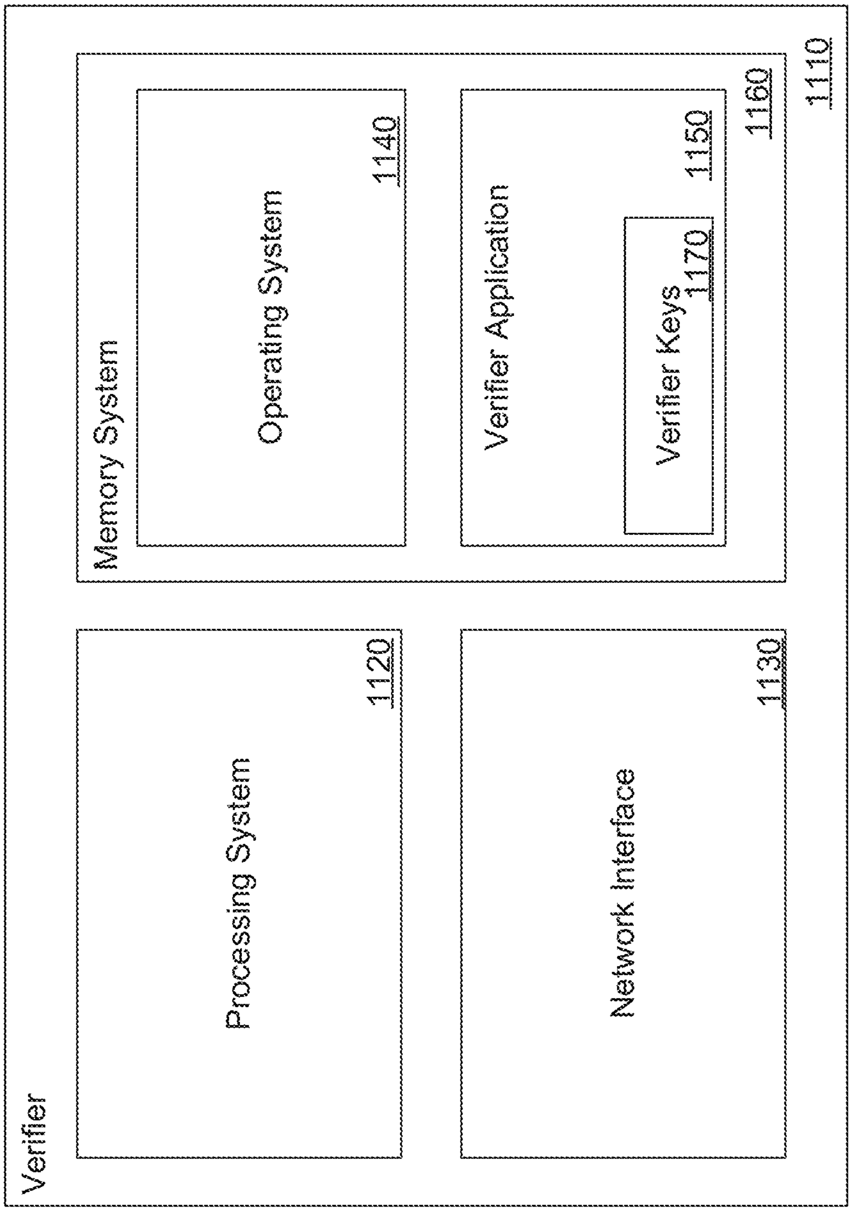

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
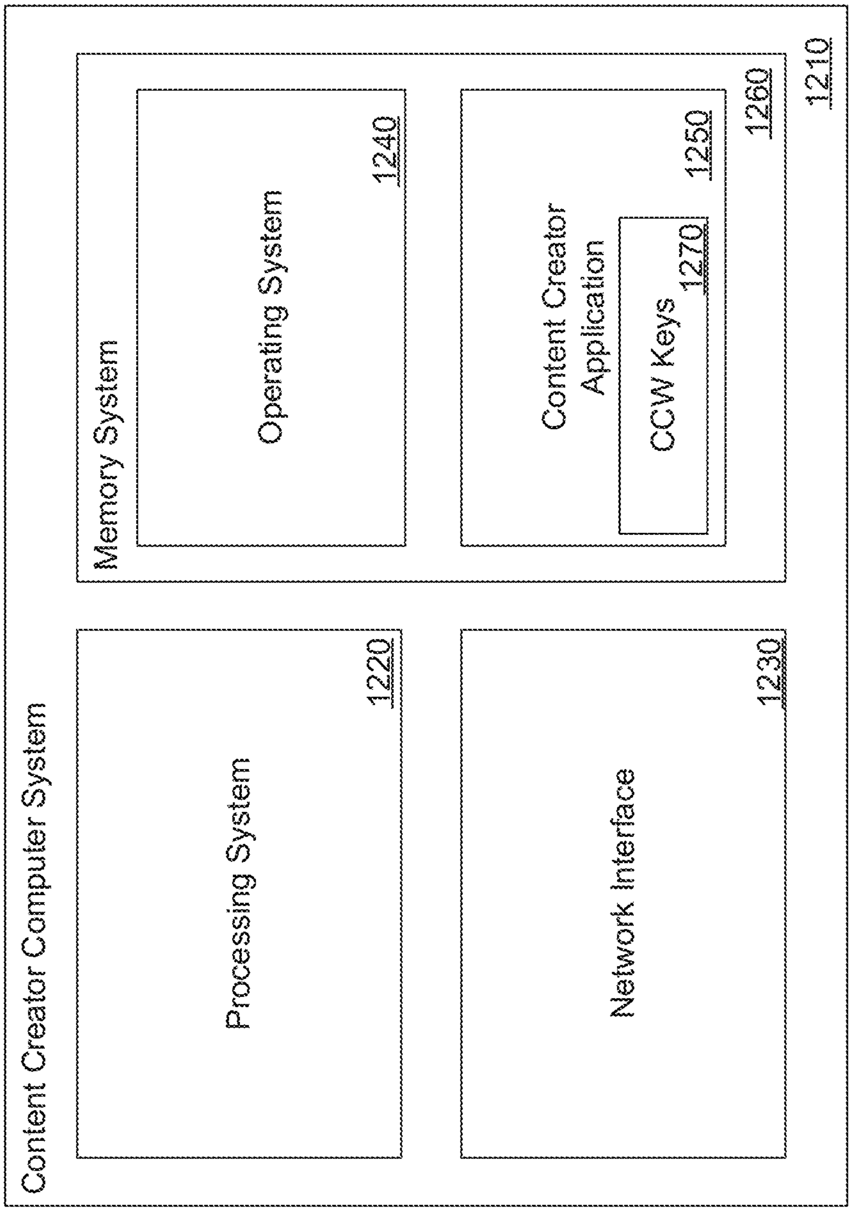

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but are not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to peruse the content; whether they can place bids to purchase the content; whether they can borrow the content, and/or whether they are biometrically authenticated.

Figure 13:
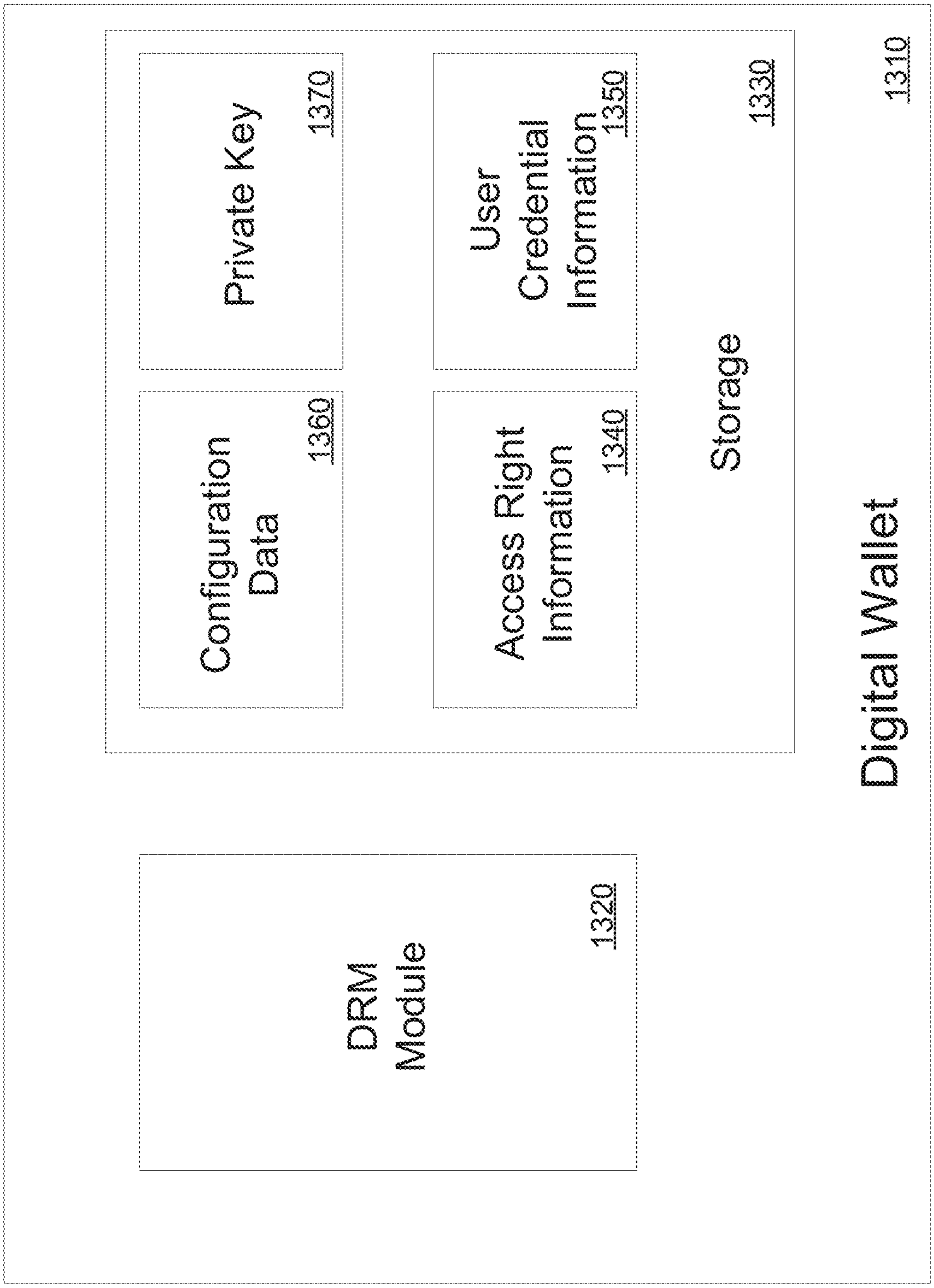
FIG. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310. In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
FIGS. 14A-14C depicts user interfaces of various media wallet applications in accordance with a number of embodiments of the invention.
Figure 14A:
Figure 14C:

Operation of media wallet applications implemented in accordance with some embodiments of the invention is conceptually illustrated by way of the user interfaces shown in FIGS. 14A-14C. In many embodiments, media wallet applications can refer to applications that are installed upon user devices such as (but not limited to) mobile phones and tablet computers running the iOS, Android and/or similar operating systems. Launching media wallet applications can provide a number of user interface contexts. In many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In several embodiments, a first user interface context is a dashboard (see, FIGS. 14A, 14C) that can include a gallery view of NFTs owned by the user. In several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content, including NFTs, fungible tokens, content that is not expressed as tokens such as content that has not yet been minted but for which the wallet can initiate minting, and other non-token content, including executable content, webpages, configuration data, history files and logs. This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on. A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet comprising the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions." A first partition may correspond to material associated with a first set of public keys, a second partition to material associated with a second set of public keys not overlapping with the first set of public keys, wherein such material may comprise tokens such as crypto coins and NFTs. A third partition may correspond to usage data associated with the wallet user, and a fourth partition may correspond to demographic data and/or preference data associated with the wallet user. Yet other partitions may correspond to classifications of content, e.g., child-friendly vs. adult; classifications of whether associated items are for sale or not, etc.

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world. When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of his or her wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platform NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In some embodiments, the first social NFT may then be associated with some rights and capabilities, which may be expressed in other NFTs. Additional rights and capabilities may also be directly encoded in a policy of the social security number NFT.

Figure 15:
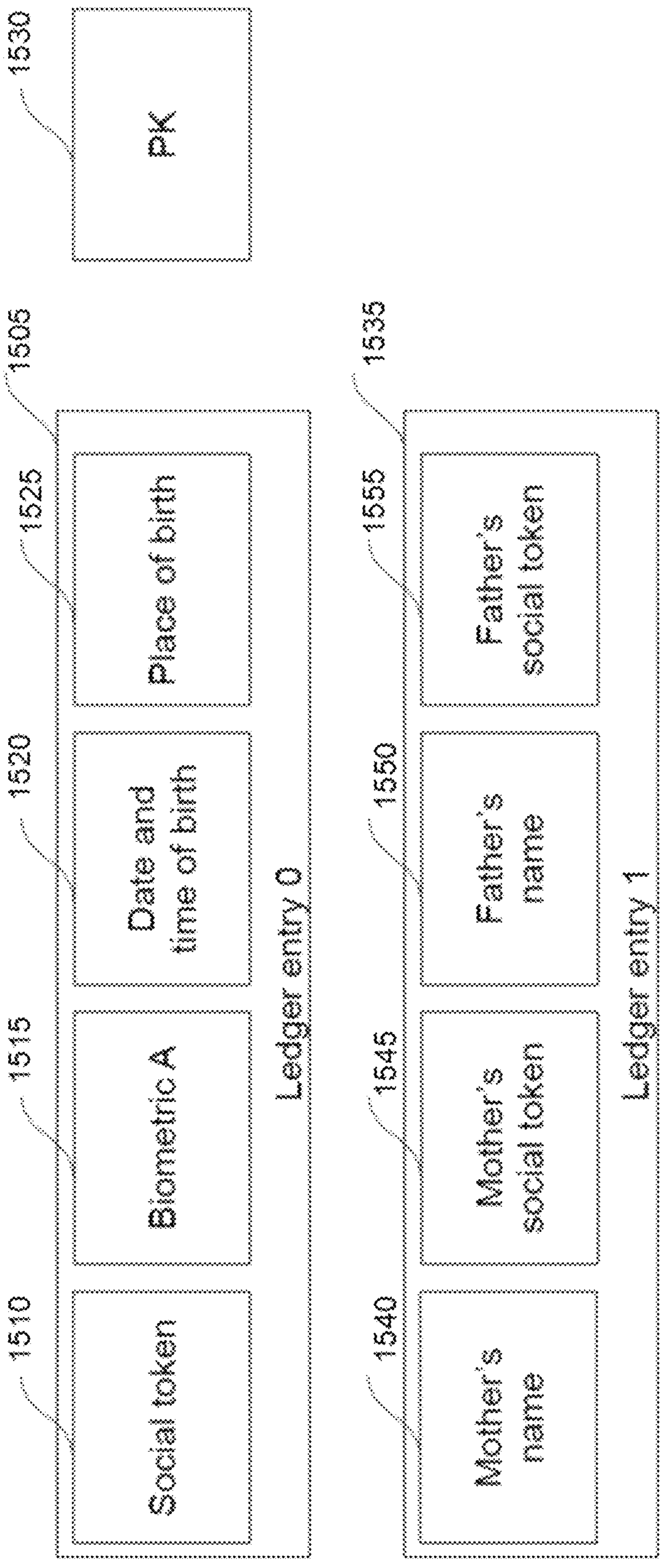
FIG. 15 illustrates an NFT ledger entry corresponding to an NFT identifier.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including but not limited to mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race, gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future offspring, marriages, familial history, photographs, videos, tax filings, and/or patent filings. The management and/or maintenance of an individual's biometrics throughout the individual's life may be immutably connected to the first social NFT given the use of a decentralized blockchain ledger.

In some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse can be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form. In a number of embodiments, the machine-readable and human-readable elements can be generated one from the other. In some embodiments, an agreement in a machine-readable form may include, but is not limited to, a policy and/or an executable script. In some embodiments, an agreement in a human-readable form may include, but is not limited to, a text and/or voice-based statement of the promise.

In some embodiments, regardless of whether the machine-readable and human-readable elements are generated from each other, one can be verified based on the other. Smart contracts including both machine-readable statements and human-accessible statements may also be used outside the implementation of promise NFTs. Moreover, promise NFTs may be used outside actions taken by individual NFTs and/or NFT-owners. In some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horse X wins.

A promise NFT may be associated with actions that cause the execution of a policy and/or rule indicated by the promise NFT. In some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In some such methods, the match may be between the promise NFT and inputs that identify that the conditions are satisfied, where said input can take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In some such embodiments, two parties may wish to purchase an expensive work of digital artwork represented by an NFT. The parties can enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. An anchored NFT may tie to another NFT, which may make it both anchored and relative. An example of such may be called pseudonym NFTs.

Pseudonym NFTs may be a kind of relative NFT acting as a pseudonym identifier associated with a given social NFT. In some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers, represented by an anchored NFT that is related to a physical entity (the hardware), may have access rights to WiFi networks. When computers are replaced with newer models, users may want to maintain all old relationships, for the new computer. For example, users may want to retain WiFi hotspots. For this to be facilitated, a new computer can be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs can be used to selectively transfer rights associated with one NFT to one or more NFTs, where such NFTs may correspond to users, devices, and/or other entities, when such assignments of rights are applicable. Inheritance NFTs can also be used to transfer property. One way to implement the transfer of property can be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identifies unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including but not limited to, what portions of a building employees may access, and what computer system employees may utilize. In several embodiments, employee NFTs may incorporate their owner's biometrics, such as a face image. In a number of embodiments, employee NFTs may operate as a form of promise NFT. In some embodiments, employee NFT may comprise policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rightsholder information, including but not limited to, licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including but not limited to traditional computers, mobile computers, and virtual reality display devices. Script tokens may be used to provide the content for game avatars, digital assistant avatars, and/or instructor avatars. Script tokens may comprise audio-visual information describing how input text is presented, along with the input text that provides the material to be presented. It may also comprise what may be thought of as the personality of the avatar, including how the avatar may react to various types of input from an associated user.

In some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers can generate parts of the content, allowing for large-scale content collaboration.

Features of other NFTs can be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements can also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g. script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers can identify how to make their content more desirable to intended target groups.

The generation of evaluations can be supported by methods including, but not limited to machine learning (ML) methods, artificial intelligence (AI) methods, and/or statistical methods. Anomaly detection methods developed to identify fraud can be repurposed to identify outliers. This can be done to flag abuse risks or to improve the evaluation effort.

Multiple competing evaluation units can make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
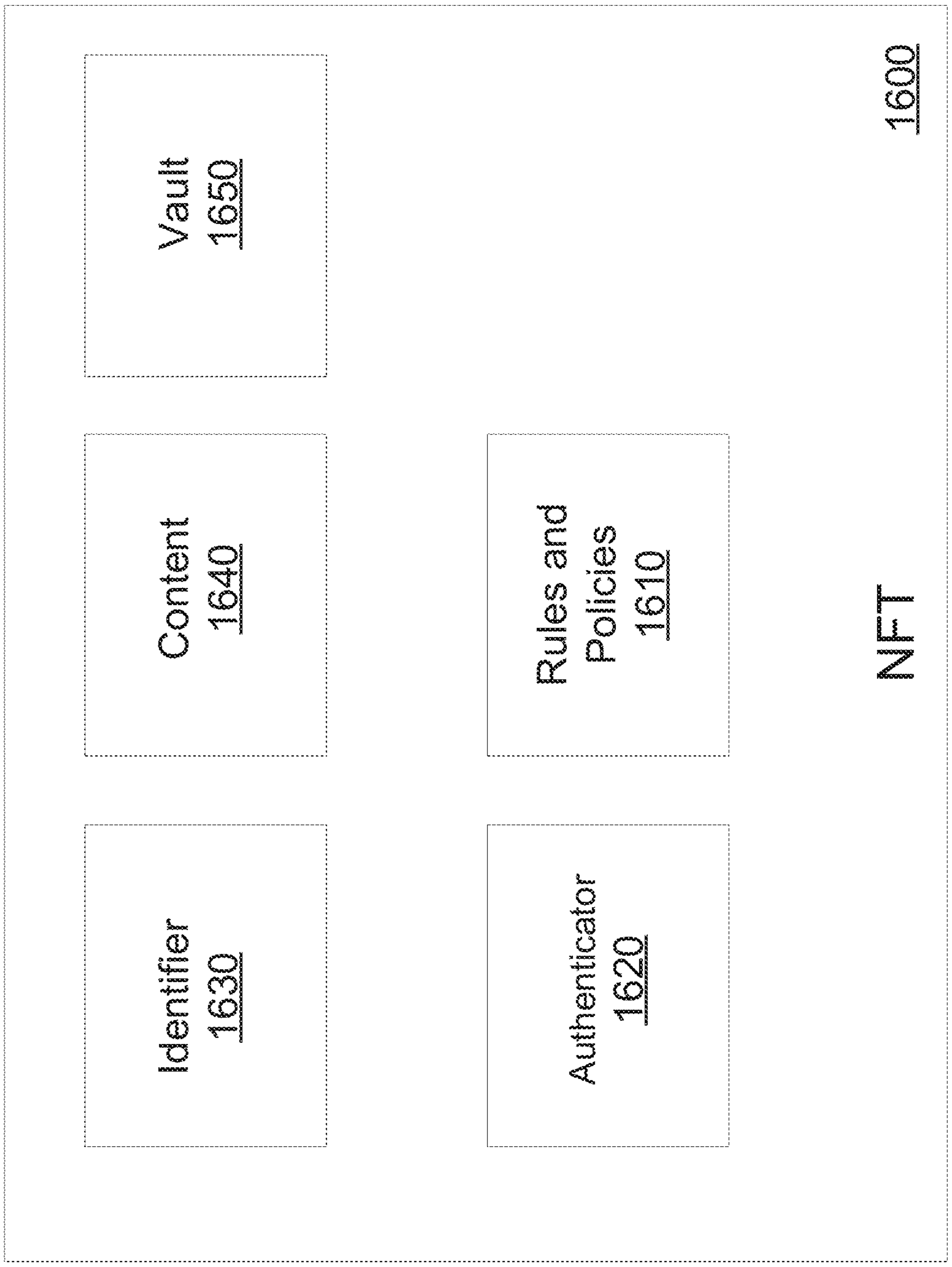
FIGS. 16A-16B illustrate an NFT arrangement relationship with corresponding physical content in accordance with an embodiment of the invention.

An example NFT which may be associated with specific content in accordance with several embodiments of the invention is illustrated in FIG. 16A. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

Figure 16B:
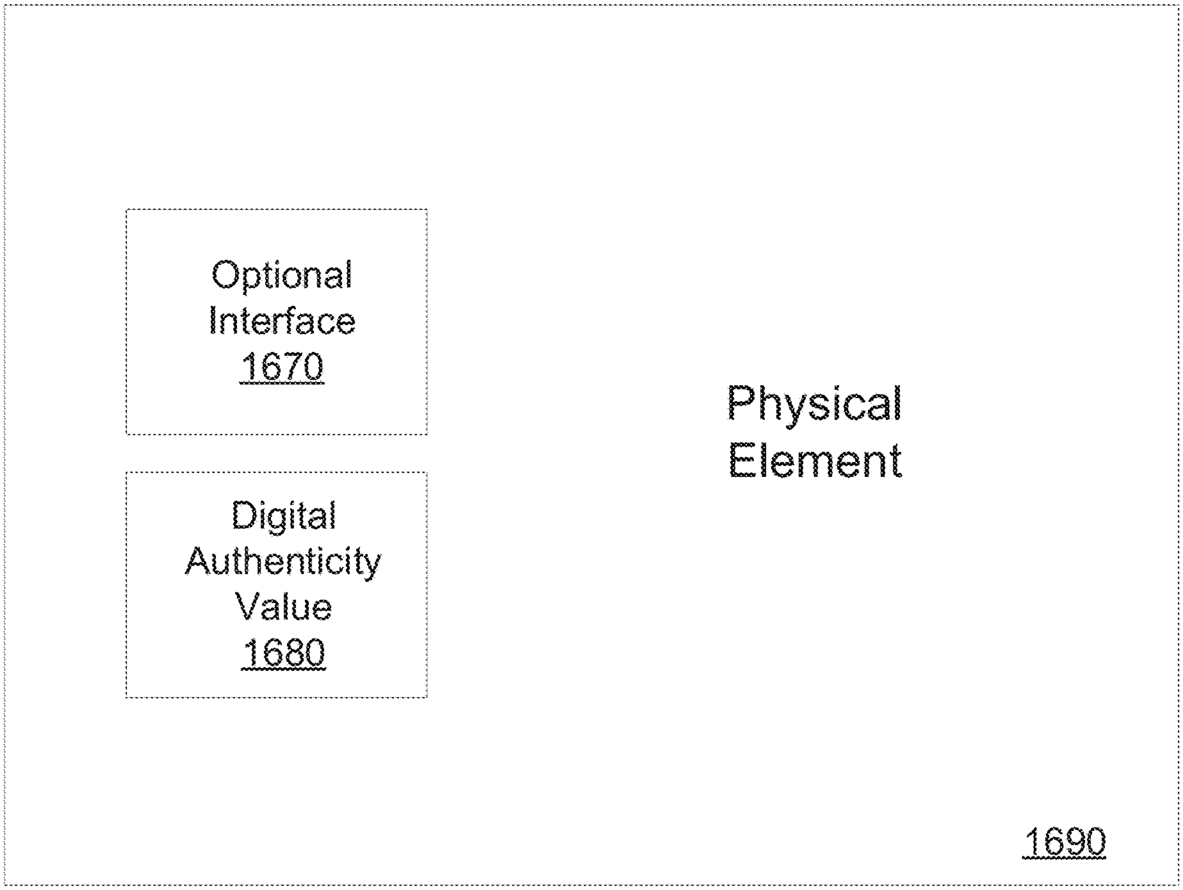

An example of a physical element 1690 corresponding to an NFT, in accordance with some embodiments of the invention is illustrated in FIG. 16B. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value) value. In accordance with many embodiments of the invention, a digital authenticity value (DAV) 1680 may be therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
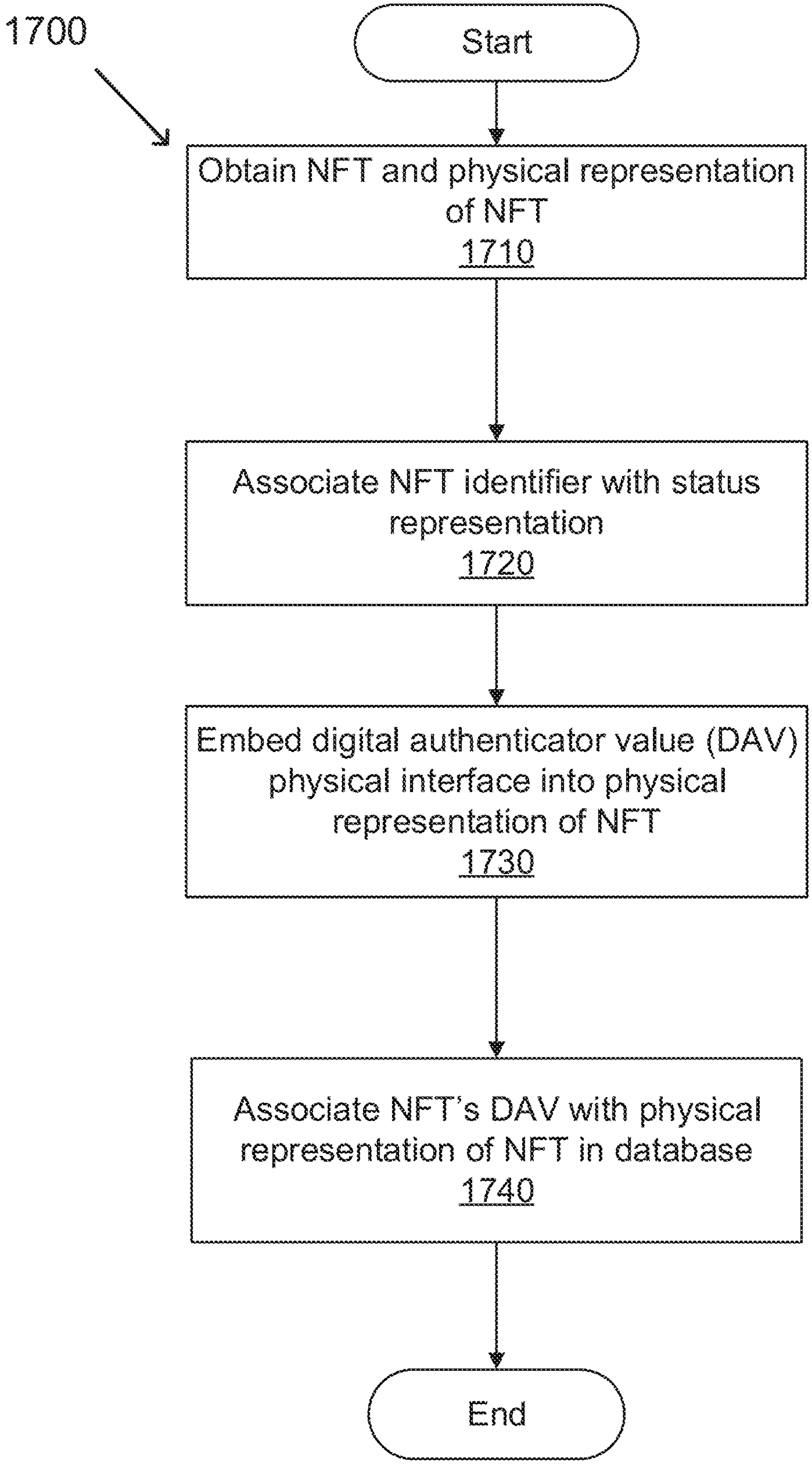
FIG. 17 illustrates a process for establishing a relationship between an NFT and corresponding physical content.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In some embodiments, the association can be performed through making note of the transaction and clarifying that it encapsulates both the mouse painting and the mouse NFT.

While specific processes are described above with reference to FIGS. 15-17, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

NFT Platform Node Evaluation

Systems and techniques for characterizing and evaluating Web 3.0 nodes implemented in accordance with certain embodiments of the invention are illustrated. Non-limiting examples of nodes in this context may include but are not limited to wallets, applications (that may or may not have integrating transactions), display devices, marketplaces, bridges, miners, bounty hunters, service providers, content associated with tokens (and/or token quality/origin), distinct distributed ledger layers, and/or blockchains.

Systems in accordance with many embodiments of the invention may be configured to produce characterizations of nodes, assertions based on characterizations, and risk scores/assessments based on characterizations and/or assertions.

Figure 18:
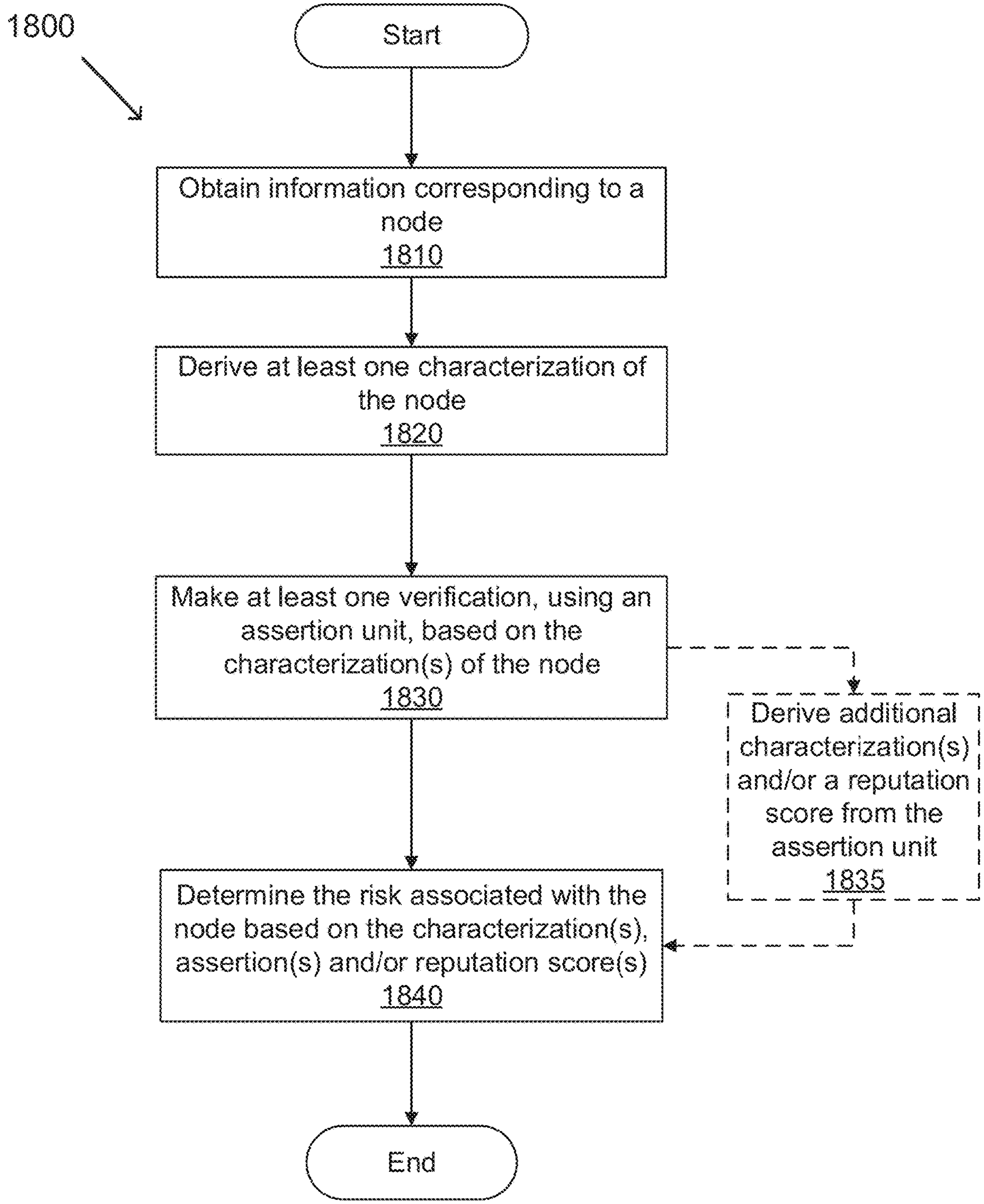
FIG. 18 illustrates a process for determining risk scores associated with nodes configured in accordance with numerous embodiments of the invention.

A process for determining risk scores associated with nodes configured in accordance with numerous embodiments of the invention is illustrated in FIG. 18. Process 1800 obtains (1810) information corresponding to a node. The obtained information may concern but is not limited to hardware, software, event history and/or functionalities associated with nodes. Process 1800 derives (1820) at least one characterization of the node. Characterizations may represent general summaries of the state of various aspects of the nodes. Process 1800 makes (1830) at least one verification, using an assertion unit, based on the characterization(s) of the node. As indicated above, the value of assertions may come from the established reputations of the assertion units. Process 1800 determines (1840) the risk associated with the node based on the characterization(s), assertion(s) and/or reputation score(s). Risk scores may take various forms including but not limited to financial risk, security risk, and/or insurance risk. Additionally or alternatively, before or after determining (1840) the risk score, process 1800 may derive (1835) additional characterization(s) and/or reputation scores from the assertion unit.

While a specific process for producing risk scores is described above, any of a variety of processes can be utilized as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Characterizations may include but are not limited to hardware characterizations, software characterizations, event history characterizations, and/or functionality characterizations. In accordance with some embodiments, characterizations may be produced by specific modules (herein referred to as "characterization units"). In accordance with multiple embodiments, nodes may be characterized based on characteristics including but not limited to whether the node uses digital rights management (DRM) modules; the type and version of such DRM modules, and whether the module (s) have been patched with the most recently available patches. Additionally or alternatively, nodes can be characterized by whether they include trusted execution environments (TEE), the types of TEEs, and/or the versions of the TEEs. Nodes can, additionally or alternatively, be characterized by software, including but not limited to operating systems and/or whether they are configured with patched anti-virus software.

In accordance with numerous embodiments, nodes can have various protection mechanisms implemented and/or characterized accordingly. Example protection mechanisms may include but are not limited to external entities that are conjunctive owners of tokens (including but not limited to NFTs), as disclosed in U.S. patent application Ser. No. 18/323,344, titled "Systems and Methods for Facilitating Access to Token Content," filed May 24, 2023, incorporated herein by reference. Thus, nodes can also be characterized based on whether nodes utilize such protection mechanisms.

In accordance with some embodiments, characterizations of nodes may be stored in databases, including but not limited to distributed databases and/or blockchain-based databases. In such cases (and similar instances) characterizations may be associated with nodes by including references to them. Characterizations of nodes may be stored as augmentations of the nodes. This may include but is not limited to, characterizations taking the form of: elements included in the nodes, references within the nodes, meta-tokens attached to nodes, and/or by using tokens with characterization data that can be tied to tokens and/or services they describe ("characterization tokens"). Characterization tokens may be tied to tokens and/or services by including digital signatures of the creator(s) of the characterization(s). Additionally or alternatively, characterization tokens may have reference(s) and/or description(s) of the token(s) and/or service(s). Some service providers may create and/or store characterizations, and provide these on demand to consumers of characterization information.

Additionally or alternatively to characterizing nodes based on their hardware, software, and/or use of distributed security mechanisms (such as conjunctive ownership methods), nodes can be characterized based on event history, which can include but is not limited to events that the token(s) have been associated with. Prospective events may include but are not limited to accomplishments (e.g., certain numbers of purchases and/or sales within a certain amount of time; the engagement with staking) and/or detriments (e.g., the nodes being the target of complaints filed by bounty hunters; the infection by malware, causing transfers of assets to attackers).

When characterizations are determined, systems configured in accordance with multiple embodiments of the invention may produce assertions based on the characterizations. Assertions of characterizations may correspond to verifying and/or attesting to input characterizations. In accordance with several embodiments, assertions may be performed by designated modules ("assertion units"). In accordance with some embodiments, assertion units may be configured to make their own characterizations. Additionally or alternatively to characterizations, evidence for producing assertions may be based on (but are not limited to) other existing assertions, hardware, software, event histories, and/or functionalities associated with the node(s) (wherein the hardware, software, event history and functionalities may differ from those used in characterizations).

In accordance with many embodiments the characterization and/or assertion of nodes can be performed by the nodes themselves and/or by other nodes. For example, in some cases, nodes may be used to attest (i.e., make assertions) to one or more aspects of particular node characterizations.

For example, as wallet installation programs install browser-based wallets on computers with TEEs, the installation program may determine the qualities of the platform onto which the wallets are installed, request the associated software from a software provider, and/or request (and/or generate) assertion(s) on aspects of the states of the wallets. These aspects may characterize installed wallets as software wallets, running on specific operating systems, on specified types of hardware platforms. The installer may also identify that wallet systems are protected by anti-virus, and determine the type and version of the antivirus. The manufacturer of the hardware may have generated its own assertions describing the TEE of the platform(s) (e.g., that they include TrustZone modules). The TrustZone modules may be asserted to include a virtual secure processing environment. The secure processing environment may overlap with a non-secure processing environment (e.g., both use the same processor(s), but with different capabilities specified by the mode of operation). Alternatively, the secure and non-secure processing environments may be separate, one for the application processor and one for the secure enclave. In accordance with some embodiments, assertions of nodes can be made by manufacturers. The assertions may be read by entities that provide operating systems and/or kernels, which may in turn assert what kernel the device is running.

As indicated above, in accordance with several embodiments of the invention, assertions and/or characterizations may vary in form. For example, different assertions may be overlapping, e.g., describing the same aspects of the relevant nodes. The assertions and/or characterizations may be time-stamped; using timestamps, systems configured in accordance with certain embodiments may obtain characterizations sequences of state assertions, each one of which might be associated with date/time and/or one or more parties performing the assertion. Assertions, together, may include the characterization of computational environments. Two software modules running on the same device may share large portions of characterization (including but not limited to aspects describing the computational environment and the operating system). They may, additionally or alternatively, have non-overlapping aspects, including but not limited to aspects of individual nodes.

In accordance with many embodiments, entities performing assertions may be associated with reputations. Reputations of asserting entities can be used by parties including but not limited to nodes to determine the quality of the assertions made. The time at which assertions are made can be used to assess the likely quality of the assertion(s). For example, since software and its environment can change rapidly, the time of an assertion may be highly relevant for determining the likely relevance of software assertions.

As indicated above, characterizations may be made before and/or after assertions. For example, some characterizations, made after a first assertion, might have characterization basis that differs from the basis of the first characterization (used for the first assertion). Again, the characterizations of the nodes may be based on one or more of hardware, software, event history, and functionalities associated with nodes. For example, a characterization of a node may be based on hardware, with an assertion being made. Subsequently, an asserting entity (e.g., assertion unit) may be used to determine a (second) characterization of the node based on software that has not previously been done. Further, as the asserting entities may provide assertion(s) of determined characteristics of the node, they can provide the determined characteristic(s) of the node based on software as an assertion of the determined characteristic of the node based on software. In this manner, the asserting entities may provide assertions of characteristics they initially characterized themselves.

In accordance with numerous embodiments, aggregating parties may read one or more assertions associated with environments (e.g., nodes), and generate new assertions describing the node environment and/or the collection of assertions. In accordance with some embodiments, aggregating parties may weigh different assertions differently, based on factors including but not limited to age and reputation. Additionally or alternatively, aggregating parties may be used to resolve conflicting assertions and/or characterizations (e.g., two different assertions of operating system versions, likely due to an update of the operating system at a time between the first assertion and the second assertion). Additionally or alternatively, aggregating parties may probe nodes to determine whether one or more aspects of the collection of assertions is valid. For example, this may be done to determine whether the anti-virus software has been updated by introducing harmless strings that should set off anti-virus defenses due to similarity to known recent viruses.

In accordance with various embodiments, nodes may store assertions and/or references to locations where the assertions are stored. Each assertion may include but is not limited to digitally signed values, where the value describes the observed state and the time of the assertion. In such cases, the digital signature may associate the value(s) with the entities making the assertions and/or reputation scores. The reputation scores for asserting entities may themselves take the form of one or more assertions by yet other parties, including but not limited to customers, aggregators, peers, auditors, security organizations, etc. The reputation scores may alternatively be described as health scores. Reputation scores may be stored locally and/or in distributed manners. Reputation scores may be stored with distributed ledger transactions to indicate real-time and/or recent health checks as they relate to the quality and/or robustness of the recorded transactions. Reputation scoring algorithms may be standardized and/or customized. Reputation scores may indicate but are not limited to trustworthiness and accuracy attributed to asserting entities.

Systems configured in accordance with certain embodiments may involve determining risk scores for nodes based (but not limited to) characterizations, the assertions corresponding to the node characterizations, and/or reputations of the asserting entities. Risk scores may correspond to the risk of particular types of abuse. Risk scores may be determined by scoring entities and/or modules also referred to as "risk scoring units" and/or "scoring units."

Scoring units may access the characterization of nodes and/or the assertions associated with the node and generates scores (e.g., a risk score). Scoring metrics may be personalized to the specific risk scoring units involved. As such, two different scoring units may have different scoring methods, and therefore determine different scores for the same characterizations and/or assertions.

In accordance with multiple embodiments, scoring units may compute arrays of scores for given characterizations. In such cases, the two or more scores in the array can correspond to the risk based on different risk determination methods. Additionally or alternatively, different scores in the arrays may correspond to the assessed risk of a different type of abuse. For example, one type of abuse may be the vulnerability to malware where the malware may perform an unwanted action, and another may be the vulnerability to a malicious contract performing an unwanted action. These scores may different and may depend, for example, on factors including but not limited to the assessed level of protection against malware; the type of TEE that is used, if any; the number of interactions users of the wallet has had with high-risk environments that may be associated with a higher risk of malicious contracts; the number of transactions associated with the node; the use of a conjunctive owner of tokens, etc.

Further, different scoring units may assess risk differently due to different aims: for instance, scoring units used for the purposes of estimating insurance premiums might assign a particular node a high risk (and therefore a high premium price). In contrast, a scoring unit used for assessing the suitability of nodes as transaction partners might take into consideration the fact that the node has already purchased applicable insurance policies and is, therefore, lower risk.

Figure 19:
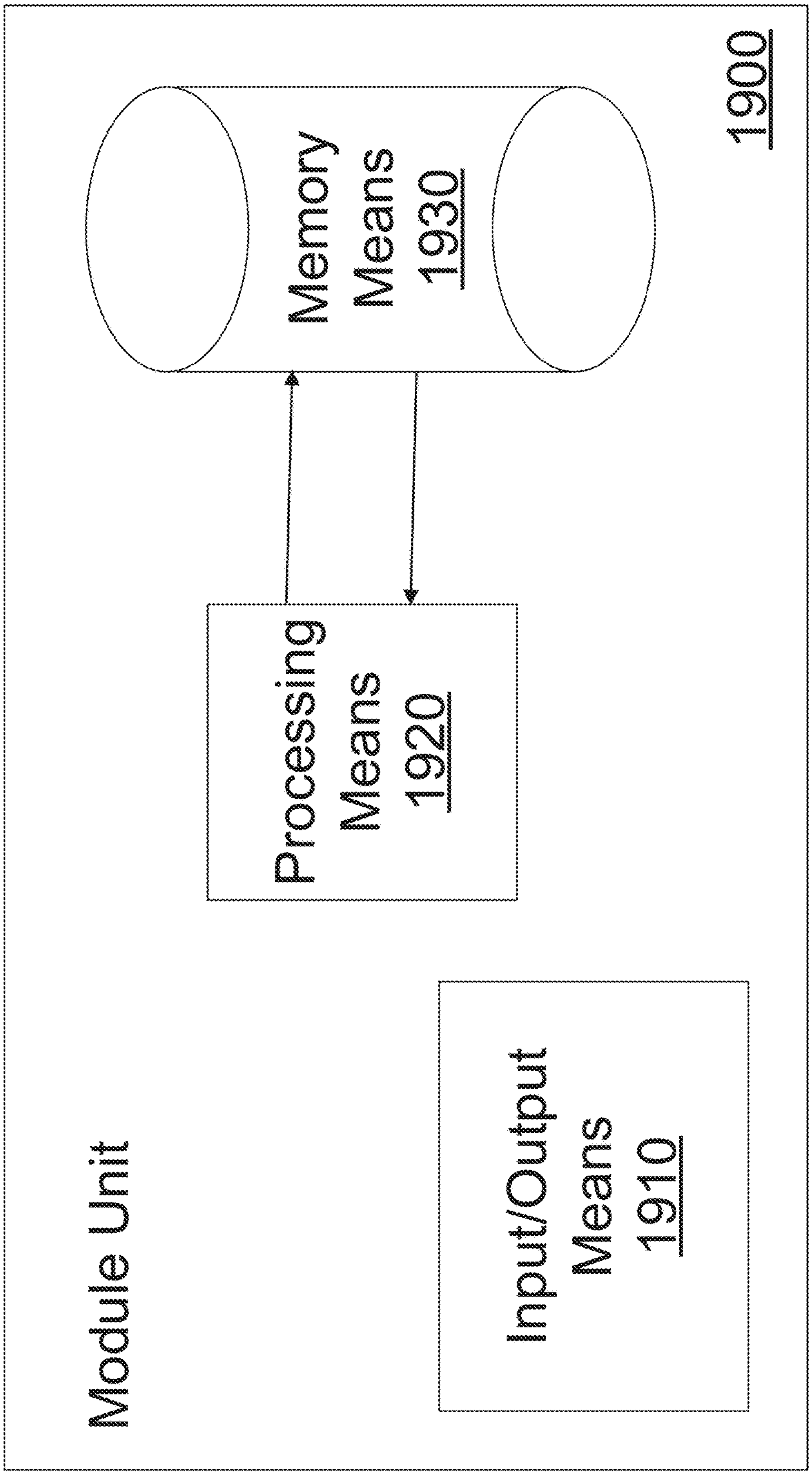
FIG. 19 illustrates a block diagram of module units configured in accordance with numerous embodiments of the invention.

A block diagram of module units configured in accordance with a number of embodiments of the invention is illustrated in FIG. 19. Module units 1900 may include but are not limited to characterizations units, assertion units, and/or risk scoring units. Module units may include input/output means 1910 including but not limited to receivers configured to receive information and/or transmitters configured to provide information to other units, devices and/or entities. FIG. 19 illustrates that module units 1900 may include processing means 1920 and memory means 1930. The memory means 1930 may include instructions, which, when executed by the processing means 1920 causes the module unit 1900 to perform methods configured in accordance with certain embodiments of the invention.

Scores produced by third parties, entities, and/or nodes may be subject to scoring reputations. For example, a 3rd-party organization that scores nodes may be subject to a reputation score of its own. More accurate their scoring techniques may correspond to higher reputation scores and/or greater value for their scoring services. In accordance with some embodiments, risk scores can be consumed by algorithms determining security actions and/or performing filtering actions. Example actions may include but are not limited to ranking and/or blocking. In accordance with some embodiments, risk scores can be presented directly to users, e.g., as meters and/or warnings ("This is a low-reputation service", "This audio file may be a deep-fake").

In an example, user A can sell a token T to reseller B. In a scenario where user A is at high risk for malware attacks, then user A may be considered a high-risk seller in the context of token T. This may make reseller B also a high-risk seller of token T when reseller B tries to resell T to prospective buyer C. Systems configured in accordance with a number of embodiments may invoke the designation of "high-risk seller" onto reseller B because there is an increased risk that user A performed the sale of T to reseller B in response to malware infection. The possibility of malware infection provides a risk to prospective buyer C in transacting with reseller B. Additionally or alternatively, the possibility exists that user A may request to have T returned and/or destroyed, if indeed the token T was transferred to B as a result of malware. As a result, the "high risker seller" designation for reseller B could operate as a warning that a transaction could harm the interests of buyer C, and therefore make the purchase by prospective buyer C of token T from reseller B undesirable. This risk may further increase due to other anomalies that are correlated with higher risk to C, including but not limited to the purchase price paid by the reseller (B) being anomalously low, and/or the duration of time before the acquisition of T by reseller B and the sale of T by reseller B being especially short.

In accordance with many embodiments, the determination of risk can be made using Artificial Intelligence (AI) and/or Machine Learning (ML) components, which may be part of the scoring units and/or work in parallel with scoring units. For instance, classifiers and/or module units may use algorithms including but not limited to neural networks, support vector machines, and/or AdaBoost to categorize nodes as low, medium, and/or high risk.

Additionally or alternatively, neural networks and/or algorithms could be used to create regression models that assign risk probability and/or real-valued risk scores. Such classifications and/or regression models may, in accordance with numerous embodiments of the invention operate on features including but not limited to those mentioned above. These features may include but are not limited to assertions about the nodes, histories of these assertions (e.g., capturing how they may have changed over time), and/or event histories associated with nodes (that may be computable from available ledgers. Such models can be trained using real-world datasets compiled to include (but are not limited to) examples of nodes determined to be (un)compromised, transactions that are known to be (non)-fraudulent, etc. Additionally or alternatively, models can be trained on synthetic data that are constructed to exemplify known and/or suspected patterns of risk; real-world data that is augmented with synthetic variations, and/or data representing combinations of these approaches.

In accordance with certain embodiments of the invention, multiple classifiers and/or regression models may be used in conjunction with each other. In some instances, different classifiers and/or models may be used for modeling different facets of risk. Such models could be combined, where for instance models capturing multiple facets each inform downstream models that synthesize these estimates into a single risk score. Additionally or alternatively, the output of one or more machine learning models may inform other downstream processes which themselves do not involve subsequent machine learning (and which may additionally take other considerations into account).

In accordance with some embodiments of the invention, risk scoring may be used for calculating insurance premiums relating to insurance policies for handling digital assets associated with nodes. The result may be the insurance premium relating to the insurance policy for the nodes when the nodes are handling the digital assets. Handling the digital assets may include but is not limited to for example trading the digital assets. There may be many different examples of using the provided and/or determined risk scores of nodes as is exemplified below.

In accordance with a number of embodiments of the invention, risk scores can be used to generate estimates for cyber insurance premiums and coverage. This may be utilized to protect organizations against abuse. Insurance may be expressed as assertions (e.g., by the insurance company) and can be used by parties considering interacting entities to obtain information including but not limited to the risk profile, the liability issues, and the potential coverage of the insurance to transactions under consideration.

In accordance with various embodiments, insurers may generate risk scores from one or more characterizations and/or determine premiums for specified coverage. For example, certain nodes may include software wallets running on cellular phones, wherein the wallets store private keys in secure storage (e.g., only accessible in plaintext format by certified processes running in TrustZone). This information can be expressed in characterizations of the nodes and may lead insurers to generate scores on their own scale (e.g., 32 out of 100).

The insurers may determine the score based on, but not limited to the use frequency of the wallets. Use frequency may be estimated by the number of transactions the wallets are known to have been associated with. These associations may be determined through means including but not limited to records available on blockchains and/or records captured by DRMs running on the hosting devices (e.g., cellular phones).

Further, insurers may determine that users with usage frequency and/or risk scores within certain thresholds carry specific danger likelihoods (e.g., malware, phishing). For example, in the above example, the insurer may determine that tokens with risk scores between 30 and 40 and/or average usage frequencies of 0.8 uses/day are known to be associated with a malware risk of 0.24% and a phishing risk of 0.072%. Specific danger likelihoods may be determined by looking up actuarial tables accessible by the insurers.

Based on risk scores, usage frequencies, and/or danger likelihoods, the insurers may offer users of the associated nodes wallets specific insurance offers. For example, a $100/month insurance product may be offered that covers malware attacks only, and has a deductible of $250. Additionally or alternatively, a $120/month insurance product may be offered that covers both malware attacks and phishing attacks, and which has a deductible of $200. The insurance offers may be contingent on factors including but not limited to the tokens being held. For example, the above insurance products may be contingent on the wallets not having tokens worth more than $12,500.

Upon finding that thresholds are exceeded insurers may update the premiums and/or deductibles accordingly. Adherence to the thresholds may be monitored by inspecting transfer agreements on blockchains and/or receiving information from the DRMs associated with the wallets. When the thresholds are exceeded, the new premiums/deductibles may be automatically offered to the users. Additionally or alternatively, users may be expected to directly agree. When they do not agree to modify the policy within pre-set amounts of time, systems configured in accordance with some embodiments of the invention may limit the coverage accordingly to threshold amounts (e.g., the maximum value of the covered tokens under the policy of the purchased insurance).

Systems configured in accordance with many embodiments of the invention may be induced to automatically collect evidence, on behalf of insurers. The collected evidence may be associated with events related to insured parties and/or parties potentially wishing to purchase insurance. Evidence associated with events related to insured parties may allow automated mitigation of risks by insurers. Additionally or alternatively, systems can convey warnings, recommendations and/or parameters useful for protection to nodes associated with the insured parties, which may be based on observed events that are associated with risk. The observation and collection of evidence, additionally or alternatively, helps the insurers determine the most appropriate insurance products (and corresponding pricing) to offer users. The users of these systems may include but are not limited to individual entities, organizations, and/or processing entities.

In accordance with certain embodiments, risk scores can be constructed so as to explicitly estimate the probability of loss. In this case, premium values may be determined by computing functions parameterized by the loss probability. For instance, systems configured in accordance with certain embodiments may perfuse the loss probability and policy amount to compute the expected value of the policies. Additionally or alternatively, systems may add profit margins to determine the premium.

In accordance with many embodiments, risk scores may be computed as scalar and/or vector values. In some cases, each element of the risk scores may parameterize more complex functions. For instance, elements may be used to set the priors and/or parameters of one or more statistical models. These models may reflect but are not limited to aspects of the probability of loss, the probability of the company honoring the policy given a loss, the probability that potential customers are willing to pay particular premium amounts (given their profile and competitor offerings available), etc. Such functions may be used in the computation of premiums including but not limited to choosing premiums that maximize the expected income for the companies. Additionally or alternatively, the risk scores may inform the selection of one or more appropriate models for computing the premium, out of sets of candidate models.

In accordance with multiple embodiments, risk scores can be used to determine what entities should evaluate and/or process data. The evaluation of data may be based on quality of service requirements stated in smart contracts of tokens. The smart contracts may, for example, require processing (e.g., for transfer of ownership rights and/or escrow of identifying information) of parties in the upper tenth percentile of service providers. Additionally or alternatively, the smart contracts may require processing of parties within specified niches matching the needs stated in the smart contracts. The rankings (e.g., the determination of whether an entity belongs in the upper tenth percentile) may be performed based on the risk scores of the entities.

In accordance with some embodiments, risk scores can be used by search engines and/or recommendation engines to determine both risk of abuse and the risk that services would fail to live up to their stated standards. Risk scores can be used to reflect the quality of the service in general, and as such, be helpful to rank the quality of services to users. In accordance with certain embodiments, the quality of service can be combined with the price of the service to create tiers of service providers matching the needs of given users and/or situations. This may be used to enable automated selection and/or ranking of options.

In accordance with several embodiments, risk scores can be employed in user interfaces and visualizations to support human decision-making and/or analysis. For instance, user interfaces for token marketplaces may display the risk score of seller wallets alongside other information relevant to tokens for sale.

In accordance with numerous embodiments, risk scores may indicate whether content associated with tokens is likely to meet certain personal requirements including but not limited to being original, valid, non-modified, etc. For example, risk scores may indicate the probability that given audio and/or movie content associated with NFTs are deep-fakes, e.g., based on analysis of the content. Such analysis may include but are not limited to: Fast Fourier Transform (FFT), determinations of the extent of a match with known voice models (e.g. audio fingerprinting), determinations using machine-language (ML) classifiers and/or an Artificial Intelligence (AI) classifiers (indicating similarity to known content and/or the presence of artifacts known to be associated with deep-fake techniques), and/or the computation of the extent to which an image and/or video matches "fingerprints" of known cameras.

In accordance with various embodiments, characterization can similarly be used for other purposes than computing risk scores. For example, the characterization of nodes may be used to determine whether given types of content are allowed to be accessed by the nodes. Some tokens may carry and/or correspond to content that may only be rendered by DRMs satisfying some minimum security requirements and/or running in TEEs satisfying certain minimum requirements. In such cases, the characterization may reveal to assessing nodes, with access to such tokens, whether other nodes are allowed to render such content based on the characterizations associated with the other nodes. The other nodes may include but are not limited to monitors (where some monitors may include TEEs including but not limited to TrustZone) and/or run DRMs certified by consortiums that assess DRM levels of security. The other nodes may, additionally or alternatively, be nodes without any associated security assertions in the form of characterizations from entities that have sufficient reputations with the assessing nodes for them to accept the other nodes as being in compliance with requirements associated with the content of the tokens. The assessing nodes may, in such situations, refuse to transmit the content to the other nodes, and/or transmit reduced-quality versions of the content. In such cases, access may be permitted by terms of service associated with the content.

Different and potentially competing organizations can perform different risk scorings based on the available characterizations, and/or provide entities access to such risk scorings. These risk scores may be based on (but are not limited to) APIs to proprietary databases, by purchasing access to decryption keys used to decrypt publicly logged encrypted risk scores which may be stored on blockchains, etc. The risk scores can be computed on the fly, in response to requests by parties that have purchased subscriptions and/or have one or more tokens (including but not limited to NFTs) that provide access rights to risk scoring oracles. In accordance with some embodiments access can be metered and/or flat-fee by members.

Different entities may contribute characterizations to nodes. The characterizations may be subjective and/or based on particular perspectives. They can, additionally or alternatively, attempt to be objective. For example, characterizations may simply recount observed events associated with nodes. Entities, including but not limited to virus scanners may generate characterizations of nodes (such as wallets and the hardware on which they run). In such cases, the characterizations may indicate what tests were executed on the nodes, and their results. Entities, which may be virus scanners, may perform other tests and contribute different characterizations. Some entities may have capabilities including but not limited to determining the extent to which users of the wallets have certain interests (e.g., K-pop) and/or creating characterizations of the same wallets (which may be based on information including but not limited to determined browsing behavior, determined purchase behavior, and determined reports from DRM module associated with the wallets).

Similarly, in accordance with many embodiments of the invention, different entities may generate different scores. Some entities may generate risk scores based on one or more characterizations, including but not limited to the virus scan characterizations described above. Various entities may generate scores used by advertisers to select to whom to offer prompts (e.g., music NFTs and/or offers for concert tickets, which may, additionally or alternatively, be encoded as NFTs). Scores may use characterizations related to music taste (including but not limited to the characterizations of interest in K-pop described above), as well as other characterizations related to lifestyle matters. Certain characterizations of lifestyle matters may be relevant for the determination of risk scores themselves Characterizations and scoring, as described above, may be utilized by nodes configured in accordance with several embodiments of the invention to determine relative levels of risk including but not limited to investment risk, security risk, and/or safety risk. For instance, wallets may receive indications of transaction approval that they perceive as risky based upon scoring (e.g., its own scoring, and/or 3rd-party scoring) of the assets and/or their provenances. The wallets may utilize this information to alert transaction-approving entities of unusual levels of risk associated with the particular assets and/or transactions.

Nodes can be characterized by entities including but not limited to the tokens, associated content, and descriptions of the tokens and/or content. Descriptions may include but are not limited to classifications of the tokens and/or content into one or more categories, the cost of the tokens and/or content, the price and ownership history of the token and/or content, and one or more genres associated with the content.

Based on determining similarity between nodes in terms of their consumption of content, acquisition and sale of tokens, and the classifications of the associated tokens and content, AI and/or ML can determine similarity measures between different nodes.

Additionally or alternatively, causal relationships may be determined based on information including but not limited to what the users actively search and/or are exposed to, information on their recommendation feeds; expression of interests by the users in related content and/or tokens; and/or acquisitions of related content/tokens by the users. Such causal relationships may be relevant for purposes of predicting future interest in acquisitions of tokens and content. In accordance with many embodiments, the interest may be based on exposure to content and/or expressions of interest in tokens and content. Based on this, and on similar assessments between nodes, recommendations can be made to users in forms including but not limited to displays of advertisements in the context of content being viewed and/or gifting tokens to wallets associated with such users.

In accordance with many embodiments of the invention, security assessments of nodes, represented as one or more scores, can be made based on associated tokens and/or risk. Risk associated with tokens can be determined based on methods including but not limited to correlation methods, ML and/or AI methods, and rule-based techniques (wherein risk scores may be assigned to tokens and content of certain categories, valuations, valuation history and trends, genres, content creators, and/or ownership histories). When token ownership histories are correlated to nodes that have been identified to have had security lapses, the token may be considered related to these lapses. Tokens may be designated security risks due to assumptions that they may be associated with malware, malicious contracts, content causing danger, and/or express correlations of risky user behavior. Similarly, two different tokens created by the same entities may be associated with the same type of risk, allowing inferences of risk for tokens based on the determined risk associated with other tokens.

In accordance with some embodiments, certain wallet types may be considered to have inherently more security risk than others. In one example use situation, requests from browser-based wallets may be associated with higher risk than requests from hardware wallets. The term "hardware wallet" refers to trusted execution environments (TEE) with single-purpose use, namely the execution of wallets wherein users cannot install apps. Such hardware wallets may be associated with lower risk related to malware and social engineering than browser-based wallets that may include but are not limited to plugins, toolbars, and/or web pages rendered in browsers. Different browser-based wallets may, additionally or alternatively, have different risk scores.

In some instances, the difference in security may invoke benefits for users of different wallets. For example, hardware wallets may be allowed to borrow NFTs for free from service providers, but browser-based wallets may be required to pay insurance premiums to get access to the NFTs. This insurance premium may be paid to offset the risks taken by the NFT owners, the NFT content creators, and/or other associated parties. An example may be the copying of copy-protected content by malicious wallets.

Assertions of nodes configured in accordance with several embodiments of the invention may correspond to recommendations by users. The nodes may be physical entities and/or logical entities, and may correspond to the provision of service. The nodes may be associated with staking and/or the votes (e.g., statements and/or assertions) of other nodes that are staking. In accordance with many embodiments, where votes relate to statements and assertions made by the nodes, the votes may be used as inputs to determine assertions of the nodes. Using these assertions, characterizations of the nodes can be determined, for instance, as summaries of multiple assertions and/or characterizations.

In accordance with various embodiments of the invention, summary characterizations may be generated from characterizations of nodes. The summary characterizations may be based on but are not limited to characterizations by different parties, on the reputations of these parties, and/or on the times of the characterizations. Additionally or alternatively, the underlying characterizations may potentially conflict with each other. The summary characterizations may be associated with time and sets of parties that agree, wherein the agreements may achieved using consensus mechanisms. Consensus mechanisms may refer to situations where one party declares summary characterizations for nodes and collections of other parties vote to agree with the characterization. In accordance with some embodiments, the constituent parties of consensus mechanisms may each have staked some resource. The summary characterizations can be expressed as tokens and/or as statements entered on blockchains. In such cases, adding entries to the blockchain can be made by the collection of parties involved in the consensus mechanism. The staking may use techniques disclosed in PCT Patent Application No. PCT/US23/62851, titled "Systems and Methods for Abuse Safeguards in NFT-Directed Environments," filed on Feb. 17, 2023, incorporated by reference in its entirety.

User accounts configured in accordance with various embodiments of the invention may take the form of nodes that can be characterized by one or more different entities. As indicated above, the characterizing entities may include but are not limited to digital rights management (DRM)

modules associated with wallets used to access and/or manipulate the user accounts.

User accounts can, additionally or alternatively, be characterized by service providers. For example, the service providers may indicate the types of requests, interests, genres, etc., that are associated with the account. This can be done in privacy-preserving manners (e.g., without knowledge of the identities of the user(s) associated with the account). Characterizations by service providers can, additionally or alternatively, be done in semi-privacy preserving manners, wherein aspects of the user(s) personal information may be considered as input to the entities performing characterizations of the nodes. In such cases, the characterizations can exclude personally identifiable information like names.

Further, privacy-enhancing techniques may be used that enable the incorporation of personal preferences and behavior of characterizations. Such incorporations can be performed by trusted entities (including but not limited to the DRM module associated with user wallets, browser plugins, and/or consumer ombudsmen). The use of the characterizations may additionally balance the need to know about the consumers of information in order to provide helpful recommendations and advertisements, with the needs of the associated users to not reveal personal information to advertisers, non-trusted entities, and/or entities that the users fear could be breached.

Tokens configured in accordance with various embodiments can be associated with characterizations. In accordance with some embodiments, prospective token characterizations may refer to classifications including but not limited to ratings and/or genres of content.

Filters may be used to organize token characterizations, make determinations including but not limited to the tokens that can be accessed, the wallets that can access them, etc. These determinations may be based on but are not limited to the characterizations of the tokens, risk scores of the tokens, and/or associated characterizations of the wallets. One such filter may take the form of watchful bridges that can be used to determine the transfers of ownership that are legitimate (in compliance with rules, laws and terms of service). Such filters may account for characterizations of tokens, wallets, and/or users. The disclosed technology applies to many types of nodes, including but not limited to wallets, watchful bridges, miners, consumer hardware devices, service providers, etc. Watchful bridges are disclosed in the PCT Patent Application No. PCT/US23/62851, titled "Systems and Methods for Abuse Safeguards in NFT-Directed Environments," filed on Feb. 17, 2023, incorporated by reference in its entirety.

In accordance with numerous embodiments, service providers may assess characterizations and/or score(s) associated with entities (e.g., reputation scores) in order to make various service determinations guiding service. Service determinations may include but are not limited to determinations of service type, service level, and/or service content based on characterizations and/or scores. The services provided by the service providers may include but are not limited to alerts that nodes, including but not limited to wallets are at high risk for malware abuse; verifications that the nodes are likely to be operating in secure environments, etc. These services may, additionally or alternatively, determine whether the service providers can transmit sensitive content to the nodes. An example of such sensitive content may be copyrighted material, including but not limited to movies and/or songs. The services, additionally or alternatively, may involve the selection of advertisements to be integrated with content requested by the nodes and/or associated users.

In accordance with a number of embodiments, the characterizations of nodes may be associated with the nodes' public keys. This may occur when the characterizations are static and/or can be made prior to the certification of the nodes' public keys. Some such certifications may expire, after which parties may extend the lives of the certifications and/or issue new certificates. These new certifications may happen after performing (e.g., through service providers) inspections of the nodes. These inspections may be performed in order to determine whether the nodes have been modified from previous states. One example modification may refer to a change of hardware components. Another example modification may be infection by malware.

In accordance with certain embodiments, nodes may additionally or alternatively be associated with identifications of the type of digital rights management (DRM) modules they use. Associations of this type may be made by incorporating identifying information in certificates and/or creating characterizations that are stored in publicly accessible manners. The publicly accessible characterizations may reference and/or be referenced by descriptors of the nodes having the DRM modules.

Characterization, assertion, and risk scoring units configured in accordance with various embodiments of the invention are not limited to use within NFT platforms. Accordingly, it should be appreciated that the modules described herein can also be implemented outside the context of an NFT platform network architecture unrelated to the maintenance of modules. Moreover, any of the systems and methods described herein with reference to FIGS. 18-19 can be utilized within any of the NFT platforms described above.

Blockchain-Based Control and Data Channel Methods

One aspect of the disclosed invention is a technique for a first party to convey control information and/or data to a second party, where the second party may be and/or may be associated with a wallet and/or another application, a device, a token and/or a process. We refer to the first party herein as the service provider and/or the sender, and the second party as the recipient. Both parties may also be referred to as "nodes". A node may act as a sender with respect to one communication and as a recipient for another communication.

Methods in accordance with some embodiments may use a sending node for providing a message to a recipient node being an owner of a digital asset, the recipient node being associated with an identifier. This may involve retrieving the identifier of the digital asset, wherein the identifier may be associated with the recipient node, wherein the identifier may be retrieved from a blockchain. This may then allow systems configured in accordance with certain embodiments to write messages (associated with retrieved identifier) on the blockchain.

Figure 20:
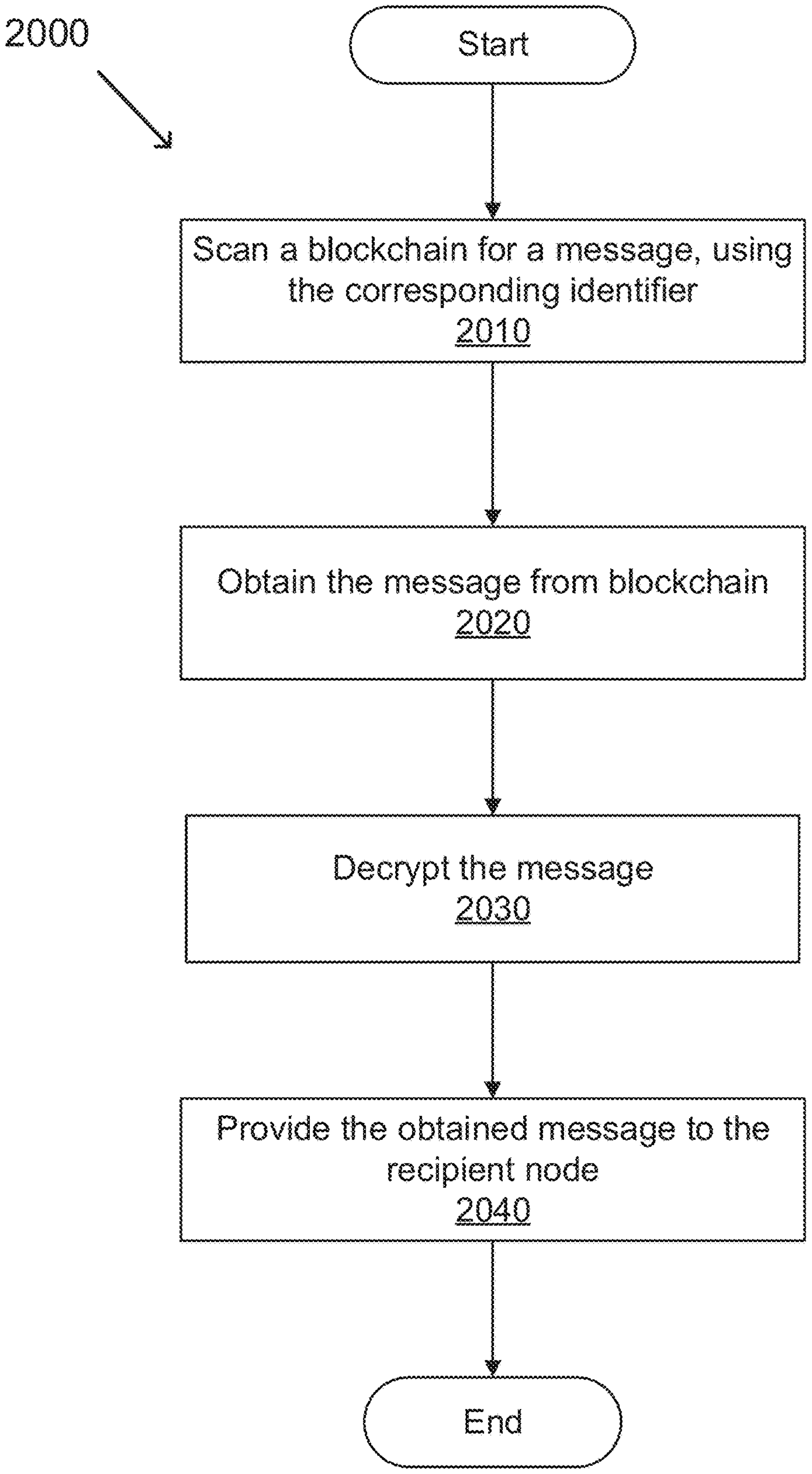
FIG. 20 illustrates a method for retrieving messages configured in accordance with various embodiments of the invention.

A method for retrieving messages configured in accordance with various embodiments of the invention, may be illustrated in FIG. 20. Process may be performed by a retrieving node configured and/or intended for a recipient node associated with an identifier. Process 2000 scans (2010) a blockchain for the message using the identifier. Process may, additionally and/or alternatively, use a hash function on the identifier and scan using the identifier hash. Process 2000 obtains (2020) the message from the blockchain. In accordance with some embodiments, the retriever node may be the same as the receiver node. In situations where the retrieving node may be different from the receiving node, the process 2000 may provide (2040) the retrieved message to the receiving node. Modes to provide the retrieved message to the receiving node may include but are not limited to direct sending, providing access, and/or transmitting reference to the receiving node.

When the message may be received, process 2000 decrypts (2030) the message, at least in part. In accordance with a number of embodiments, message may include one or more tokens, in a payload component. The payload component may also include non-token data, such as an email message, a content update to be applied to a token, instructions to be executed by the recipient device, a digital signature that identifies the authenticity of the message with respect to a public key of a digital signature creator. Parts and/or all of the payload may be encrypted, e.g., using the public key associated with the recipient. In some embodiments, the payload includes two parts, where the first part includes elements such as those described above, and which may be encrypted using a symmetric key, and a second part which includes the symmetric key encrypted using the public key associated with the recipient. This encryption structure corresponds to what may be sometimes referred to as hybrid encryption While a specific process for retrieving messages may be described above, any of a variety of processes can be utilized as appropriate to the requirements of specific applications. In various embodiments, steps may be executed and/or performed in any order and/or sequence not limited to the order and sequence shown and described. In many embodiments, some of the above steps may be executed and/or performed substantially simultaneously where appropriate and/or in parallel to reduce latency and processing times. In numerous embodiments, one or more of the above steps may be omitted.

The sender may, for example, be a service provider such as an anti-virus company, and the recipient may be a wallet and/or another application, and/or a device; the transmitted message may be a notification, alert, and/or control message that informs the recipient that there may be a patch to be installed, and provides an address of where the patch may be available. The recipient may have an address such as a public key that may be associated with the wallet and/or other application. The address may also be a URL identifying a server to which requests can be sent, and/or an email address. In some embodiments, a portion of the address may be used to determine how to communicate with the recipient, and another portion including a public key used for encryption, and/or a reference to either of these. A public key may be used not only to address the message to the intended recipient, but also to encrypt the contents of the communication in a manner that can only be decrypted by the recipient, where the recipient holds a private key associated with the public key used as the address. Thus, a sender can convey a message to a recipient by writing to a blockchain, where the data being written may be encrypted, and where it may be addressed using an address and/or other identifier. An identifier does not need to be unique to one entity, but may be associated with a collection, such as a group including all employees of a company, all users of a service, all members of a family, and/or all wallets of a set of associated wallets, where one hot wallet and one cold wallet belonging to the same person may be associated with each other in that the hot wallet may have access rights to content of NFTs, and the cold wallet has rights to transfer ownership of the NFTs. The recipient does not need to be a wallet, but could be another token, a service provider, and/or a collective including at least two entities that need to collaborate to decrypt encrypted content, and/or to transfer the ownership of the message, where applicable. Ownership of a message can be transferred, for example, in situations where the message may be and/or includes a token, such as one or more NFTs and/or one or more crypto payments. The recipient may be and/or include a proxy, such as an escrow agency.

The recipient may also be an anti-virus software unit running one on or more computers, and the message may be a patch. The one or more computers may all use the same public key to determine what messages are for them. The message can be encrypted using this public key, for which each of the recipient computers has a private key. Alternatively, the message can be encrypted using a pre-shared group key, which can be modified over time to account for the changing of the group of recipients.

The sender may correspond to a user wishing to buy a non-fungible token (NFT) that may be not listed as for sale, where the sender may not know the identity of the owner; by sending a message requesting to purchase the NFT, with the recipient being the NFT, the offer (i.e., the message) can be presented to whoever has access to the NFT. In this example, the recipient may be addressed using the public key associated with the NFT. Like other messages, it may be encrypted, wherein the recipient may be able to decrypt the message using the private key associated with the public key used for addressing it, and/or another key. The message may include a human-readable component, such as a text describing a wish to purchase the NFT, and a control component such as a payment that may be conditional on the recipient approving the offer, as described in an associated smart contract. When an NFT changes hands, e.g., its ownership may be transferred as the result of a sale, then it becomes associated with a new private key/public key pair, wherein the new public key can be used to address the NFT by parties wishing to communicate with its owner.

In another example use, a party such as a content creator may wish to communicate with a token, such as an NFT, but not for purposes of making an offer to buy the token, but instead to issue an update related to the NFT. An example of such an update may be a modification that may be due to an evolution event. Evolution may be described, e.g., in U.S. patent application Ser. No. 17/929,894, titled “Methods for Evolution of Tokenized Artwork, Content Evolution Techniques, Non-Fungible Token Peeling, User-Specific Evolution Spawning and Peeling, and Graphical User Interface for Complex Token Development and Simulation,” filed Sep. 6, 2022, incorporated by reference in its entirety. A message prompting an evolutionary change may include a control part, such as instructions of what actions to take, and a data part, such as an image, a sound file, and/or an address indicating where to obtain further information, whether control information and/or data such as content data.

Methods of associating public keys with nodes are disclosed in U.S. patent application Ser. No. 17/810,741, titled “Systems and Method for Providing Security Against Deception and Abuse in Distributed and Tokenized Environments,” filed Jul. 5, 2022, and U.S. patent application Ser. No. 18/323,344, titled “Systems and Methods for Facilitating Access to Token Content,” filed May 24, 2023, incorporated by reference in their entirety. One can use traditional public key cryptography in this context, and/or Identity-Based Encryption (IBE), which was disclosed in the 2001 publication “Identity-Based Encryption from the Weil Pairing” by Dan Boneh and Matt Franklin, available at https://crypto.stanford.edu/~dabo/papers/bfibe.pdf, incorporated by reference in its entirety. Using IBE, the public key may be any unique identifier, such as an email address, a Unique Device Identifier (UDI), a webserver and a storage location identified by a URL, a cell phone number, and/or a social security number.

Each tentative recipient, which may be a node, may periodically check whether there are any pending messages for it. This can be done by running a process that scans relevant blockchains, which may be specified in the configuration of the node and associated with the node's public key, to determine whether there are any entries using the public key, and/or functions thereof, as a label, and to collect any such blockchain entries, when found. The process may be run by the node, and/or on behalf of the node. For example, for a node that may be a wallet, the message-check process may be run every time the wallet may be started, and then, during periodic intervals while being operated, such as every 20 minutes. The message-check process may also be run by another entity, such as a bounty hunter, and provided to a computational unit associated with the node along with a wake-up signal and/or other alert, when found. Bounty hunters are disclosed in U.S. Pat. No. 11,017,036, titled "Publicly Verifiable Proofs of Space (Continuation of Publicly Verifiable Proofs of Space" issued May 25, 2021 and U.S. patent application Ser. No. 17/808,264, titled "Systems and Methods for Token Creation and Management," filed Jun. 22, 2022, incorporated by reference in their entireties. Additionally and/or alternatively, bounty hunters may be used to enforce reporting requirements, fact finding, and more. For a software node, such as an application, the message-check process may be run by a process on the hardware on which the software node may be executed; this may be multiple devices, it may be a cloud hosted service, it may be a consumer device such as a phone, and/or may be a dedicated device, such as a hardware wallet device. In some instances, the message-check process may be run immediately when a node may be provided a network connection, and then, periodically onwards according to a timing schedule that may be set by a user of the node.

A message-received functionality can be obtained by using, in the encrypted message sent in one of the ways described herein, a one-time URL that points to a location including the contents of the message to be conveyed. As this address, which may be controlled by the sender and/or a party associated with the sender, may be probed, e.g., a request may be sent to it, then this triggers a notification that the message has been received. The URL may be preferably sufficiently long and of an unpredictable format, making it not practically feasible for parties other than the intended recipient to guess the URL. Alternatively, access of the information may require the knowledge of a private key, e.g., for purposes of authenticating the request, for a response to be served and the message-read notification to be generated; in multiple embodiments where this approach may be taken, multiple recipients may be sent the same URL, and the request by each one of them will generate a log entry indicating that the public key of the recipient having requested the content behind the URL.

The disclosed mechanisms can be used to distribute advertisements and other promotional content, such as discount coupons and other offers. A conversion of an advertisement may be determined by the rate of message-read notifications, each one of which can be associated with a known profile associated with the node generating the message-read notification by requesting the content. A conversion may also be determined by actions taken, e.g., by the node, on the content being conveyed, at least in part by sending the message as described herein.

In certain embodiments, the message contains a transfer of ownership of a token to the recipient. The recipient may be a token and/or a process, as described above, in which case ownership may be understood as an augmentation of the recipient, e.g., in the context of evolution wherein the ownership of an image, by an NFT, may be understood to mean an incorporation of this image into the content of the NFT, which may be a form of evolution. In this example, the message may also contain instructions indicating the manner of incorporation of the image into the NFT to which ownership may be assigned. This process may also be used for other modifications of tokens, including the destruction and/or recall of NFTs, wherein the update may include instructions that block the use and/or transfer of the NFT to which the update may be transmitted. Since any tentative buyer of an NFT can identify all tokens, including such updates, that are assigned by authorized parties (such as the token content creator), these tentative buyers can determine the presence of such a destructive order, independently of whether the current owner of the NFT has enabled the application of these updates and/or not.

A message sent to a token may correspond to a notification of new content, and be sent, e.g., to a token corresponding to a subscriber, e.g., of news, entertainment, etc. There may be multiple subscribers. Tokens may be sent to a group of recipients corresponding to a social network, where the recipient nodes correspond to applications with user interfaces used to display messages on the social network, and where these messages may be, include and/or reference NFTs, and where such NFTs may include content such as audio and video, and/or instructions as part of an executable component, and/or both. Tokens, such as derived tokens, as described in U.S. patent application Ser. No. 17/808,264, titled "Systems and Methods for Token Creation and Management," filed Jun. 22, 2022, incorporated by reference in its entirety, may have a requirement to communicate with one another. For example, a token representing entrance into an online casino may require access, and/or messaging capability, with a biometrically enabled token such as one representing a driver's license for age verification.

One way of assigning a token may be to write a message including the token to a blockchain. The message may include an address, such as a public key and/or other identifier of the recipient of the token, and/or a deterministic function of this such as the output of a hash function, such as SHA256, taking as input the public key and/or other identifier.

As disclosed in U.S. patent application Ser. No. 18/323,344, titled "Systems and Methods for Facilitating Access to Token Content," filed May 24, 2023, incorporated by reference in its entirety, a first node may own a second node, where the second node may own a third node. Such a chain of ownership may be of any length. In a context where node A (which may be a wallet) owns node B (which may be an NFT), and where node B owns node C (which may be another token, such as a cryptofund token), then depending on the access rights, node A may have access to the cryptofunds of C, via its ownership of B. Node C may also be a process that may be assigned to node B (the NFT in this example), and wherein this process may either operate on the NFT (node B) and/or be used in the environment of node A (the wallet), by node A and potentially independently of the execution and rendering of node B. Consider a message, which we may refer to as D, which may be sent to the address of C, whether C may be a cryptofunds token and/or a process to be used by nodes A and/or B. Here, D may be a message for the user of wallet A, such as a product offer, based on this user's (indirect) ownership of C. It may be a service update from a trusted party associated with the creator of C and compatible products, where the service update may add a feature to A, B and/or C; and/or where the service update corresponds to a security patch for one or more of the environments corresponding to nodes A, B, and C. D may also correspond to a message from authorities that token C was transferred to be owned by B without any payment of royalties and/or any proof, by the new owner and/or associated party, that no such royalties are due. For example, lateral transfers which change ownership from one token to another token owned by the same wallet may not require the payment of royalties; in such a case, the wallet A may convey evidence of the ownership transfer being such a lateral move, to an entity indicated in the message D.

A user can set up a privacy enhancing communication channel by indicating a node C to which a user wishing to communicate with him may send messages, such as the message corresponding to node D, and wherein the ownership of C by B, and of B by A, corresponds to a level of indirection. One of the nodes, such as B, may also be co-owned by two entities, such as A1 and A2, in which case a message D sent to C, where C may be owned by B, will eventually be delivered both to A1 and A1. Many other graph structures can be used, as disclosed in U.S. patent application Ser. No. 18/323,344, titled "Systems and Methods for Facilitating Access to Token Content," filed May 24, 2023, incorporated by reference in its entirety, enabling novel methods for efficiently conveying information to a group of nodes, where nodes may correspond to a variety of computational entities.

The semantics of ownership may be fixed and/or may be defined in the association between a node A and a node B, where A owns B. For example, in this assignment, it can be clarified what ownership entails. For example, assume A and B correspond to wallets, and A may be a parental wallet and B may be a dependent (or child) wallet. The ownership of B by A may mean that B can see and use some contents of A that are selected by a user of A, e.g., using a drag-and-drop interface as disclosed in co-pending U.S. patent application Ser. No. 18/155,662, titled "Crypto Wallet Configuration Data Retrieval," filed Jan. 17, 2023, incorporated by reference in its entirety. Authorized users of wallet A can define predicates such as right to access, right to transfer, etc., with respect to one or more dependent wallets that are associated with wallet A, e.g., by means of ownership. Both wallet B and C may be owned by wallet A, but may have different rights. Wallet B may be a dependent wallet with partial access, but wallet C may be a peer wallet with full access to content accessible by wallet A. Wallet A and B may express ownership of each other to express bi-directional access rights, which may be of different types. This expands on the functionality and graph structure expressed in U.S. patent application Ser. No. 18/323,344, titled "Systems and Methods for Facilitating Access to Token Content," filed May 24, 2023, incorporated by reference in its entirety, incorporated by reference in its entirety, by not needing to correspond to a directed acyclic graph. When such a cycle may be detected, it may be preferably evaluated in a manner that avoids loops, e.g., recognizing when a full cycle through a loop has been performed and avoiding a second loop through the graph.

In one example, a node A owns a node B, and the node B owns node C. Node C includes specifications, such as a smart contract, instructions and/or references to instruction, indicating three actions to be performed by its owning node (B). We may refer to these actions as action1, action2 and action3; these may be classified into types type1, type2 and type3. Example types include but are not limited to updating instructions and/or data of the owner node (B), updating instructions and/or data of any node above the token C in the ownership hierarchy (in this case A and B), updating a reference, performing a payment, and performing a conditional action. Node B may include specifications identifying what types of actions that can be initiated on it by tokens it owns; it may, for example, allow type1 and type2 actions, but not type3 actions. It may allow some actions, such as type4 actions conditional on the issuer of the associated action, where an issuer may be the party that transfers the associated node to it, the party that created the associated token, and/or the identity of a party that certified the token. At the same time, node A may have further limitations identifying what types of actions it will allow within its environment. For example, while node B may allow type1 and type2 actions, node A may not allow type1 actions. When node B operates, e.g., executes, in the environment of node A, that means that only the type2 actions from node C will be performed on node B when in this environment; when node B may be later transferred to another node, and associated environment, other actions may be performed then.

Figure 21:
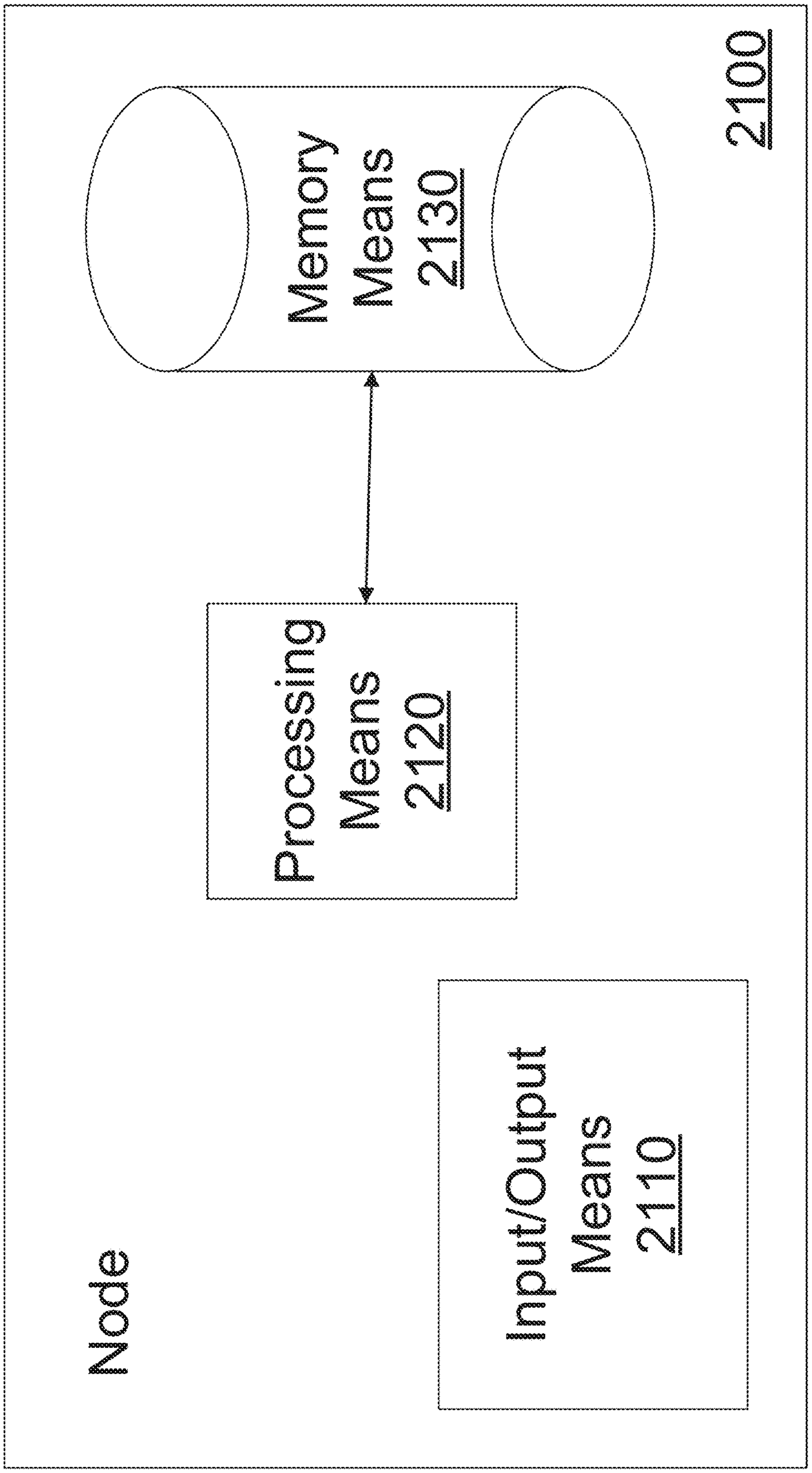
FIG. 21 illustrates a block diagram of a node configured in accordance with multiple embodiments of the invention.

A block diagram of a node configured in accordance with multiple embodiments of the invention may be illustrated in FIG. 21. Prospective nodes may include but are not limited to recipient nodes (associated with identifiers) configured to receive information such as messages; retrieving nodes configured to search blockchains, databases, and/or other storage entities for messages; and/or sending nodes configured to provide messages to other nodes. In accordance with certain embodiments, singular nodes may operate as one or more of these nodes. Nodes may include input/output means 2110 including but not limited to receivers configured to receive information and/or transmitters configured to provide information to other nodes, devices and/or entities. FIG. 21 illustrates that nodes 2100 may include processing means 2120 and memory means 2130. The memory means 2130 may include instructions, which, when executed by the processing means 2120 causes the module unit 2100 to perform methods configured in accordance with certain embodiments of the invention. As suggested above, nodes may own other nodes configured in accordance with many embodiments of the invention.

The disclosed technology can be used to transmit messages of various forms to nodes. One format of a message may be a token, as given examples of in the above. Another example format may be an authenticated message, such as a digitally signed message. The digital signature may be generated by the originator of the message, and/or parts thereof. For example, a software patch distributed to all users of a particular software suite may be distributed by the creators of this software, and digitally signed by the same. Another example of a message that may be digitally signed may be a public announcement. This may be restricted in terms of use to a given geographic area, such as a high-tsunami-risk zone, and/or a specified jurisdiction; it may be distributed to any parties with a specified membership, where membership can be a paid membership such as what an entity may obtain by paying a subscription, and/or it may be a free membership, such as citizenship, user of a particular application, and/or parties connected to a sender on a social network. Messages, whether authenticated and/or not, may be encrypted, e.g., using a symmetric and/or asymmetric key associated with the intended recipient. Messages may be transmitted by posting them on a publicly accessible forum, such as on a blockchain, and/or they may be transmitted in a peer-to-peer manner by network nodes connected to each other. Messages may flood a network, have specific routing information associated with them, and/or may be posted on a blockchain and/or other database, where they can be requested by parties wishing to obtain messages. Such requests can be performed by searching entries for matches, e.g., of public keys and/or other identifiers, and/or using an agent associated with the blockchain and/or database that scans all new entries and determines what nodes should be notified; this may be a service that bounty hunters may perform, for example, and these may be paid on a per-notification basis and/or on a per-time-period subscription basis. A node and/or a user associated with a node may sign up for notifications from such bounty hunters by providing one or more public keys and/or other identities to the bounty hunter, such identities including the search string for the bounty hunter. The bounty hunter may store tables of identities using probabilistic storage systems, such as Bloom filters, and associate with these the notification addresses to which the bounty hunter would send notifications when there may be a match between an entry on the scanned blockchain and an identifying string. As explained, the identifying string may be a public key and/or a function thereof (such as a cryptographic hash of the public key); it may also be a descriptor of a forum, such as "nodes using Acme software version 1.2"; when a node subscribes to such a forum, it will receive any relevant update to that forum, where the forum may be associated with a unique identifier. The bounty hunter may determine the validity of a message before notifying a recipient of the update, e.g., by verifying the digital signature. Some bounty hunters may request updates from yet other bounty hunters, thereby acting as aggregators; another beneficial use of such a second layer of bounty hunters may be for purposes of privacy. Bounty hunters may operate in any number of layers, and may obtain redundancy against failures of reporting bounty hunters by requesting feeds from many such entities. In some situations, a node, including a bounty hunter acting as an aggregating entity may contract with multiple bounty hunters and agree to pay only the first one to report a given event; in other cases, the node may pay more than one bounty hunter detecting the same event, where an example event may be a message. Another example event may be an announcement that a recipient node may be interested in, e.g., an announced sale of an NFT of a specified type at a given maximum asking price.

In a number of embodiments, the disclosed system may be combined with techniques to reject unwanted tokens; one way to do this is disclosed in co-pending U.S. patent application Ser. No. 17/810,085, titled "Distributed Ledgers with Ledger Entries Containing Redactable Payloads," filed Jun. 30, 2022, incorporated by reference in its entirety. In various embodiments, a token receiving an unwanted message, including a token, may ignore this; reassign it to an entity representing a trash can; and/or reassign it to an entity collecting complaints of spam. An entity receiving such complaints may assess the risk associated with the unwanted message and take a security action depending on the severity.

For example, a collection of related tokens including a malicious contract may be assigned to a number of recipients, some of which may report the unwanted tokens by assigning them to the entity collecting complaints; this entity may determine that the risk may be high for tokens not yet reported to it but issued by and/or gifted by the same entity as the tokens being reported, and contact the recipients of those tokens. This contacting may be conditional on these entities having subscriptions with the entities collecting complaints. This does not only apply to tokens that have malicious smart contracts, but also to tokens and other messages associated with malware; tokens and other messages having deceptive content, incl. phishing texts and URLs; tokens and other messages selling illegal and/or dangerous drugs, etc. A user may subscribe to alerts of some kinds but not to others, i.e., one user and her associated wallet may not be concerned with messages selling counterfeit products, but very concerned about malware. Subscriptions for alerts may be selective to types, and may apply to any assignments of tokens and other messages to a first node (such as a wallet) and all nodes (such as tokens) owned by the first node; it may alternatively be specific only to a given node and not its ancestors and/or offspring (where ancestors correspond to nodes owning the node and/or its ancestors, and offspring corresponds to nodes it and its offspring owns.) The alerts may be in the form of messages of the types described herein; one such type of message may result in a prompt and/or alert being presented to a user in a given context, such as when accessing a token and/or other message that the alert relates to; it may also include instructions that cause tokens that the alert relates to be automatically quarantined, transferred out, blocked, and/or otherwise protected against full access by a user of the node to which the token belongs. This also applies to messages that are not tokens that are determined to be risky and/or to otherwise trigger an identification process in the entity screening the content.

The entity generating alerts may be a bounty hunter, and/or may be another service provider that a user sets up a contract with. A user may obtain service for one or more nodes associated with the user from one or more such service providers. The service provider may collect intelligence using nodes that receive unsolicited messages from potential attackers; from automated and manual complaints from nodes; by identifying traffic on the network; and by reading tokens and other messages on public databases including blockchains. The service provider may also receive information from other service providers, including bounty hunters. It may use sandboxing to probe potential threats and determine their nature, and it may use artificial intelligence (AI) and machine learning (ML) methods to classify likely threats.

For instance, a classifier using an algorithm such as a neural network, support vector machine, and/or AdaBoost could be trained to categorize a node, such as a wallet, token, message, etc., as having a low, medium, and/or high threat level. Additionally or alternatively, a neural network and/or other algorithm could be used to create a regression model that assigns a node a threat probability and/or real-valued threat score. Such classification and/or regression models could operate on features such as those mentioned above, including but not limited to intelligence from nodes that receive unsolicited messages from potential attackers, automated and manual complaints by nodes, traffic patterns on the network, and histories of tokens and messages on public databases including blockchains. Such models can be trained using real-world datasets compiled to include examples of nodes known to present high and/or low threats, tokens that are known to be fraudulent and non-fraudulent, etc. Additionally or alternatively, such models can be trained on synthetic data that may be constructed to exemplify known and/or suspected patterns of threat, on real-world data that may be augmented with synthetic variations, and/or on data representing a combination of these approaches.

Multiple classifiers and/or regression models could be used in conjunction with each other, for instance each modeling different facets of threat. Such models could be combined, where for instance models capturing multiple facets each inform downstream models that synthesize these estimates into a single threat score. Additionally or alternatively, the output of one or more machine learning models may inform other downstream processes which themselves do not involve subsequent machine learning, and which may additionally take other considerations into account.

Machine learning and AI techniques could alternatively and/or additionally be employed to categorize, label, and/or otherwise annotate alerts and/or notifications. For instance, a classifier may be employed to categorize a message as low and/or high priority, and/or a classifier may be employed to assign a meaningful category to a message such as "coupon" and/or "product update", and/or a probabilistic classifier may be employed to assign a probability that a message may be phishing. Algorithms used to implement such approaches might include neural networks, decision trees, random forests, rule-based approaches, and/or others. Such techniques could be implemented by bounty hunters, by nodes themselves, and/or by another service utilized by a bounty hunter, a wallet, and/or another node. Such techniques may use as input any of the features described above, such as node and transaction histories. They may alternatively and/or additionally use other properties of a message and/or token, for instance message text and/or metadata shared in the clear, and/or descriptions, and/or metadata associated with a sender and/or other node. Natural language processing techniques such as those employing neural networks for semantic analysis may be applied to inform such categorization, labeling, and/or annotation when textual data and/or metadata may be available. The categories and/or labels generated by such techniques may be used to inform processing of messages, for enabling messages sent to a wallet which are labeled as likely to be "coupons" to be routed by the wallet to a proxy node, which may be a process owned by the wallet and charged with organizing and recommending coupons to the wallet owner. Alternatively and/or additionally, the categories and/or labels generated by such techniques may be used to influence user interface displays of messages, tokens, and nodes, for instance enabling a wallet owner to sort content by priority and/or filter by category.

The entity generating alerts and/or notifications may be a web-wallet and/or "social wallet" whereby a web application provides users with an interface to view, organize, and possibly transact tokens. Such an application may aggregate a user's various wallets. The application, having visibility into the wallets and aggregated wallets of many other users, may track the user response to unwanted tokens and apply and/or offer to apply similar actions to users that may have acquired the tokens and are unaware of either the uselessness and/or mal intent.

The specifications of a message may specify a request to buy a token, and/or to borrow a token, for example. Such different messages may result in different user experiences. The message may also convey the transfer of a token, to the recipient, as detailed above. Messages can also be used bidirectionally, e.g., to set up a channel for the negotiation between two parties, where the negotiation may be about the price of a token to be transferred; the selection of a security protocol; the test of an environment prior to the transfer of rights to a resource, and more.

In some embodiments, the disclosed technology may be integrated with and/or into messaging applications, enabling the transmission of messages (such as emails, tweets and SMS messages) to node addresses. A node could be a wallet, in which case this wallet would either display received messages and/or act as a proxy to convey received messages to one or more messaging applications of the user's choice, according to a configuration of the wallet. A node may also be a token and/or a process, which can act as a filter for messages. One such filter could block unwanted messages. Another may act to perform automated tasks for some messages, such as responding to certain classes of messages. A series of filters can be applied to one or more messages, according to a hierarchical structure of nodes that are associated with each other, and/or which engage each other based on decisions made based on the scanned messages.

In numerous embodiments, the disclosed technology may be integrated with social media style applications that enable content owners and non-owners to associate comments with on-chain assets. The association may be in a private database, such as those operated by social media companies, and/or in a permissioned and/or permissioned distributed ledger technology.

A wallet may also be used to originate and/or proxy outgoing messages, whether these are sent in response to received messages and/or independent of received messages. Whether for incoming and/or outgoing messages may include tokens and/or non-token data and control information. The wallet may also serve as a combined browser (for receiving web page information) and publisher of information (whether as a web page server and/or a proxy that automatically configures an always-available web server to serve content to browsers and wallets.) The integration of messaging platforms, browning platforms, content generation and consumption, and financial management leads to valuable improvements due to the synergies, e.g., enabling effortless incorporation of one type of functionality with another service; however, it also presents potential risks by increasing the complexity of the resulting element; the use of filters, as described above, both for incoming and outgoing traffic, may be therefore beneficial. Since such filters will have a holistic view across all the enabled functionalities, they benefit from the added complexity by cross-application insights, e.g., related to attacks.

Data transfers performed in accordance with some embodiments of the invention are not limited to use within NFT platforms. Accordingly, it should be appreciated that the modules described herein can also be implemented outside the context of an NFT platform network architecture unrelated to node communication. Moreover, any of the systems and methods described herein with reference to FIGS. 20-21 can be utilized within any of the NFT platforms described above.

NFT Platform Blockchain-Based Verifiable Click-Through Agreement

Systems and methods configured in accordance with certain embodiments of the invention may be directed towards associating conventional legal contracts, describing terms and conditions, with smart contracts. Said smart contracts may be interacted with through, but are not limited to blockchain wallets and/or other interfacing software in such a manner that a user may only construct and submit transactions for interacting with the smart contracts when the user has been made aware of the conventional legal contract, and in some embodiments, making selections from aspects of the conventional legal contract. Other aspects for presenting and/or enforcing terms and conditions using smart contracts are disclosed in co-pending U.S. patent application Ser. No. 18/299,546, titled "Systems and Methods for Instant NFTs and Protection Structure, Detection of Malicious Code within Blockchain Smart Contracts, Tokens with Transfer Limitations, Mirror Tokens and Parallel Addresses, Smart Contract Risk Scoring Method, and Cross-Device Digital Rights Management," filed Apr. 12, 2023 and co-pending U.S. patent application Ser. No. 17/823,014, titled "Methods for Conditional Transaction Tokens, Secure Sharing of Token Assets, Wallet Spam Protection, and User Interfaces for Acceptance of Terms," filed Aug. 29, 2022, incorporated by reference in their entirety.

Web3-enabled websites and smart contracts on a blockchain are analogous with the website and software mentioned in the previous paragraph. However, although a web3 website may present a user with a click-through license before the web3 website may be used, the same does not apply to smart contracts, which can be interacted with directly through a blockchain wallet not provided by the smart contracts deployer, and/or through API, command-line level and/or even manufactured raw bytecode transactions.

In many embodiments of the invention, smart contracts may include a license agreement, and/or a data storage slot including a pointer to a metadata file, which may include a license agreement and/or a pointer to a license agreement. Pointers may be uniform resource identifiers (URIs), uniform resource locators (URLs), and/or other data structures indicating the location and how to retrieve data such as metadata files and/or text files.

Figure 22:
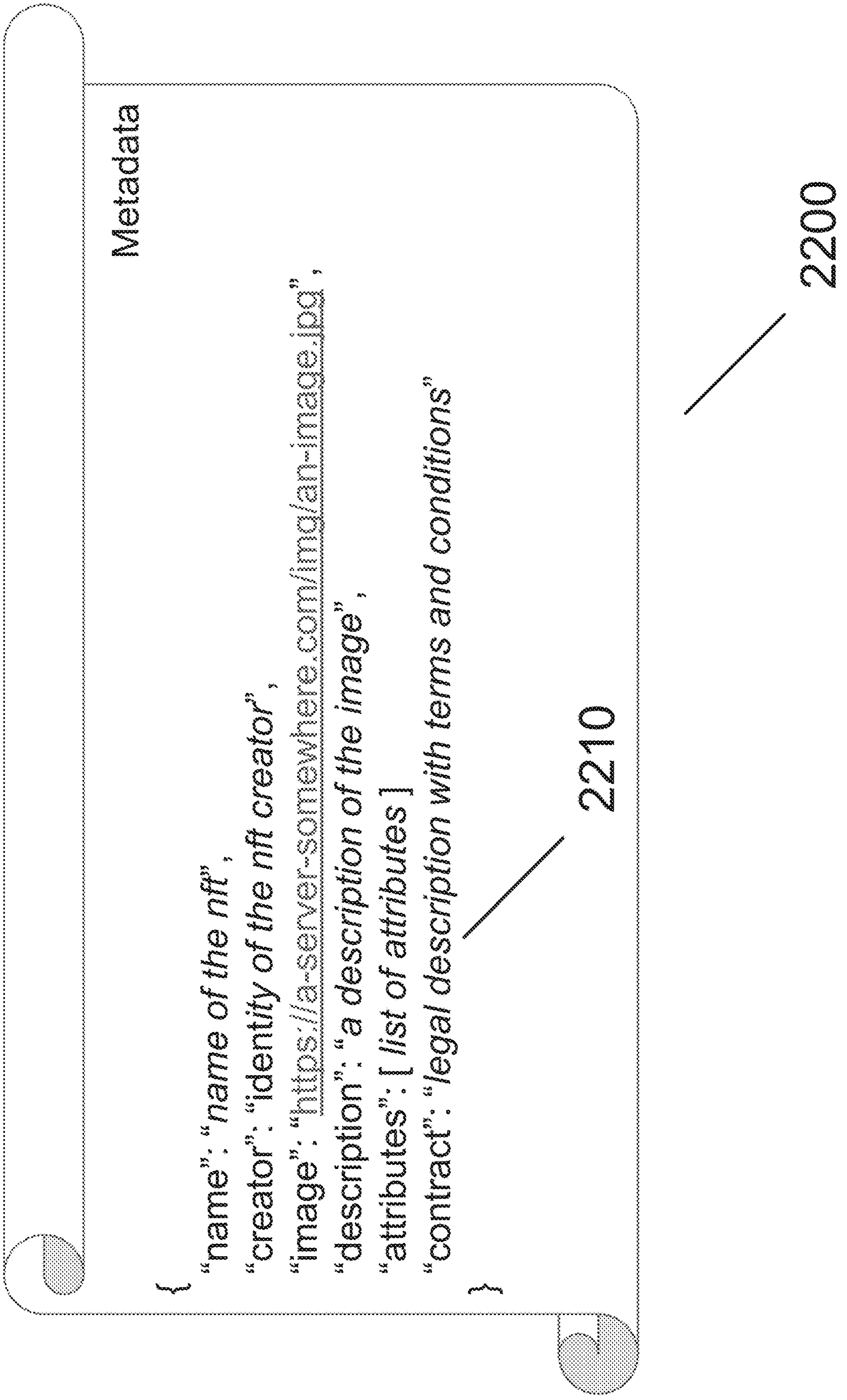
FIG. 22 illustrates a sample metadata the for NFTs including smart contracts configured in accordance with certain embodiments of the invention.

A sample metadata file for NFTs including smart contracts configured in accordance with certain embodiments of the invention is presented in FIG. 22. Metadata files 2200 may include metadata, which may include but is not limited to the legal text of the contract 2210.

When a user interacts with smart contracts using a blockchain wallet, the wallet may query the smart contracts for the location of the license, retrieve the license file, and may display the license file in a user interface of the blockchain wallet. The blockchain wallet may display the license in a modal dialog pane with interface components allowing the user to accept and/or decline terms and conditions described in the license. When the user makes a selection to decline the terms and conditions, the blockchain wallet may refuse to allow the user to further interact with the smart contract, and/or may limit the interactions possible with the smart contracts based on the selection.

Figure 23:
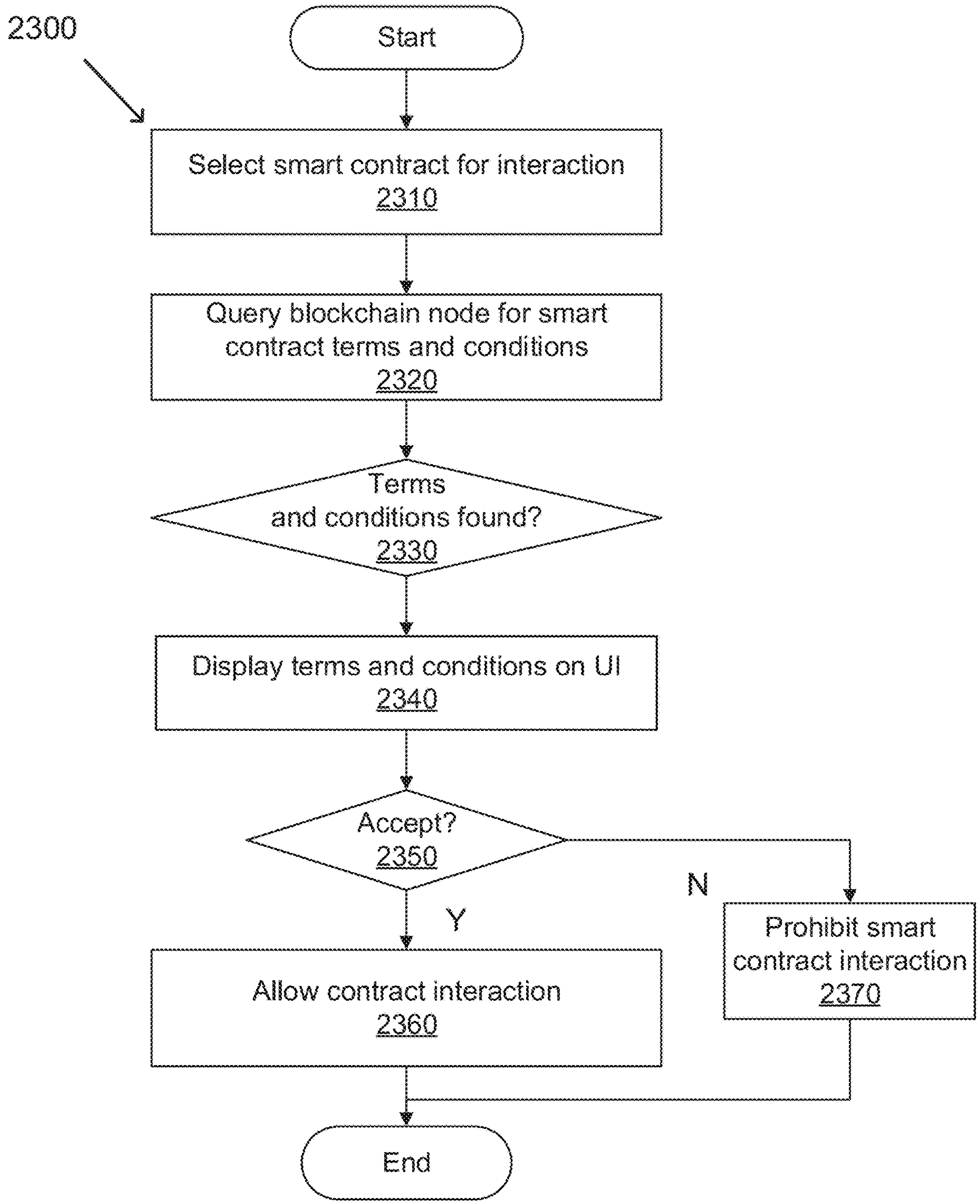
FIG. 23 illustrates a process for accepting terms and conditions prior to smart contracts access, configured in accordance with some embodiments of the invention.

FIG. 23 illustrates a process for accepting terms and conditions prior to smart contracts access, configured in accordance with some embodiments of the invention. Process 2300 may be performed by, but are not limited to blockchain wallets. Actions begin with step 2310, in which process 2300 can select smart contracts to interact with.

Actions proceed to step 2320, in which the blockchain wallet queries a blockchain node for the location of the terms and conditions of the smart contract.

In step 2330, the blockchain wallet determines whether terms and conditions have been found from the blockchain and/or a metadata server. When the answer is no, actions proceed directly to step 2360, and the user may interact with the smart contract. When the answer is yes, actions proceed to step 2340.

In step 2340, the blockchain wallet displays the terms and conditions, an accept/reject button pair and waits for a user response.

Per step 2350, when the user clicks accept, actions proceed to step 2360. When the user clicks reject, actions proceed to step 2370.

In step 2360, the user may proceed to interact with the contract. In some embodiments, the blockchain wallet may transmit a transaction to the blockchain, signed with a private key of the user, confirming that the user has agreed to the terms and conditions.

In step 2370, the blockchain wallet prohibits further interaction with the smart contract.

In a further enhancement, the license may further include a list of values corresponding to options presented in the terms and conditions. In numerous exemplary embodiments of the present disclosure for token smart contracts with royalty payments, and for elucidation of the present disclosure and not meant to be limiting, the list of options may include integers corresponding to the options available to the user, for example: 1—transfer is an internal transfer, 2—transfer is to a relative and/or beneficiary of a will, 3—transaction is a private financial sale, 4—transfer is from a public auction, 5—transaction is tax exempt, and so on. In another example, the values may correspond to hashes of each clause within the terms and conditions.

Figure 24:
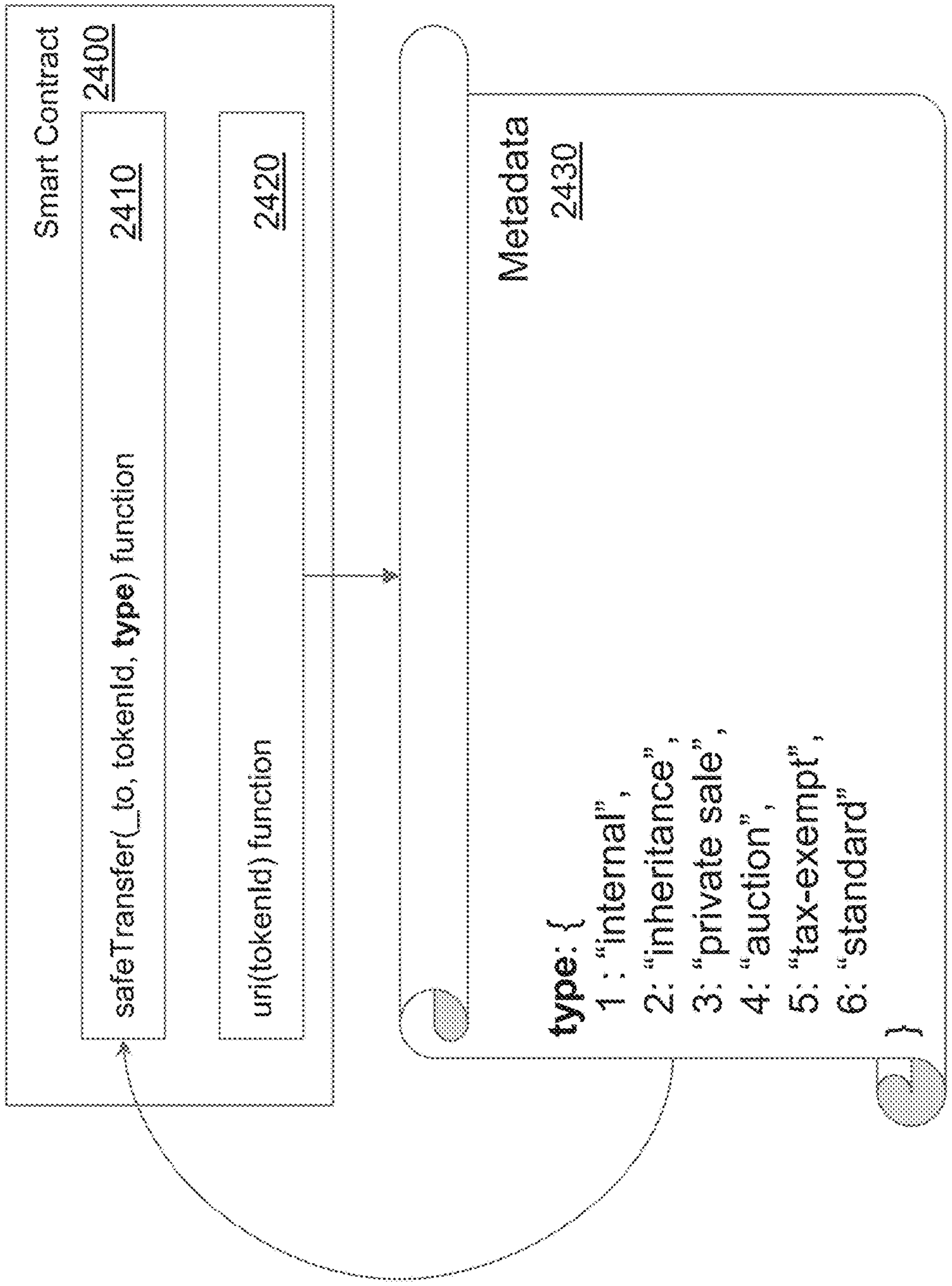
FIG. 24 presents a smart contract configured in accordance with various embodiments of the invention.

FIG. 24 presents a smart contract configured in accordance with various embodiments of the invention. Smart contracts 2400 may include but are not limited to a transfer function 2410 and a URI function 2420. The URI function 2420 provides a location on a blockchain, file server, the InterPlanetary File System, and/or some other file retrieval system where a metadata file 2430 may be obtained. The metadata file 2430 may include a collection of transaction types, one of which may be required as a parameter for the transfer function 2410 to initiate a transfer of a digital asset such as but not limited to an NFT and/or a fungible token. When no type parameter is provided, the smart function 2400 may refuse to honor the transaction and may not transfer the digital asset.

The wallet may query the smart contracts and present these options to the user in the user interface, and the user may select which one is relevant to the present transaction. Based on the selection the wallet may then construct a transfer transaction including one or more of: appropriate transaction validation data, an identifier of a selection from the list of options presented, appropriate payment for the selection, and/or other data required to construct and present a valid transaction to the token smart contract. Once the selection is made by the user and presented to the token smart contracts through a transaction, the token smart contracts may approve the transaction and transfer ownership of a token, and/or may reject the transaction, and may either decline to transfer ownership of the token and/or may move the ownership of the token to a quarantining address.

In some embodiments the license may include a "magic number" which must be presented to the smart contracts as a parameter in a transaction for the smart contracts to act on instructions within the transaction. In further embodiments, the transaction may instead include one or more of: the magic number, the message digest of from hashing the magic number, and/or the message digest obtained from applying a cryptographic hash function to a concatenation of the magic number and an address authorizing the transaction. In various embodiments the magic number may include a string, a binary sequence, and/or some other data.

Figure 25:
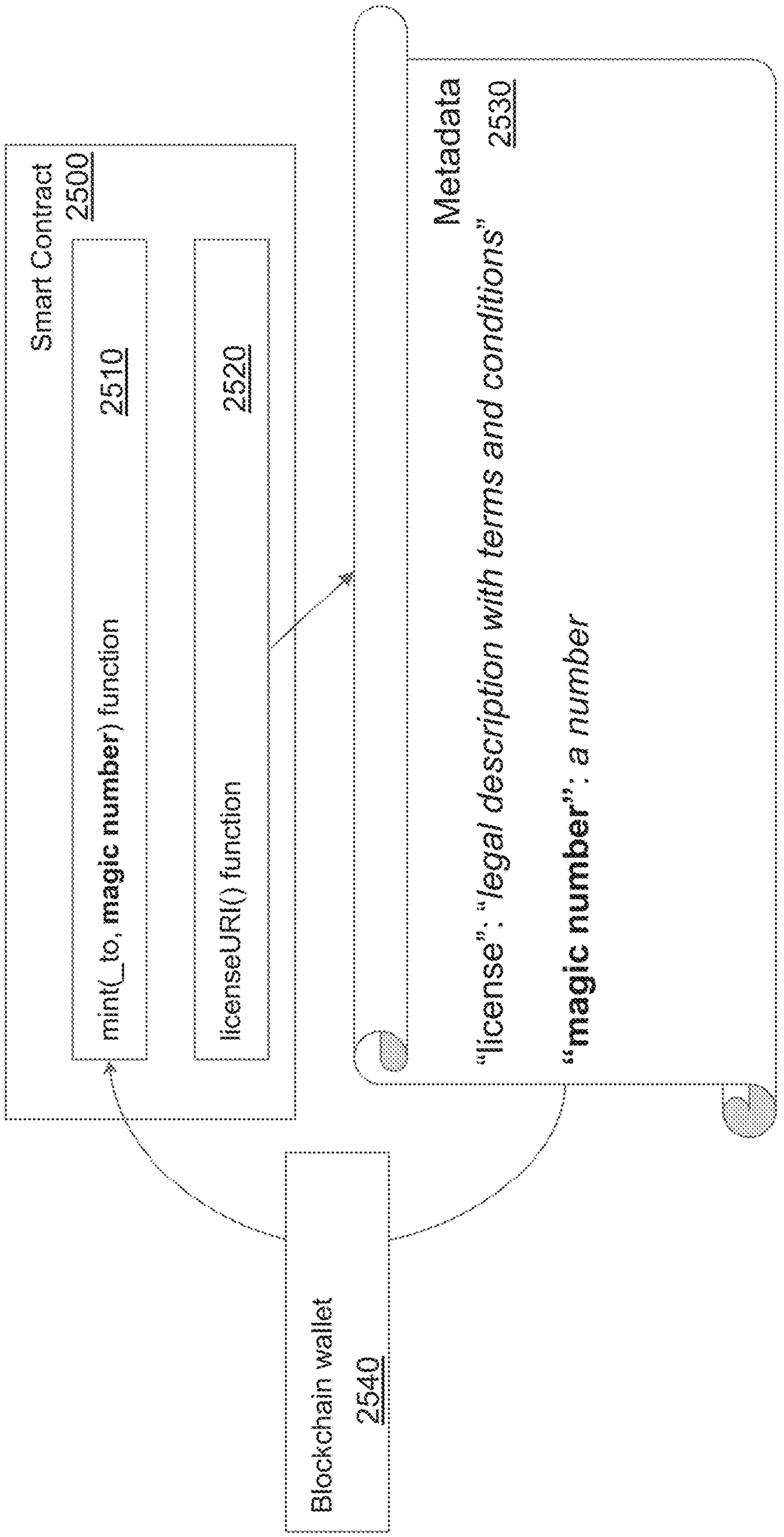
FIG. 25 illustrates a diagram representing licenses configured in accordance with some embodiments of the invention.

FIG. 25 illustrates a diagram representing licenses configured in accordance with some embodiments of the invention. Licenses may include but are not limited to "magic numbers" as presented. For illustrative purposes a non-fungible token instantiating smart contracts is presented; those skilled in the art will appreciate after reading the present disclosure that methods and techniques presented are equally applicable to other kinds of smart contracts and digital assets.

Smart contracts 2500 may include a mint function 2510 and a licenseURI function 2520. The mint function 2510 may take one or more parameters, one of which is a "magic number" parameter. When the correct magic number is supplied, the mint function 2510 may mint a token to a supplied address (indicated by "_to" in the present example). When an incorrect number is supplied, the mint function 2510 may fail to mint a token.

The smart contracts 2500 may include a license Uniform Resource Identifier (URI) function 2520. The license URI function 2520 may provide a URI to metadata 2530 including license terms and conditions for using the smart contracts 2500, ownership rights bestowed by tokens instantiated by the contract, and other license details. The metadata 2530 may also include the "magic number" required to make the mint function 2510 mint a token.

A blockchain wallet 2540 may thus query the license URI function 2520, obtain a copy of the metadata 2530, present the license to a user, and extract the magic number from the metadata 2530. The blockchain wallet may then call the mint function 2510 with the magic number as a function parameter, enabling the minting of a token.

Those skilled in the art will appreciate on reading the present disclosure that the magic number may also be used for other functions of the smart contracts and/or other smart contracts, for example, asset transfer functions, asset exchange functions, token burning functions, voting functions, staking functions, and other functions.

Figure 26:
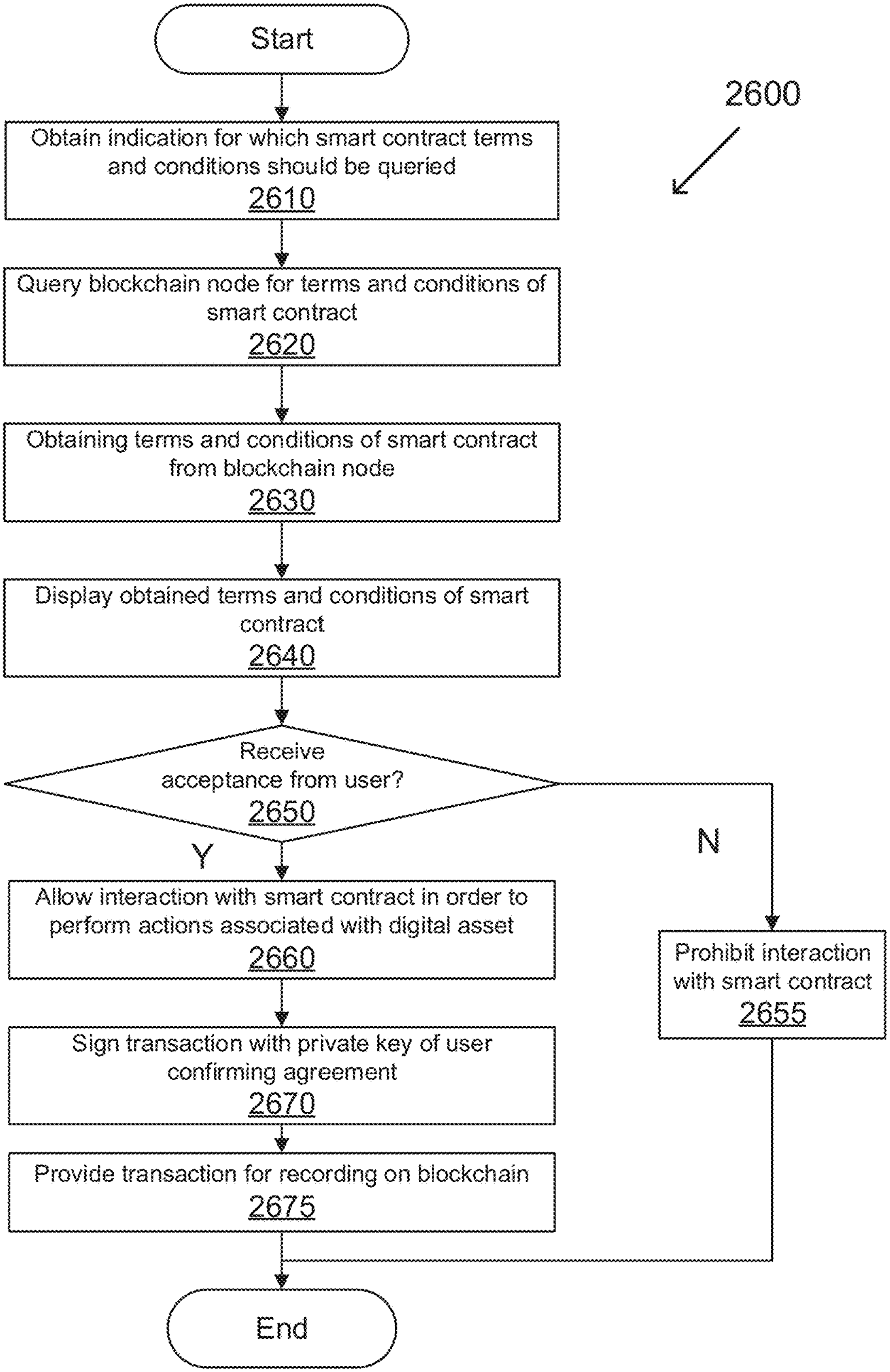
FIG. 26 is a flowchart of a method performed by an entity for interacting with smart contracts of a digital asset, in accordance with several embodiments of the invention.

FIG. 26 is a flowchart of a method performed by an entity for interacting with smart contracts of a digital asset, in accordance with several embodiments of the invention. The method may be performed by entities including but not limited to digital wallets. FIG. 26 illustrates the method including step 2620 of querying a blockchain node for terms and conditions of the smart contract, and step 2630 of obtaining the terms and conditions of the smart contracts from the blockchain node. FIG. 26 further illustrates the method including step 2640 of displaying the obtained terms and conditions of the smart contracts to a user of the entity together with an option to accept the terms and conditions of the smart contract; and step 2650 of receiving acceptance indication from the user. FIG. 26 also illustrates the method including step 2660 of allowing interaction with the smart contracts in order to perform actions associated with the digital asset. In this manner, a user and/or owner of the entity is ascertained to accept terms and conditions associated with the digital asset before being allowed to perform any actions with regard to the digital asset.

FIG. 26 also illustrates method 2600 including an optional step 2670 of signing a transaction with a private key of the user confirming that the user agrees to the terms and conditions and step 2675 of providing the transaction for recording on the blockchain.

FIG. 26 also illustrates method 2600 including an optional step 2610 of obtaining an indication of for which smart contracts the terms and conditions should be queried.

FIG. 26 illustrates method 2600 including an optional step where, upon receiving an indication from the user that the user does not accept the terms and conditions of the smart contract, the process goes to step 2665 of prohibiting interaction with the smart contract.

While specific processes for making agreements are described above, any of a variety of processes can be utilized as appropriate to the requirements of specific applications. In some embodiments, steps may be executed or performed in any order or sequence not limited to the order and sequence shown and described. In a number of embodiments, some of the above steps may be executed or performed substantially simultaneously where appropriate or in parallel to reduce latency and processing times. In a few embodiments, one or more of the above steps may be omitted.

Figure 27:
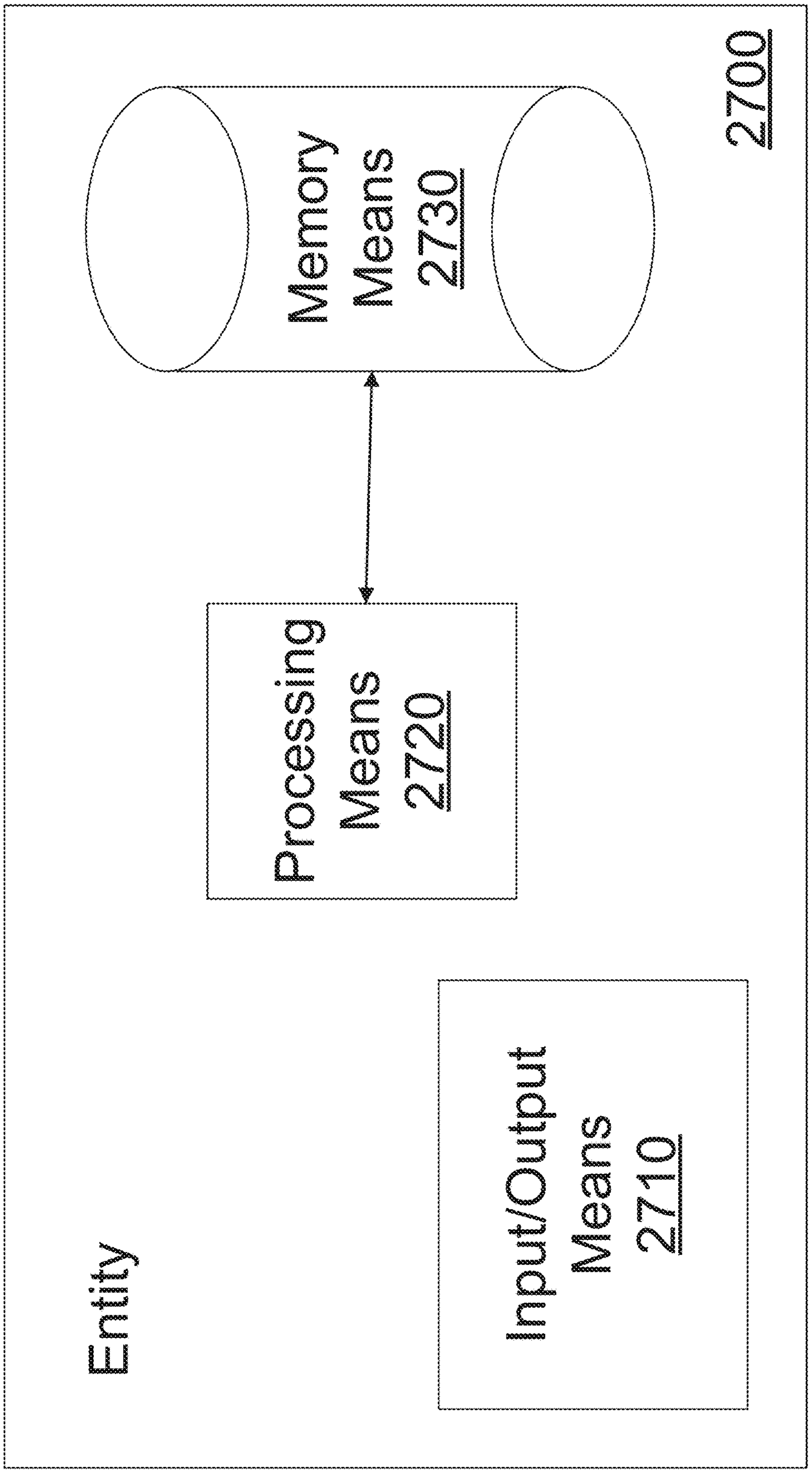
FIG. 27 models an entity configured in accordance with a number of embodiments of the invention, for interacting with smart contracts of digital assets.

FIG. 27 models an entity configured in accordance with a number of embodiments of the invention, for interacting with smart contracts of digital assets. Entities may include input/output means 2710 including but not limited to receivers configured to receive information and/or transmitters configured to provide information to other Entities, devices and/or entities. FIG. 27 illustrates that Entities 2700 may include processing means 2720 and memory means 2730. The memory means 2730 may include instructions, which, when executed by the processing means 2720 causes the module unit 2700 to perform methods configured in accordance with certain embodiments of the invention. As suggested above, Entities may own other Entities configured in accordance with many embodiments of the invention.

Contracts and agreements facilitated in accordance with numerous embodiments of the invention are not limited to use within NFT platforms. Accordingly, it should be appreciated that the modules described herein can also be implemented outside the context of an NFT platform network architecture unrelated to blockchain communication. Moreover, any of the systems and methods described herein with reference to FIGS. 22-27 can be utilized within any of the NFT platforms described above.

NFT Platform Registries

One aspect of the disclosed technology may be a technique for insurance companies to obtain information about resources to be insured, including a selective disclosure of information related to their environment of storage, their usage; and further, to associate with a token, whether a fungible and/or non-fungible token, at least one protection mechanisms useful to reduce the risk of theft, social engineering, and automated transfers by malware.

A second aspect of the disclosed technology may be a technique to facilitate a repossession and/or reassignment of stolen tokens and/or tokens that were otherwise associated with abuse, allowing a stolen token to be returned to its rightful owner, blocked from being transferred out, altered, and/or burned.

The disclosed technology may be implemented in a variety of manners. In one implementation, a protected token has its ownership assigned from an owner, often known as the creator, that may be an entity A, to a smart contract that enables the usage of the token by entity A, where one type of usage may be the right to initiate ownership transfers from the smart contract to a second party, entity B. However, prior to this reassignment, at least one protective service incorporated in and/or referenced by the smart contract may be executed, where the protective service may require additional assurance and/or authentication before the transfer is allowed to be performed. An example of an assurance/authentication includes a verification with entity A that the transfer should be placed, where this may be performed using an independent channel such as by SMS, where a verification code may be sent by SMS from e.g., the smart contract and/or an entity processing the same to a number known to belong to entity A, and requiring the user to provide the code to the protective service to a user interface, e.g., on a web page of a marketplace. Alternatively, the protective service may notify a listed insurance company and/or other third party associated with an insurance company of the initiation of and terms of the transfer, and request a confirmation from the same for the transfer to proceed. The insurance companies and/or other third parties can determine whether the terms are indicative of a likely risk, whether the intended recipient of the token may be known to be (un)trusted parties and perform other risk-based assessments, including verifications with entity A to confirm the transfer.

In certain embodiments, additional assurance methods may include, for example, the additional assurance/authentication being triggered when the value of the digital asset being transferred is above a threshold value. Through this, owners may be protected from malicious transfers of assets of high value, without being interrupted by notifications and/or requests for authentication relating to the transfer of assets of low value. For example, an NFT in a collection with a floor price over $10,000 in value may trigger a request for authentication, whereas a transfer of $5 of cryptocurrency for the purchase of a cup of coffee may not.

Other authentication methods may include verification codes through email, a request for an authentication code generated by an authentication app such as Google Authenticator, a request for the use of a one-time password from a one-time password pad delivered to the owner of the digital asset out of band, for example through postal mail and/or a secure messaging service, and/or a CAPTCHA and/or other automated public Turing test.

In various embodiments, the protected token needs to be created on, and/or transferred to a blockchain associated with a watchful bridge, and associated with instructions that, when executed, cause the watchful bridge to perform a protective service before allowing an ownership transfer and/or a transfer to another blockchain, wherein the same types of protective services as described above can be used. Watchful bridges are disclosed in PCT Patent Application No. PCT/US23/62851, titled "Systems and Methods for Abuse Safeguards in NFT-Directed Environments," filed on Feb. 17, 2023, incorporated by reference in its entirety.

When an action is taken that initiates the protective service, the protective service may perform a verification with the wallet that stores the token, e.g., using an API to the wallet. For example, when the protective service is contained in and/or referenced by a smart contract, the smart contract can interact with the wallet to which the token is associated, and request information related to the context of the transfer. Such information may be stored in a secure log that may indicate an interest by the user to sell the token, information about events related to potential infection of the wallet by malware, information related to the types and versions of security software associated with the device on which the wallet resides, and more. An example of such security software is an anti-virus software suite; another example relates to the hardware security features of the device on which the wallet resides, such as whether it uses TrustZone, address space layout randomization (ASLR), and/or it has a digital rights management (DRM) module executing on it. The absence of a response and/or a response that indicates a risk may cause the initiated transaction to be blocked, and/or initiate a verification with an administrator and/or the registered user associated with the wallet. Similarly, when the protective service is associated with a watchful bridge, the watchful bridge may establish a network connection with the wallet associated with the token and request information such as the information in the example above. One way in which the watchful bridge may communicate with the wallet associated with the token is by using the channel establishment methods disclosed in co-pending application Ser. No. 63/368,869 titled "Blockchain-Based Control and Data Channel Method" by Markus Jakobsson and filed on Jul. 19, 2022, incorporated by reference in its entirety.

The entity referred to as an insurance company above can also be a security service contracted by a user of the protected token, and/or an association related to this user.

The insurance company entity in the above description may offer quotes for various types of protection. A token such as an NFT with famous artworks, estimated to be worth $1500, and residing on a cold wallet, may be associated with a policy that has an annual premium of $4, a deductible of $100, assuming that the cold wallet is connected to the Internet a maximum of 12 times in the year, wherein the policy covers theft by malware, theft by malicious contracts, and theft by phishing. However, when for sake of example the owner of the same NFT, say entity A, were to assign the ownership of the NFT to a smart contract that identifies the insurance company as an entity with rights to track and wherein the smart contract includes a protective service that requires both the insurance company and entity A to confirm a transaction before it is completed, then the cost of the same policy may be reduced by the insurance company to $1.25/year, which is a strong incentive for entity A to activate these protection and tracking features. Alternatively, a benefit may be provided to an asset owner in the form of a discount, e.g., based on having a certain number of assets insured; having a certain security posture, such as running an up-to-date anti-virus program; and/or having a behavioral history associated with an account, said behavioral history being associated with low risk. The rights to track may require an acquirer of the token to maintain the insurance company as an entity with the right to track, without the need to acquire a policy, and/or go through a process of removing the insurance company as a tracking entity. That process will take five days in this example situation, providing the insurance company time to identify abuse, when present, and initiate a repossession request, should abuse be identified. The requirement for entity A to confirm a transaction may involve entity A being set up to receive a code by SMS and providing this to the insurance company to confirm the transfer. The requirement for the insurance company to provide a confirmation may involve the latter receiving a notification of a pending ownership transfer, whereupon the insurance company may connect to the wallet associated with the NFT and request contextual information about the trade; evaluate the response (or lack thereof); and to compute a risk based on the evaluation of the response and other related transfer requests, e.g., other transfer requests associated with the same wallet, where some of these may have been completed and others may be pending.

As described above, one can implement the disclosed protection service in various ways, such as by assigning a token to a smart contract that references and/or contains a protective service component; and/or by placing it on a blockchain that is protected by a watchful bridge that may be configured to protect the token using a protective service associated with the token. Versions of these methods can also be used, as well as alternative implementations.

Independently of the method of associating a protective service with a token, the protective service can include routines that access contextual information about the use and/or potential abuse of a protected token, and the environment in which it resides; it may also include routines that actively protects the token, e.g., by blocking some uses (such as transfers) under high-risk conditions, and/or requiring additional verifications for at least some transfers.

The protective service may be associated with a token in a way that can be limited in duration to a given time (such as Jan. 1, 2055); to the occurrence of a specified event (such as the request of an owner to remove the service, and a verification that this is not a fraudulent request); and/or to the transfer of ownership (which may be preceded by a verification that there is no abuse detected.) However, the protective service can also be associated with a token in a way that cannot be removed, e.g., by being specified as part of the token at the time of the minting and/or mining of the token. (Here, we use different terms based on whether the token is non-fungible, in which case its creation is referred to using the term "minting", and/or whether it is a fungible token, in which case its creation is referred to using the term "mining".)

The protective service may also include the capability to transfer the asset to the policyholder's heirs in the event of the policyholder's demise.

In the above, we have described how to implement security features in the protective service component, and how to utilize the associated structure for assessing risk and computing insurance premiums. The protective service can also, and/or alternatively, be used to perform other tasks, such as but not limited to:

1. Collecting usage information, such as how many times a content element associated with a token has been rendered, and the demographic information of the parties that rendered it.
2. Reporting sales information for the purposes of proper collection of royalties, and/or to help audit the payment of such.
3. Identification of contextual information such as the types of tokens contained in the wallet(s) in which a given token associated with the protective service component resides, and the classification of the associated wallets according to one out of several available classifications, where such classifications may be used to select promotional content for a user and/or to determine risk of abuse associated with the given wallet and/or user.

The protective service component may further have functionality that aims to protect multiple parties. For example, the protective service may protect the content creator associated with a token to ascertain that the content can be used properly (e.g., in compliance with terms of service) and that royalties are paid when due; the protective service may also protect society, e.g., determine what taxes are due in a given jurisdiction and report when these are not paid, and/or take corrective actions, and/or to selectively enable tracking of tokens that are transferred as a result of abuse, such as a ransomware attack. The protective service may include multiple software routines, each one of which addresses a different need, and may perform a collection of these, where the collection may depend on the jurisdiction in which the protective service believes itself to reside, e.g., based on IP data, GPS data, and other location-based data; the collection may also depend on a configuration made by a user of the wallet in which the token hosting the protective service component resides; and/or by a configuration made by the content creator; agreed upon during the transfer of ownership, etc.

The protective service may remotely interact with and/or be controlled by Decentralized Autonomous Organizations (DAOs) responsible for making decisions, e.g., regarding repossessions of tokens in response to complaints of theft, determinations of premiums based on assessed risks levels associated with a party wishing to be insured, and/or regarding payments in response to claims filed by parties that are insured. The DAO may include users, agents operating on behalf of users, and combinations thereof. An agent may perform risk assessments, may collect complaints from bounty hunters, and may compute actuarial tables; it may also perform simulations, AI and/or ML assessments (e.g., of risk, cost and/or available levels of protection).

A DAO may perform the tasks of an insurance company by providing liquidity to be used to pay out for claims made. The DAO may correspond to users who wish to be insured and whose premiums are determined by already-existing DAO members, and who are provided a payout in response to claims, based on a vote of the members of the DAO. Alternatively and/or in addition, the DAO may include entities who do not wish to be insured, but who wish to stake a sum of money in order to receive an interest and/or a bonus, where the interest and/or bonus may be determined by the performance of the DAO over time, e.g., for the next 6 months after a given investment in the form of a stake, and wherein the payout may be computed in an automatic manner based on the financial health of the DAO. Some of the DAO members may correspond to traditional insurance companies. Each DAO member may use their own and/or DAO-provided tools to determine risks, perform evaluation of claims, and generate assessments for premiums and claim payments in response to input data, based on which the DAO member and/or agents representing these may vote on matters raised in the DAO, such as premium determinations, individual claim determinations, etc. A DAO member may have voting rights proportional to the amount of money it has staked; the voting rights may also be affected by the extent to which the member's previous votes have been desirable, e.g., the admission of members that ended up not making claims; the setting of premiums for users who took insurance but did not file claims, etc.

Whereas the DAO and its individual members might appear to be motivated to deny claims in order to boost the finances of the DAO and therefore obtaining a higher interest and/or bonus, the DAO and its members, by doing so, would deter new insurances to be purchased, which would then depress the finances of the DAO. In order to ascertain that parties wishing to obtain insurance can determine the behavior of the DAO can do so, the system will document events such as offers for insurance, purchases of insurance and associated terms and premiums, claims, and responses to claims. In some embodiments, at least some of such events are documented by being recorded on a blockchain, enabling auditing of the financial health, policies, actions and insurance burden, among other things. This enables the automated computation of reputation scores from the recorded events, where such reputation scores may also include references to complaints, e.g., those filed against the DAO. The public records may include the voting records of individual DAO members, enabling the computation of track records, trends and probabilities based on such events.

Whereas a DAO may be the provider of insurance, a traditional insurer may also offer this service. In that context, some or all of the recorded metrics described above may be provided to third parties. Third parties may use provided records associated with multiple insurance providers, some of which may be DAOs and some of which may be traditional centralized service providers, in order to provide rankings of these providers. Such rankings can be provided as a service to parties interested in purchasing insurance, and/or may be generated on the fly by such entities performing the associated computational tasks, e.g., using their wallets. A user may set a policy in his or her wallet, and/or other computational representatives, that periodically determines the cost of insuring an indicated set of resources against an indicated set of risks, and determines when to cause an automatic switch between providers to maximize objectives provided by an admin associated with the wallet and/or another computational unit, where such an admin may be an owner of a wallet.

Figure 28:
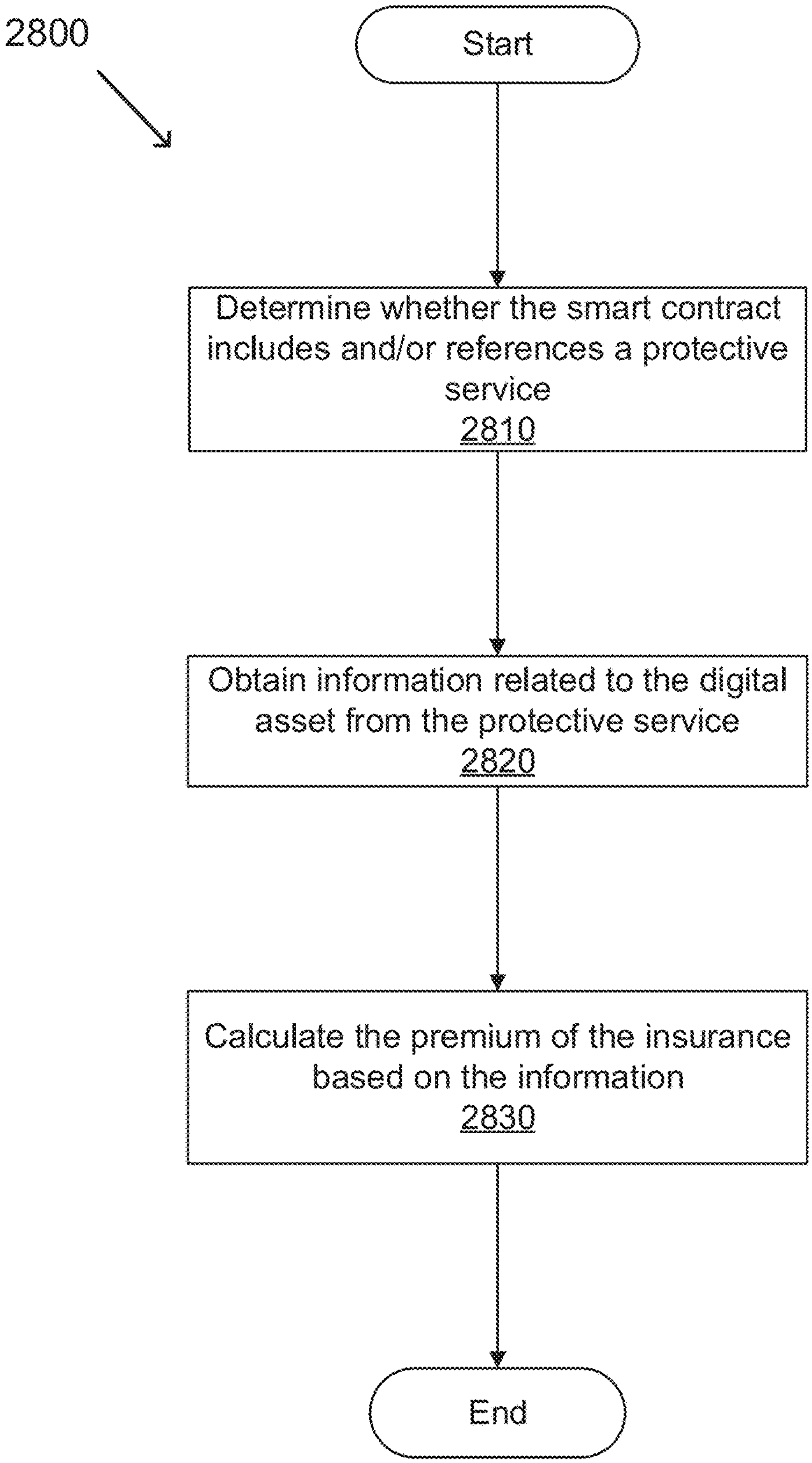
FIG. 28 is a flowchart a method performed by a node configured in accordance with certain embodiments of the invention.

FIG. 28 is a flowchart a method performed by a node configured in accordance with certain embodiments of the invention. Process may be used for calculating a premium to pay for insurance of digital assets, wherein the digital assets can associated with smart contracts. FIG. 28 illustrates the method 2800 including step 2810 of determining whether the smart contract includes and/or references a protective service; and step 2820 of obtaining information related to the digital asset from the protective service. FIG. 28 also illustrates the method including step 2830 of calculating the premium of the insurance based on the information, wherein the premium may be optionally reduced based on information obtained from the protective service, and optionally increased when the smart contract does not include and/or reference a protective service.

Figure 29:
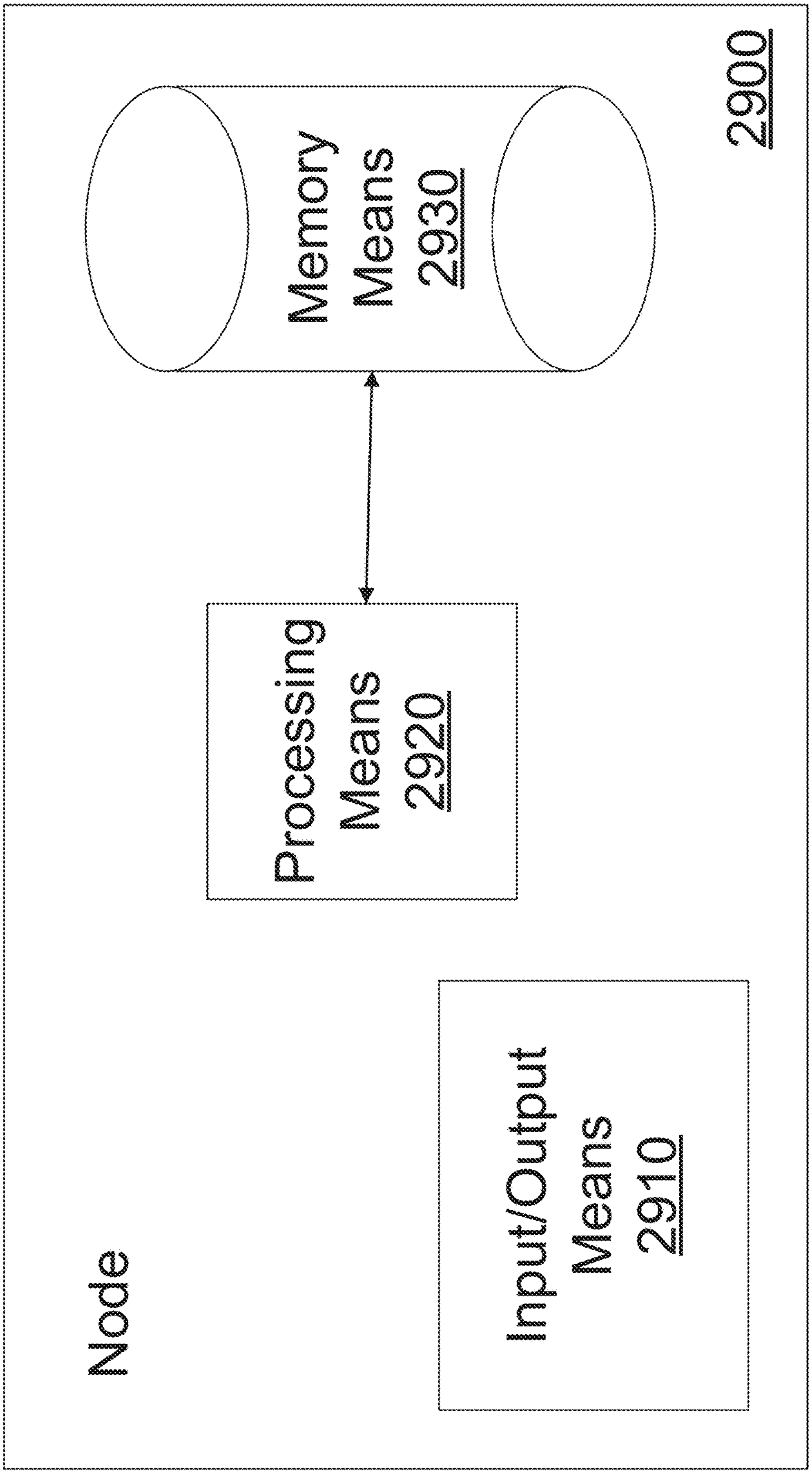
FIG. 29 illustrates a block diagram of a node configured in accordance with various embodiments of the invention.

A block diagram of a node configured in accordance with various embodiments of the invention is illustrated in FIG. 29. Prospective nodes may be configured for performing various smart contract-directed functions including but not limited to determining risk levels of digital assets associated with smart contracts and/or calculating premiums to pay for insurance of digital assets. In accordance with multiple embodiments, singular nodes may operate as one or more of these nodes. Nodes may include input/output means 2910 including but not limited to receivers configured to receive information and/or transmitters configured to provide information to other nodes, devices and/or entities. FIG. 29 illustrates that nodes 2900 may include processing means 2920 and memory means 2930. The memory means 2930 may include instructions, which, when executed by the processing means 2920 causes the module unit 2900 to perform methods configured in accordance with certain embodiments of the invention. As suggested above, nodes may own other nodes configured in accordance with many embodiments of the invention. The nodes may, additionally and/or alternatively, be a server, a computer, a cloud server and/or any entity/arrangement including processing means for executing the method.

Methods may be performed by nodes directed to determining a risk level of a digital asset associated with smart contract, the digital asset being owned by an entity with an address included in a wallet. This may involve determining the risk level of the digital asset based on at least one of a (i) classification of the protective service, wherein the classification is associated with a level of security provided by the protective service, (ii) hardware and/or software implementing the wallet, and (iii) hardware and/or software implementing the protective service. Depending on what type and/or function of the protective service, the risk level may be increased and/or decreased. Whether and/or not the risk level is increased and/or decreased and to what extent is a matter of implementation. The level of security provided by the protective service may depend on one or more of (a) the protective service requires additional assurance and/or authentication before a transfer of ownership of the digital asset may be allowed to be performed, (b) the protective service includes performing a verification with a wallet that stores the digital asset, and (c) whether and/or not the protective service requires the digital asset being created on, and/or transferred to, a blockchain associated with a watchful bridge, wherein the watchful bridge is to perform the protective service.

The following disclosure provides a system and method for ensuring that a historical record of the metadata and associated data pointed to by an NFT is maintained and can be retrieved through the use of a specific NFT lookup registry.

As a record of all activity on popular permissionless public NFT blockchains such as Ethereum is available, and as NFT standards such as ERC-721 and ERC-1155 emit specific notifications called events when significant activity takes place due to an NFT contract, the data from the chain may be regularly scanned to detect the presence of new NFT contracts, and changes to ownership of contracts may be detected by a blockchain monitoring component. The blockchain monitoring component can be implemented as a bounty hunter, as part of the task of miners performing consensus-based operations, by service providers paid by content creators and content owners to protect their rights, by individual wallets, and/or a combination of such.

Figure 30:
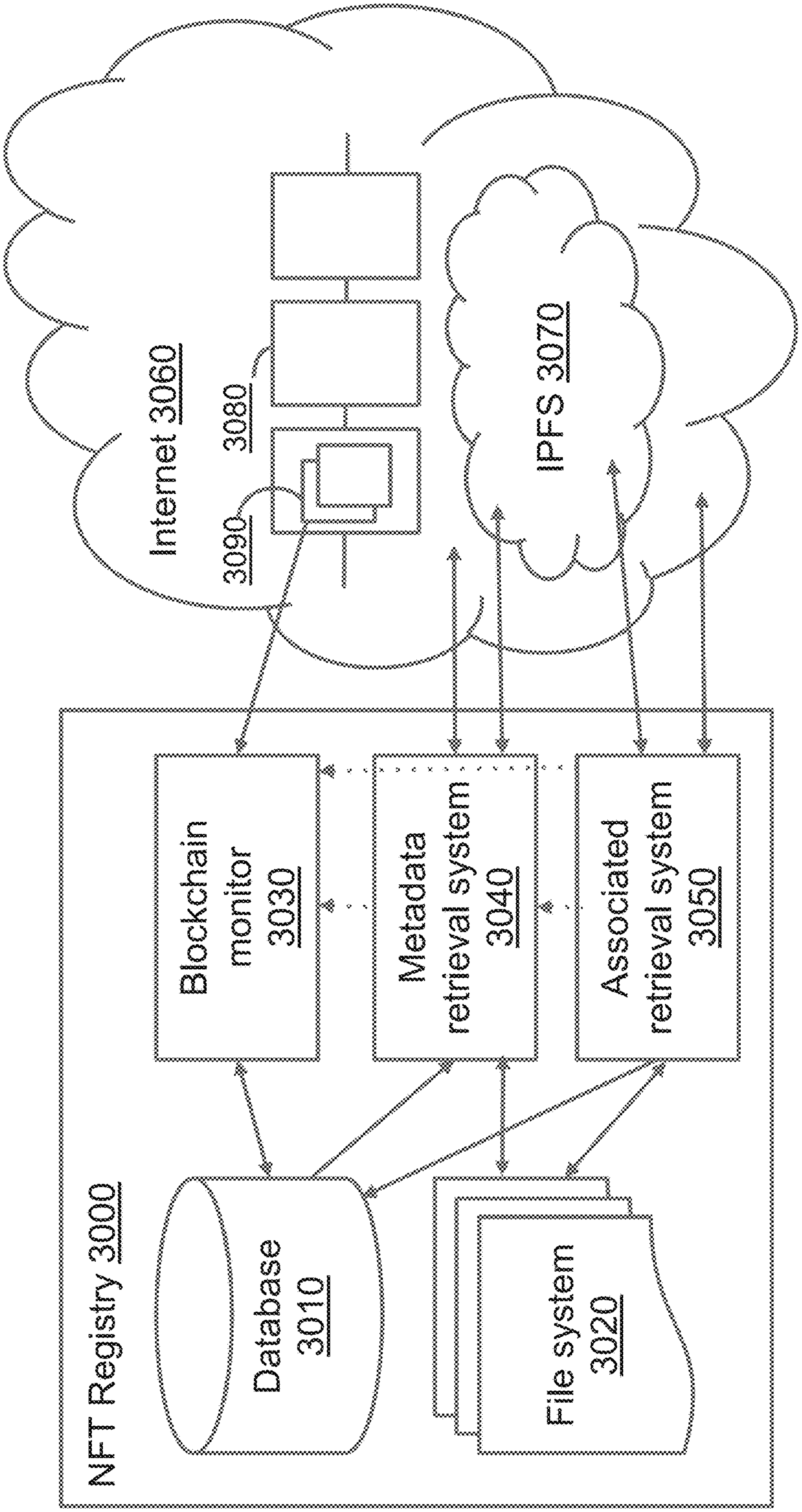
FIG. 30 illustrates an NFT registry configured in accordance with some embodiments of the invention.

An NFT registry configured in accordance with some embodiments of the invention is illustrated in FIG. 30. In the present disclosure, as illustrated by FIG. 30, an NFT registry 3000 may include components, including but not limited to a database 3010, a file storage system 3020, a blockchain monitoring component 3030, a metadata retrieval system 3040, and an associated retrieval component 3050.

The blockchain monitoring component 3030 may connect to a blockchain 3080 and may query some or all detected NFT smart contracts 3090 on the blockchain 3080 to retrieve their base URIs. The blockchain monitoring component 3030 may furthermore retrieve the URIs of some or all of the minted tokens in some or all of the detected NFT smart contracts, either directly through queries to functions provided by the NFT smart contracts, and/or by extrapolation from a template for each NFT, and/or by inspection of the code of the NFT smart contracts.

The blockchain monitoring component 3030 may then store a record of each URI and/or URI template for each NFT smart contract, and/or in various embodiments for each instantiated NFT, in the database 3010. In some implementations some or all of the records may include one or more of: a timestamp when the record was created, a timestamp retrieved from the blockchain 3080 indicating when the NFT smart contract and/or token was instantiated, a block height indicating in which block a transaction deploying the NFT smart contract was executed, and/or a block height indicating in which block a transaction instantiating an NFT was executed.

URIs may include HTTP URIs, IPFS URIs, FTP URIs, and/or some other uniform resource locator protocol for determining and retrieving data referenced by the URI.

When a change is detected in a specific URI for a specific token, and/or in a base URI, the blockchain monitoring component 3030 may update a corresponding record for the specific token and/or base URI in the database 3010. Changes in a URI may be detected by regularly scanning the blockchain 3080 for emitted events indicating that a URI has changed, and/or by regularly querying known NFT smart contracts 3090 for their current URI and comparing a response from the NFT smart contracts 3090 with URIs currently stored in the database 3010. In some implementations the record may be replaced, whereas in others it may be appended to the existing record and/or a new record referencing the existing record may be generated.

The metadata retrieval system 3040 may retrieve metadata files referenced by URIs stored in the database 3010. The metadata retrieval system 3040 may retrieve the metadata as soon as a new URI is stored in the database 3010, and/or it may be scheduled to run at predetermined intervals, scanning through the database 3010 for some or all URIs, and retrieving the metadata files referenced. The URIs may include information about where metadata is stored and thus from where metadata may be retrieved, for example, when the URI is a uniform resource locator (URL).

The metadata retrieval system 3040 may then store the retrieved files in a file storage system 3020, and may tag the files with one or more of: a date of retrieval, the URI used the retrieve the metadata, and/or an identifier for a database record including the URI. In some embodiments, the metadata retrieval system 3040 may compare a metadata file retrieved using a first URI with an already stored metadata file retrieved earlier using the same first URI, and may only generate a new file in the file storage system 3020 when the metadata file retrieved differs from the already stored metadata file. Tags can be associated with their respective records by creating a mapping from individual tag values to associated records, where this mapping may be stored as a hash table, and/or a probabilistic structure such as a Bloom table. Tags may also be stored in tree leaves of trees, such as red-black trees, where the trees can be efficiently searched to identify one or more leaves based on a tag value. The identified leaves may include multiple references to records stored in the database 3010.

When the metadata retrieval system 3040 is unable to retrieve a referenced file using a URI, the metadata retrieval system may create a timestamped record in the database 3010 indicating the failure. The metadata retrieval system 3040 may also message the blockchain monitoring component 3030, and/or may call a function and/or API endpoint provided by the blockchain monitoring component 3030, triggering the blockchain monitoring component 3030 to check a current status of an NFT smart contract associated 3090 with the URI in order to determine whether the configuration of the NFT smart contract has changed, for example whether an amount of tokens instantiated by the NFT smart contract has changed, and whether a base URI for the NFT smart contract has changed.

An associated data retrieval component 3050 may scan metadata files stored in the file storage system 3020 for URIs. The associated data retrieval component 3050 may scan the metadata as soon as a new metadata file may be stored in the file storage system 3020, and/or it may be scheduled to run at predetermined intervals, scanning through the file storage system 3020 for new metadata files and then scanning the new metadata files for URIs.

The associated data retrieval component 3050 may then retrieve files referenced by URIs extracted during the scanning process of the metadata files from the IPFS 3070 and/or the Internet 3060. In some embodiments the associated data retrieval component 3050 may create, maintain, and update the database 3010 with extracted URIs.

The associated data retrieval component 3050 may then store the retrieved files in the file storage system 3020, and may tag the files with one or more of: a date of retrieval, the URI used the retrieve the metadata, and/or an identifier for a metadata file including the URI. The identifier may include one or more classifications of the metadata file, e.g., describing the file type, the content nature, a cluster of users and/or user preferences associated with a machine learning model, an association with one or more users, etc. In numerous embodiments, the identifier relates to public and/or objective assessments of the stored file, such as an indication that the file is a movie, that it has been viewed more than 100,000 times, that it is primarily watched by users believed to be 20-30 years old, and/or that it is associated with skydiving. In several embodiments, the identifier may also include user-specific information, such as that it is a file that has been bookmarked by a user with a specific public key associated with the identifier. In some embodiments, the tags may be modified after the record is created, e.g., to add additional tag elements, modify some tag elements, and/or to remove one or more tag elements. In various embodiments, the associated data retrieval component may compare a file retrieved using a first URI with an already stored file retrieved earlier using the same first URI, and may only generate a new file in the file storage system when the file retrieved differs from the already stored file.

When the associated data retrieval component 3050 is unable to retrieve a referenced file using a URI, the associated data retrieval component 3050 may create a timestamped record in the database 3010 indicating the failure. The associated data retrieval component may also message the metadata retrieval system 3040 and/or blockchain monitoring component 3030, and/or may call a function and/or API endpoint provided by the metadata retrieval system 3040 and/or blockchain monitoring component 3030, triggering the blockchain monitoring component 3030 to check a current status of an NFT smart contract 3090 associated with the URI in order to determine whether the configuration of the NFT smart contract 3090 has changed, and/or triggering the metadata retrieval system 3040 to re-retrieve the metadata file in order to determine whether the metadata file from which the URI was extracted has changed.

A user may utilize a blockchain wallet and/or a website in order to view metadata and data associated with an NFT that they own and/or are interested in. The present disclosure describes an improved NFT browsing component for such wallets and/or websites. The disclosed technology is also compatible with pseudo-wallets, as disclosed in co-pending U.S. patent application Ser. No. 18/155,662, titled "Crypto Wallet Configuration Data Retrieval," filed Jan. 17, 2023, incorporated by reference in its entirety.

Figure 31:
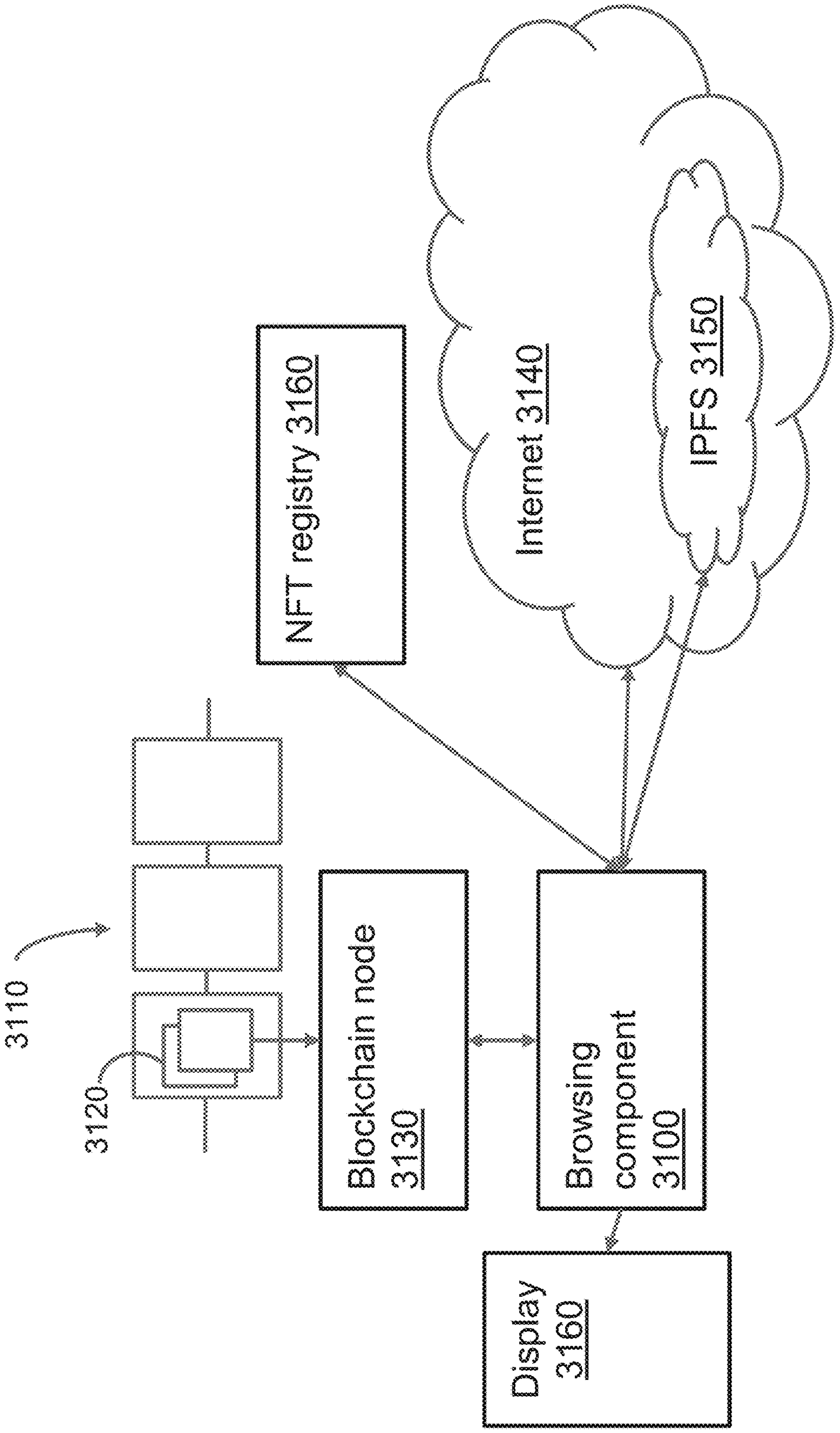
FIG. 31 illustrates a number of interactions performed by NFT registries in a system configured in accordance with many embodiments of the invention.

FIG. 31 illustrates a number of interactions performed by NFT registries in a system configured in accordance with many embodiments of the invention. As illustrated in FIG. 31, a browsing component 3100 may initially retrieve NFT data concerning a token being examined from the NFT contract 3120 on the blockchain 3110, using a blockchain node 3130, either directly via a local node, and/or from a remote node, for example one provided by a third-party service provider. In the case of use of a local node, the system may include a blockchain node 3130 running on a local and/or connected server, which participates in a peer-to-peer network of nodes maintaining and extending the blockchain. The browsing component 3100 may then make an application programming interface (API) call to the blockchain node 3130 using a hypertext transfer protocol such as http and/or https, a WebSocket protocol call such as ws, and/or some other communication protocol requesting information concerning the state of the NFT contract, and the blockchain node may retrieve the requested information from a blockchain database and/or the blockchain block files, and may return said requested information. In the case of use of a remote and/or third party blockchain node 3130, the request for information concerning the state of the NFT contract may be made over a local network and/or the internet to a blockchain peer to peer node in the same manner as for a local node. Those skilled in the art will appreciate that requests may be made through one or more proxies.

The browsing component 3100 may then attempt to retrieve a metadata file pointed to by the NFT data retrieved, either from a file server on the internet 3140 and/or from a file server in the InterPlanetary File System (IPFS: 3150), and/or some other file serving service. When successful, the browser component may then attempt to retrieve associated data from the file server on the internet 3140 and/or the IPFS 3150, and/or some other file serving service, using one or more URIs retrieved from the metadata file. The browsing component may then pass the retrieved data and files to the blockchain wallet and/or website for rendering and displaying, as indicated in FIG. 31 by a display 3160.

However, where standard blockchain solutions fail is when the metadata and/or associated data cannot be retrieved, in which case a "not found" message, icon, and/or image may be displayed.

In the present disclosure, which provides an improvement for the situation of unfound metadata and/or associated data, on determining that the metadata and/or the associated data for an NFT cannot be retrieved through the process described so far by FIG. 31, namely from the World Wide Web, the InterPlanetary File System, and/or whatever other location the NFT points to said data, the browsing component may submit a request to an NFT registry 3160.

Figure 32:
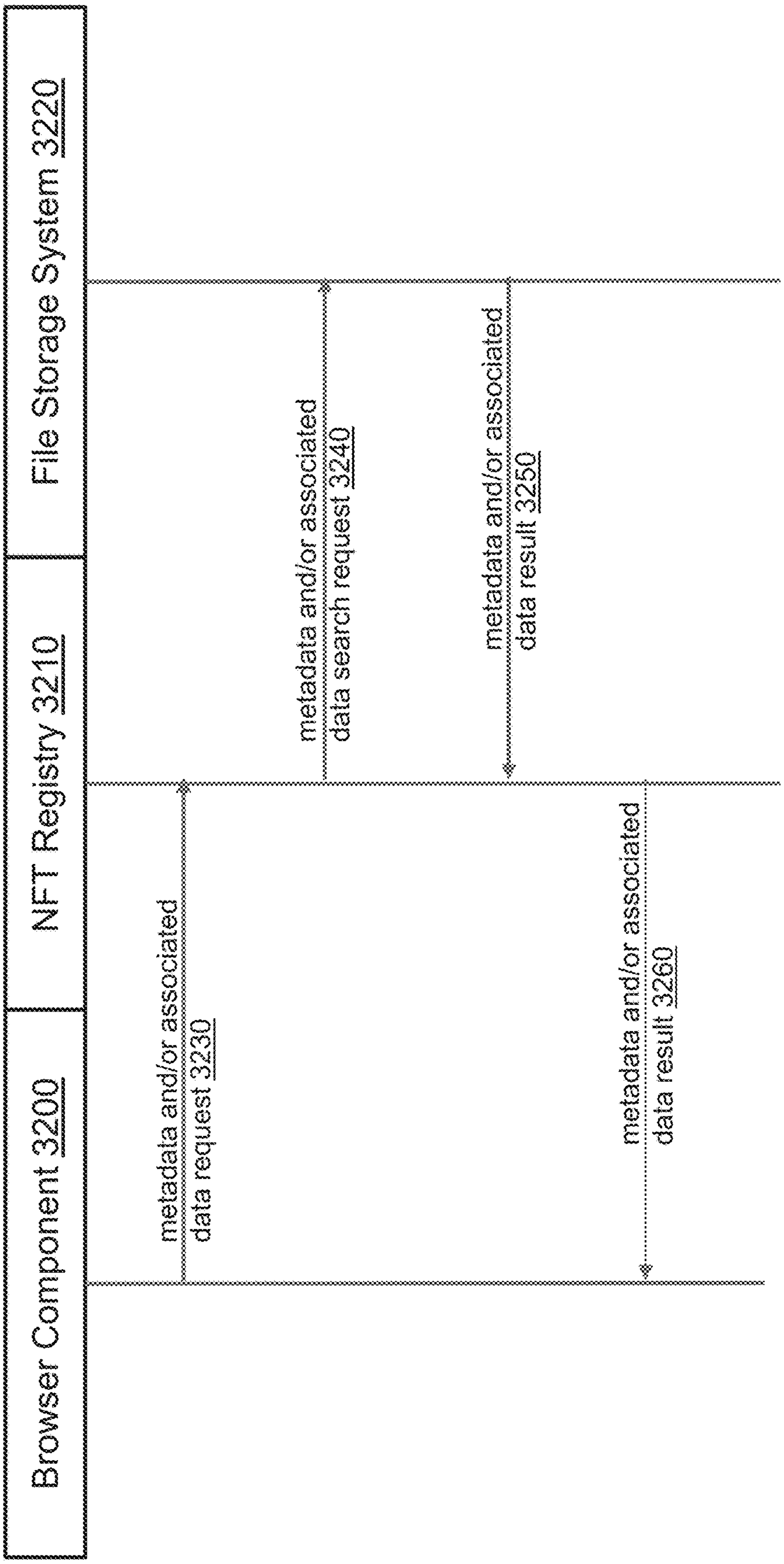
FIG. 32 conceptually illustrates a system, configured in accordance with some embodiments of the invention, for the browsing component and the NFT registry.

FIG. 32 conceptually illustrates a system, configured in accordance with some embodiments of the invention, for the browsing component and the NFT registry.

A metadata and/or associated data request 3230, which may include an identifier for the instantiating NFT smart contract, and an identifier for the NFT token, and optionally a timestamp and/or data, may be sent from a browser component 3200 to an NFT registry 3210.

The NFT registry 3210 may then submit a search request 3240 for the metadata and the associated data to the file storage system 3220.

The file storage system 3220 may then return a result 3250 including some or all of the data requested in the search request 3240.

The NFT registry 3210 may then return some or all of the metadata and the associated data to the browsing component 3200 in a data result 3260. In some embodiments the NFT registry may achieve this through a lookup in the database of NFT records. In yet other embodiments there may be multiple timestamped records associated with multiple different metadata files and associated data files, and the NFT registry may retrieve and return a metadata file and associated data file with a timestamp closest to a timestamp received from the browsing component.

The browsing component may then display details from the metadata file and render and/or display the associated data to the user.

In further embodiments, the browsing component and/or other interface element may present the user with an option to select a time, and may retrieve and then display metadata details and associated data recorded closest to that time. In yet further embodiments, the browsing component may dynamically cycle through displaying metadata details and associated data in chronological and/or other time sequence order in an animated manner.

Figure 33:
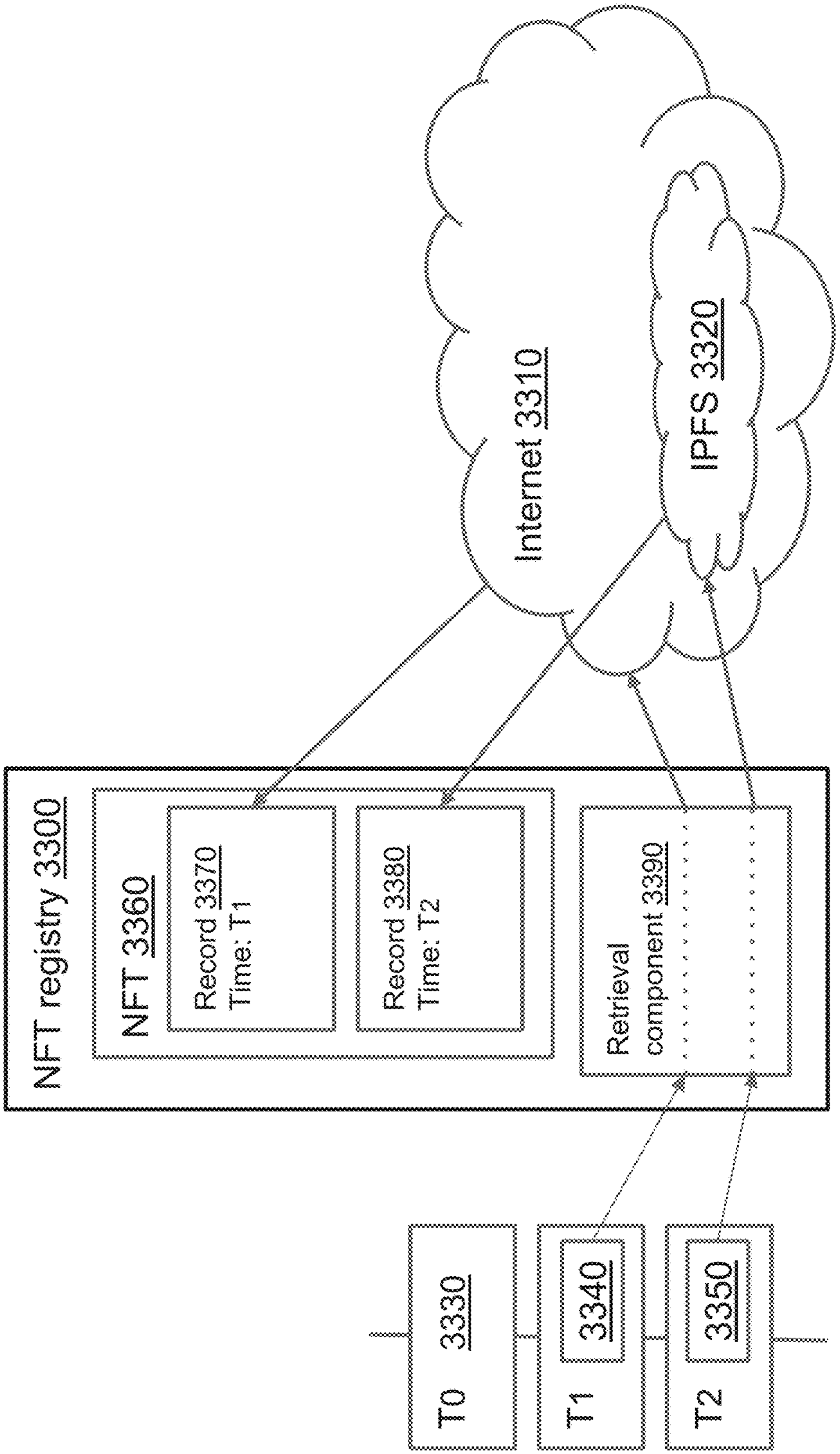
FIG. 33 illustrates a system for building NFT registries in accordance with multiple embodiments of the invention.

FIG. 33 illustrates a system for building NFT registries in accordance with multiple embodiments of the invention. The NFT registry 3300 may include a retrieval component 3390 that monitors a blockchain 3330 for updates to an NFT (elements 3340 and 3350).

At time T1 the NFT may include a first record 3340 on the blockchain 3330, and at time T2 the NFT may include a second record 3350 on the blockchain 3330.

At time T1 the retrieval component 3390 may detect a change to the NFT on the blockchain 3330, and may examine the first record 3340 for the change. The retrieval component 3390 may subsequently retrieve first metadata and/or associated data from a server on the Internet 3310.

The NFT registry 3300 may subsequently store the first metadata and/or associated data in a first record 3370 of an NFT data structure 3360.

At time T2 the retrieval component 3390 may detect a further change to the NFT on the blockchain 3330, and may examine the second record 3350 for the change. The retrieval component 3390 may subsequently retrieve first metadata and/or associated data from an IPFS server 3320 on the Internet 3310.

The NFT registry 3300 may subsequently store the first metadata and/or associated data in a second record 3380 of the NFT data structure 3360.

The first record 3370 and/or the second record 3380 may include further information concerning the change and further change, including but not limited to timestamps for when the updated indicated by the first record 3340 and the second record 3350 were included in the blockchain, whether metadata and/or associated data was retrieved from an FTP server, web server, IPFS server, and/or some other kind of server, when the metadata and/or associated data was retrieved, when the metadata and/or associated data was stored in the NFT record 3360, and whether prior records are still valid.

Browsers may subsequently display metadata and/or associated data related to the NFT based on parameters provided by a user, allowing the user to investigate the evolution of the NFT over time, and to view data related to the NFT even when original sources such as a webserver on the Internet and/or the IPFS are not available and/or in commission.

Figure 34:
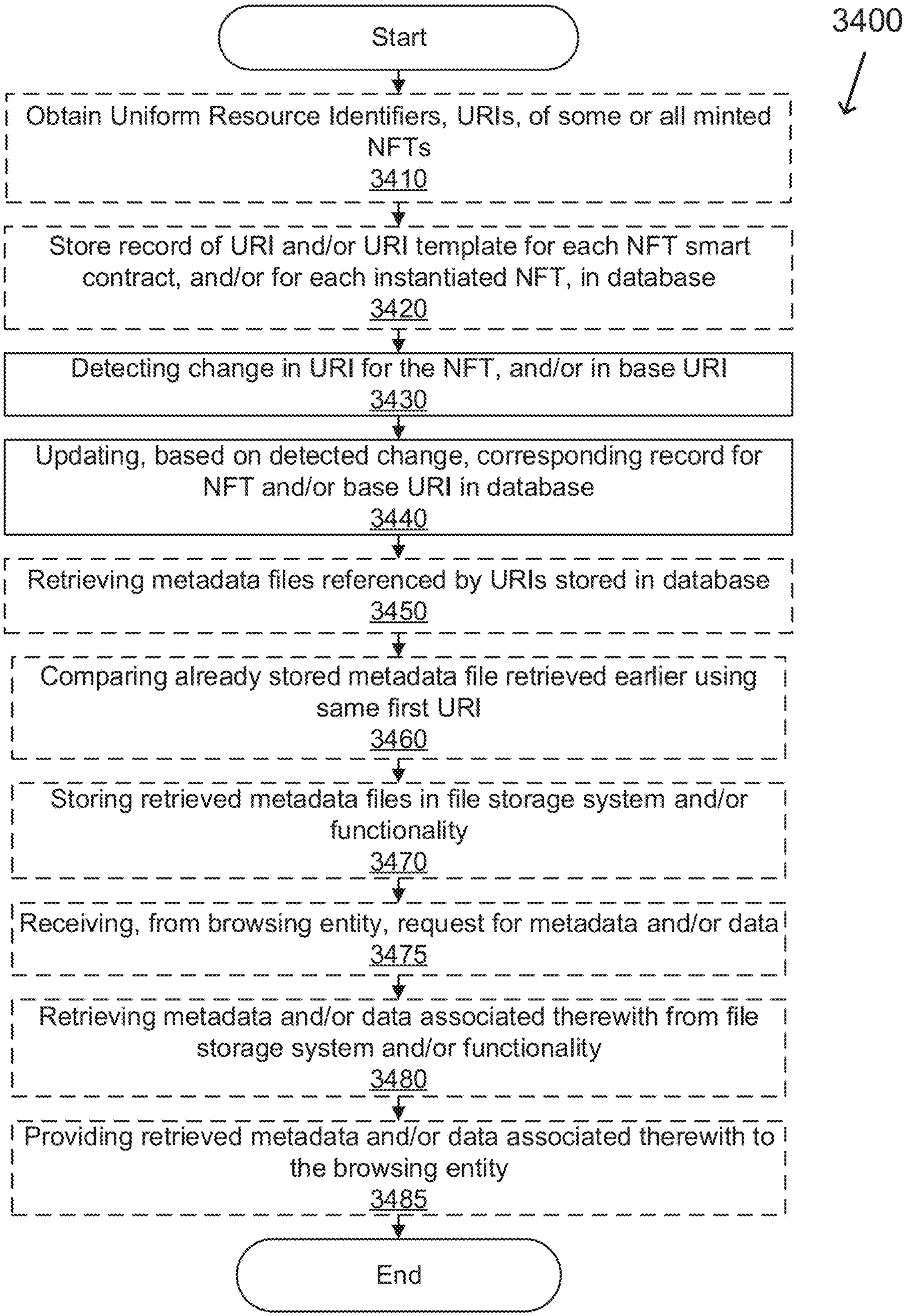
FIG. 34 illustrates a method performed by an NFT registry configured in accordance with various embodiments of the invention.

FIG. 34 illustrates a method performed by an NFT registry configured in accordance with various embodiments of the invention. Method 3400 may be used for ensuring that a historical record of metadata and associated data pointed to by an NFT may be maintained and may be retrieved. The NFT registry may include but is not limited to a database. FIG. 34 illustrates the method including step 3430 of detecting a change in a URI for the NFT, and/or in a base URI; and step 3440 of updating a corresponding record for the NFT and/or base URI in the database based on the detected change. By doing so, the NFT registry will keep track of any change in a URI for the NFT, and/or in a base URI, thereby enabling the NFT may be retrieved by the NFT registry when a change in a URI for the NFT, and/or in a base URI has occurred.

FIG. 34 also illustrates the method 3400 including an optional step 3410 of obtaining URIs of some or all minted NFTs; and step 3420 of storing a record of the URI and/or URI template for each NFT smart contract, and/or for each instantiated NFT, in the database.

Further, FIG. 34 illustrates the method 3400 including an optional step 3450 of retrieving metadata files referenced by URIs stored in the database, step 3460 of comparing an already stored metadata file retrieved earlier using the same first URI, and step 3470 of storing the retrieved metadata files in a file storage system and/or functionality.

FIG. 34 illustrates the method 3400 optionally including step 3475 of receiving, from a browsing entity, a request for metadata and/or data associated therewith, the request including an identifier for the instantiating NFT smart contract, and an identifier for the NFT token. The method 3400 may then include another optional step 3480 of retrieving the metadata and/or data associated therewith from the file storage system and/or functionality and an optional step 3485 of providing the retrieved metadata and/or data associated therewith to the browsing entity.

Figure 35:
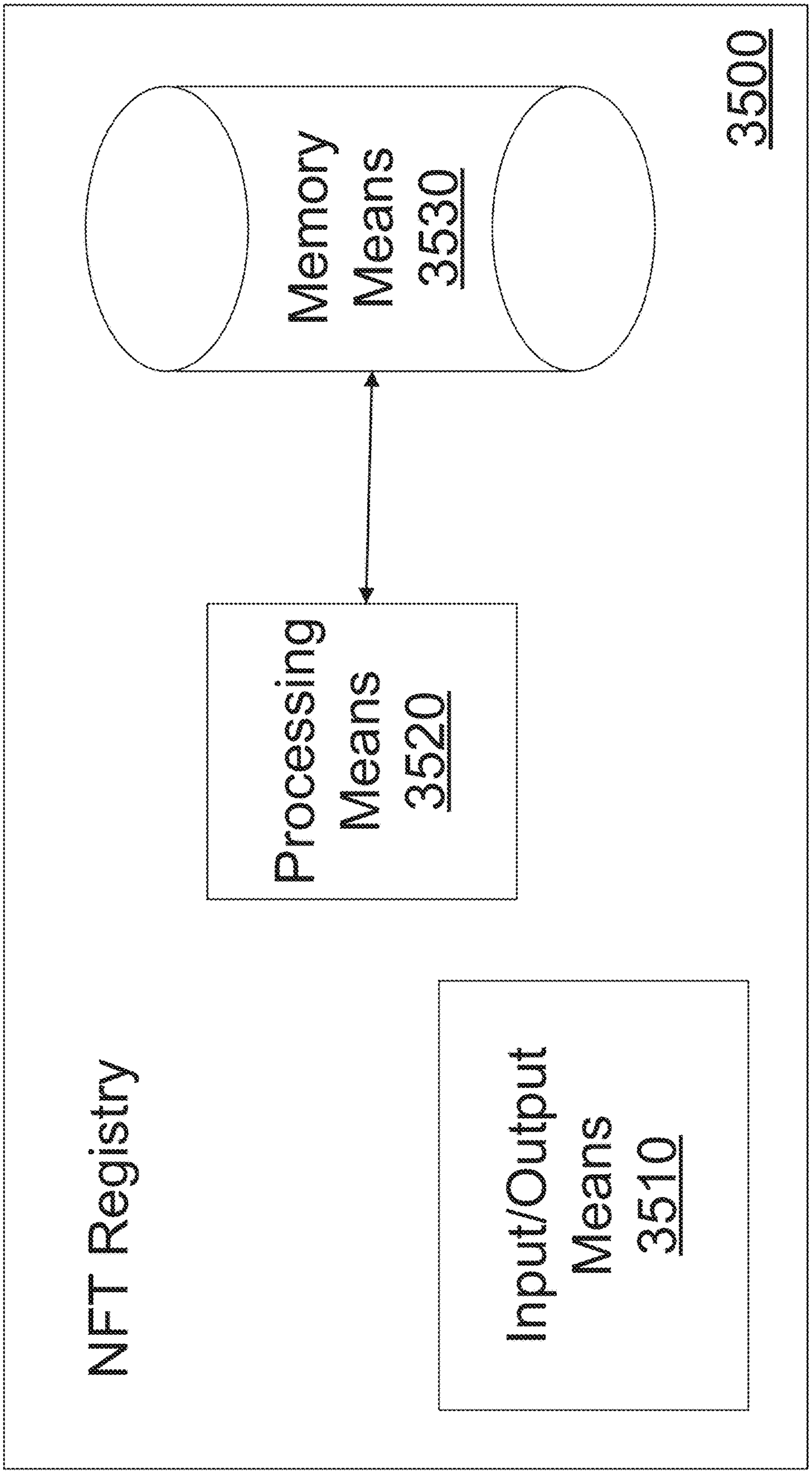
FIG. 35 illustrates a block diagram of NFT registries configured in accordance with multiple embodiments of the invention.

FIG. 35 is a block diagram of NFT registries configured in accordance with multiple embodiments of the invention. NFT registries may be used for ensuring that a historical record of metadata and associated data pointed to by an NFT is maintained and may be retrieved. The NFTs may be instantiated by smart contracts. NFT registries may include input/output means 3510 including but not limited to receivers configured to receive information and/or transmitters configured to provide information to other NFT registries, devices and/or entities. FIG. 35 illustrates that NFT registries 3500 may include processing means 3520 and memory means 3530. The memory means 3530 may include instructions, which, when executed by the processing means 3520 causes the module unit 3500 to perform methods configured in accordance with certain embodiments of the invention.

While specific processes for facilitating token registries are described above, any of a variety of processes can be utilized as appropriate to the requirements of specific applications. In multiple embodiments, steps may be executed or performed in any order or sequence not limited to the order and sequence shown and described. In certain embodiments, some of the above steps may be executed or performed substantially simultaneously where appropriate or in parallel to reduce latency and processing times. In a number of embodiments, one or more of the above steps may be omitted.

NFT registries operating in accordance with numerous embodiments of the invention are not limited to use within NFT platforms. Accordingly, it should be appreciated that the registry formats described herein can also be implemented outside the context of an NFT platform network architecture unrelated to NFTs. Moreover, any of the systems and methods described herein with reference to FIGS. 28-35 can be utilized within any of the NFT platforms described above.

NFT Platform Content Based Resource Location

Although a specific cryptographic hash function always generates the same digest when presented with the same data as an input, a different digest is generated when the same data plus a nonce (number used only once) is provided. This is the basis for proof-of-work, in which miners repeatedly alter the data of a candidate block, for example by incrementing a nonce, until an output hash is generated that falls below a given target. In a different but related manner, vanity addresses starting with a desired sequence of numbers and letters can be generated by repeatedly generating private keys and examining the resulting public key converted to an address until the desired sequence is determined to be present in the address.

When a given file in a content-based resource location filesystem does not generate the desired filename when hashed with a content-based resource location cryptographic hash function, an unimportant portion of the file, for example an included metadata section of the file that includes a nonce field, can be altered repeatedly until the resulting filename contains a desired sequence of characters, possibly at a desired position, within the filename.

What follows is a non-limiting exemplary embodiment of the present disclosure using the InterPlanetary File System (IPFS) as a content-based resource location filesystem:

A PDF file may reveal the following InterPlanetary File System version 1 (v1) content identifier (CID) using a CID hash function:

bafkreid3dpkjg6uwag3fiz6m36vzt7cypebp3c2qf6psgtjhr7qoayw2n4

However, adding a keyword "nonce: 0" to the pdf results in a different IPFS v1 CID of:

bafkreicttvhsr64cpdfvvbdfns6exawmc3mixx6pyxvrlkf52jn4pf5sx4

By repeatedly incrementing the nonce value and inspecting the resulting IPFS v1 CID, we eventually end up with a nonce value that generates the following filename:

bafkreibdjaiens7eakjaqkt4Ivh5dgjlkv5da2v3zah7o62wjhv2pdf

The expected number of tries to find a nonce that generates a desired filename with 3 matching characters as a suffix is 3276. For finding 4 matching characters the expected number of tries is 10485976 tries, neither of which is prohibitive, especially when the search is run in the background.

Note that the last three characters of the CID are now "pdf", indicating that this may be a pdf file. Similarly, exif data in a jpg and/or png may be used to store a nonce to ensure that those files end in the desired suffix, a nonce may be added to the end of a text file for the same purpose, and so on.

It is of course possible that a non-pdf file may end up with a pdf suffix, however for comparison, a normal pdf file on a location-based resource locator filesystem can be saved with the wrong extension of txt. Similarly, when the present disclosure is frequently used to store content with derived names that have substrings matching the content, the odds of a particular file with a filename containing the given substring but not including the matching content become very low.

For example, the odds of a random file ending in pdf is 1 in 32768. when four characters, for example xpdf, are chosen, the odds are reduced to over 1 in a million.

Figure 36:
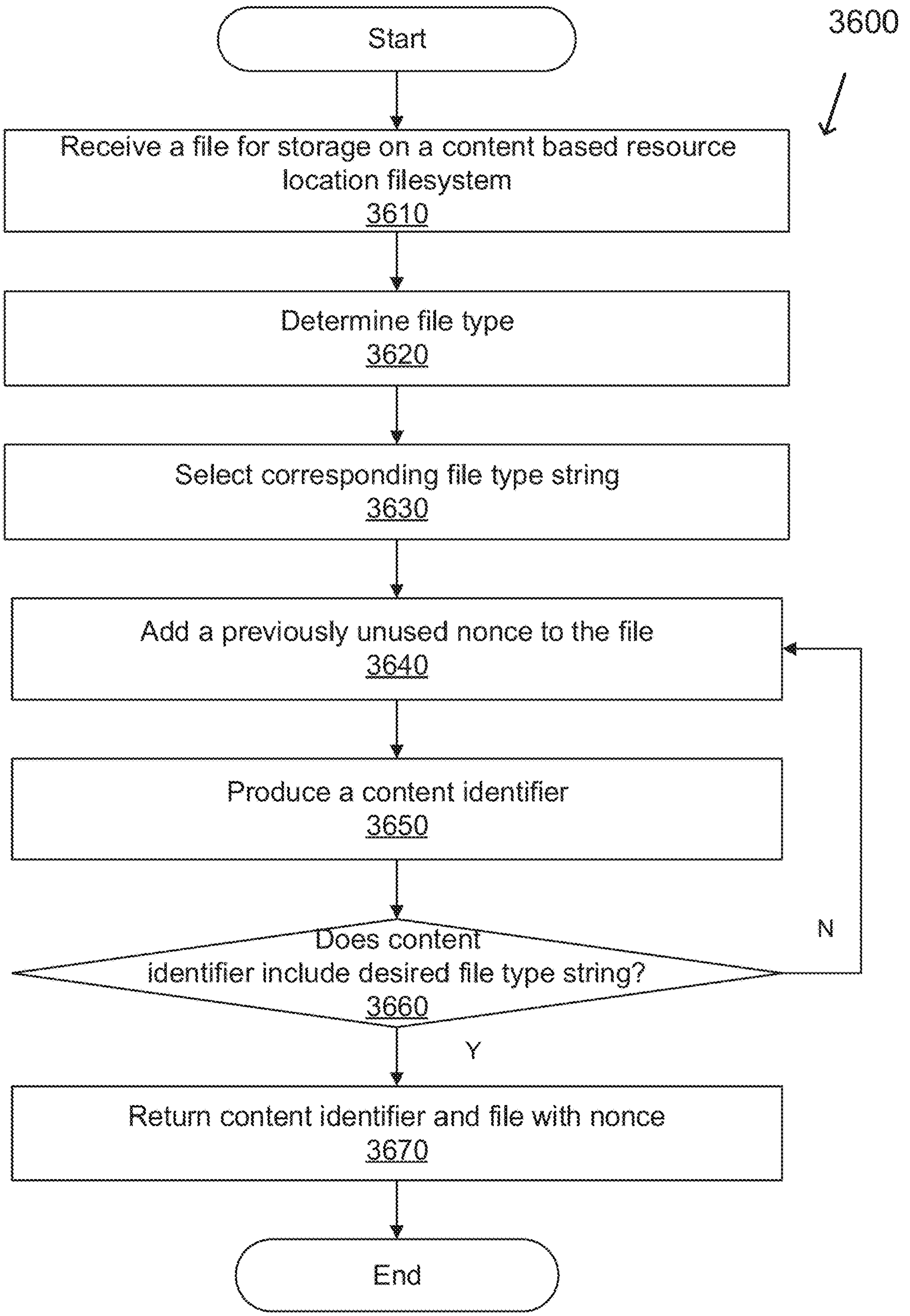
FIG. 36 illustrates a process to derive particular string types, configured in accordance with many embodiments of the invention.

FIG. 36 illustrates a process to derive particular string types, configured in accordance with many embodiments of the invention.

Actions commence in step 3610 in which a file is received and/or retrieved for storage on a content-based resource location filesystem.

Actions then proceed to step 3620, in which a file type of the file is determined. This may be performed by extracting the last three characters of the file name following a '.', which are typically used to record the file type, for example .txt for text, .pdf for a portable document file format, and so on. Another method may include examining a file header for the file, in which a particular sequence of bytes may be used to indicate the file type. For example, for a portable network graphics file (PNG), the first eight bytes of the file are always 137 80 78 71 13 10 26 10 (in decimal format), and/or 89 50 4e 47 0d 0a 1a 0a (in hexadecimal format). In step 3640, a lookup table for file type suffixes and header bytes may be used to select an (appropriate) file type string.

Actions may then proceed to step 3650, in which a previously unused nonce (number used only once) may be added to the file. In step 3660, a content identifier may be produced using a content identifier hashing algorithm and/or other algorithms for producing content identifiers.

The previously unused nonce refers to the fact that the nonce has not previously been used in step 3650 for the present process. A number value including a nonce may have been previously used in a prior calculation of a suitable content identifier for a different file, and/or for a previous version of the present file, which are outside the scope of the present process.

Actions may then proceed to step 3660, in which the content identifier is examined to determine when it includes the file type string desired, with actions proceeding to 3670 when the content identifier includes the file type string, and actions proceeding back to step 3650 when it does not.

In step 3670, the content identifier and the file including the successful nonce may then be returned.

The desired character strings may be used to indicate one or more of: the type of a file, the author of the file, the revision and/or version of the file, the data of creation of the file, the location where the file was created, the device the file was created on, part and/or all of a blockchain address and/or smart contract associated with the file, an NFT token identifier for the file.

Subsequently, files can be grouped by type and displayed in different windows and/or folder-like structures within an IPFS and/or content base resource location filesystem viewer, and/or displayed with different icons corresponding to the file type, and files can be searched for by type.

In some embodiments, a first party wishes to create a custom CID name, for example a vanity name, which is a file name that includes a portion that is specified by the first party. For example, the first party may wish to create a file name that starts with the string "crazy" and which ends with any arbitrary string of characters.

Thus, the string that is specified includes a problem request, and a nonce that, when concatenated with the contents of the file to be stored, results in a file name that starts in accordance with the request, the nonce therefore including a solution to the problem request.

This is a proof of work, and the mining of, for example, IPFS vanity names can be performed in the context of crypto mining.

Figure 37:
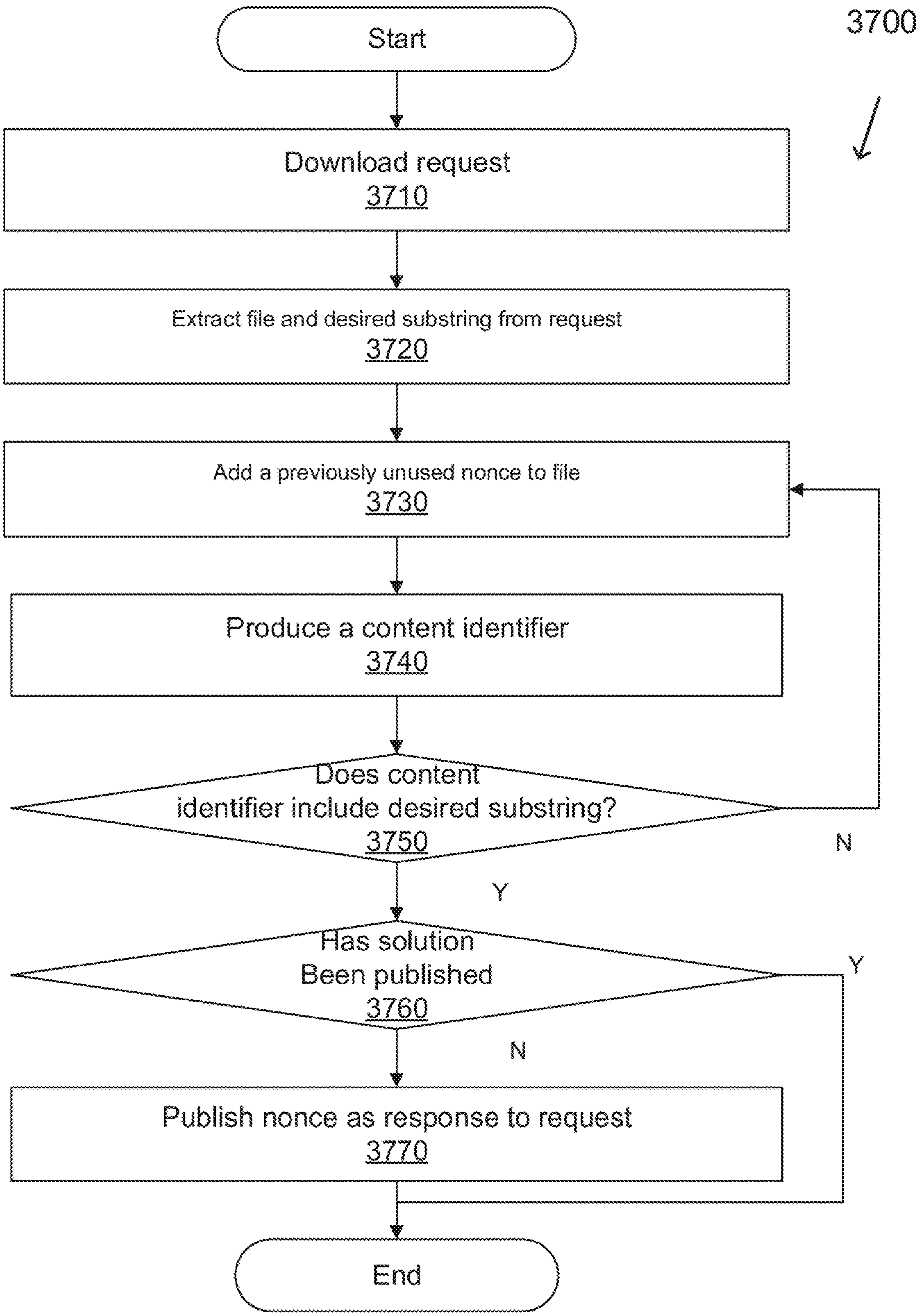
FIG. 37 illustrates a process for responding to requests made in accordance with certain embodiments of the invention.

FIG. 37 illustrates a process for responding to requests made in accordance with certain embodiments of the invention.

One or more second parties, which we refer to as miners, may compete to find a nonce that satisfies the problem request. Here, the longer the problem request is, the harder the problem is. The first party may therefore outsource the effort of finding a nonce that causes the desired IPFS vanity name, as illustrated in FIG. 37.

A first party may upload a request including a file and a desired substring for a content identifier.

Process 3700 may download the request, as shown in step 3710, and in step 3720, process may extract the file and the desired substring from the request.

The process 3700 may then add, in step 3730, a previously unused nonce to the file and, in step 3740, compute a content identifier.

In step 3750, the process 3700 may examine the content identifier to determine when it includes the desired substring in a desired position. when it does, actions may proceed to step 3760, whereas when it does not, actions may return to step 3730.

In step 3760, the process 3700 may determine whether a solution has already been published by another party. when not, actions may proceed to step 3770, in which the process 3700 may publish the nonce as a response to the downloaded request.

The first party may hide the contents of the file for which a vanity name is requested by generating a hash state value, which is the value stored as a state by the cryptographic hash function used for the derivation of the IPFS name after the fixed portion of the file (i.e., the non-nonce portion) has been processed by the cryptographic hash function. This state can be uploaded into a hash function computing entity that is part of each miner. After that state has been uploaded, a nonce is fed to the hash function with the uploaded state. A failed nonce attempt is one that does not result in the requested vanity name, and results in the miner aborting the computation and again uploading the provided state, then trying a new nonce.

When a nonce is found that causes a match with the requested string, then this nonce is output as a solution to the problem request. This is a form of mining, and can result in the generation of a coin, e.g., by making the nonce value include of two elements, such as pk and R, wherein pk represents a public key associated with the miner, and where R is a random value, and wherein the concatenation pk|R is the nonce value.

Figure 38:
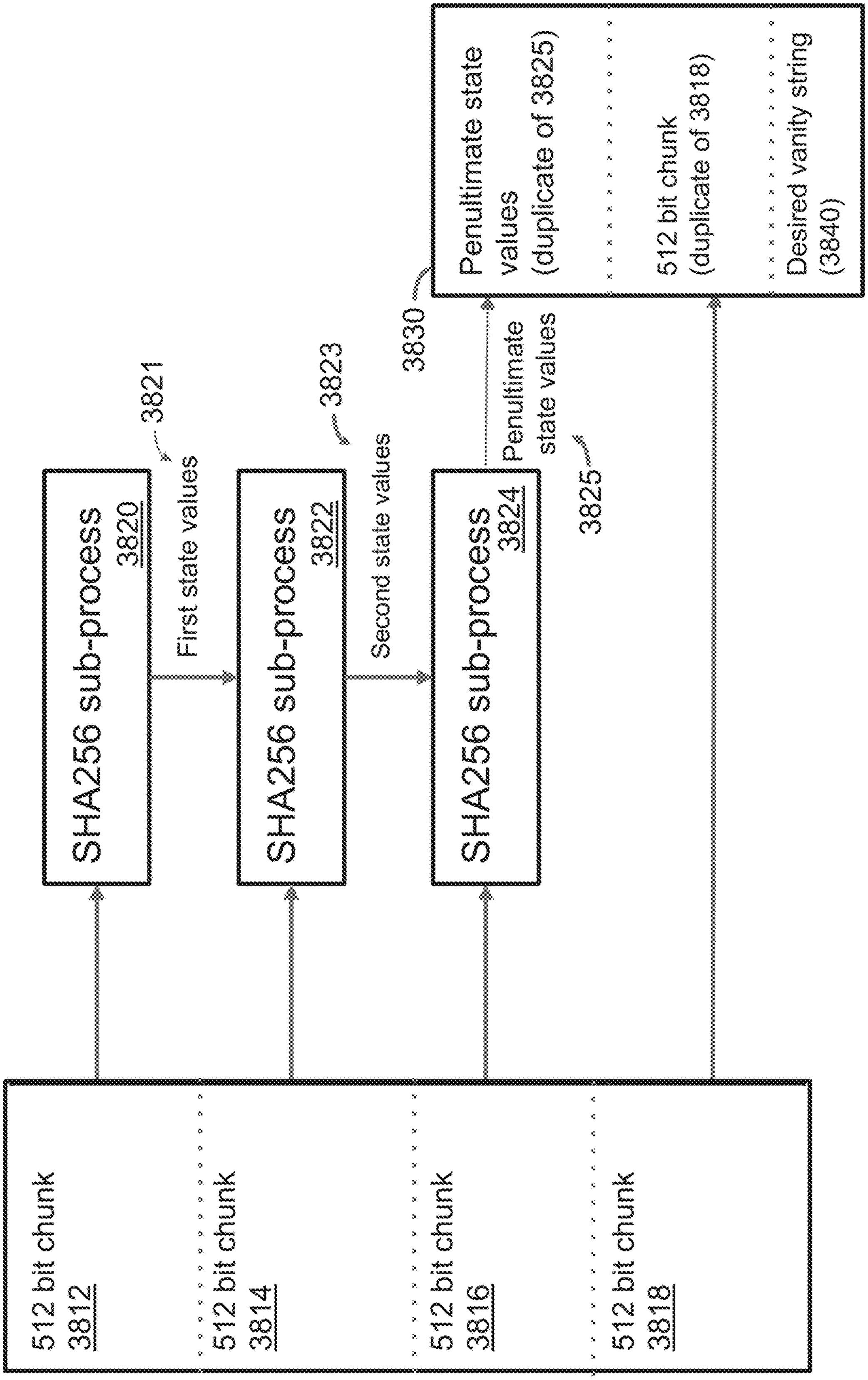
FIG. 38 illustrates a mining system performed in accordance with several embodiments of the invention.

A system illustrating mining performed in accordance with several embodiments of the invention is illustrated in FIG. 38.

For a variant on a SHA256 hash, a file may be stored to a message block 3810, and the message block may be padded by appending a number of 0x00 bytes to the message block to include a plurality of 512 bit chunks, as illustrated by 3812, 3814 and 3816 in FIG. 38.

A final 512 bit chunk 3818 may then be appended to provide space for the nonce.

The first party may then perform the SHA256 hash algorithm up to and including processing of the penultimate chunk. A first chunk 3812 may be processed by a first SHA256 hash algorithm subprocess 3820, with resulting first state values 3821 passed to a second SHA256 hash algorithm subprocess 3822 together with a second chunk 3814. The second chunk 3814 and first state values 3821 may then be processed by the second SHA256 hash algorithm subprocess 3822 to produce second state values 3823 and passed to a third SHA256 hash algorithm subprocess 3824 together with a third chunk 3816. This may result in an output of penultimate state values.

The first party may then package the penultimate state values 3825, the desired vanity string 3840 and the final 512 bit chunk 3818 into a request 3830. The request 3830 thus contains all data required by a miner to produce the vanity name, without revealing the contents of the original file.

Those skilled in the art will appreciate that the number of chunks, and hence the number of cycles of SHA256 hash algorithm subprocesses are dependent on the initial file size modulo 512.

Figure 39:
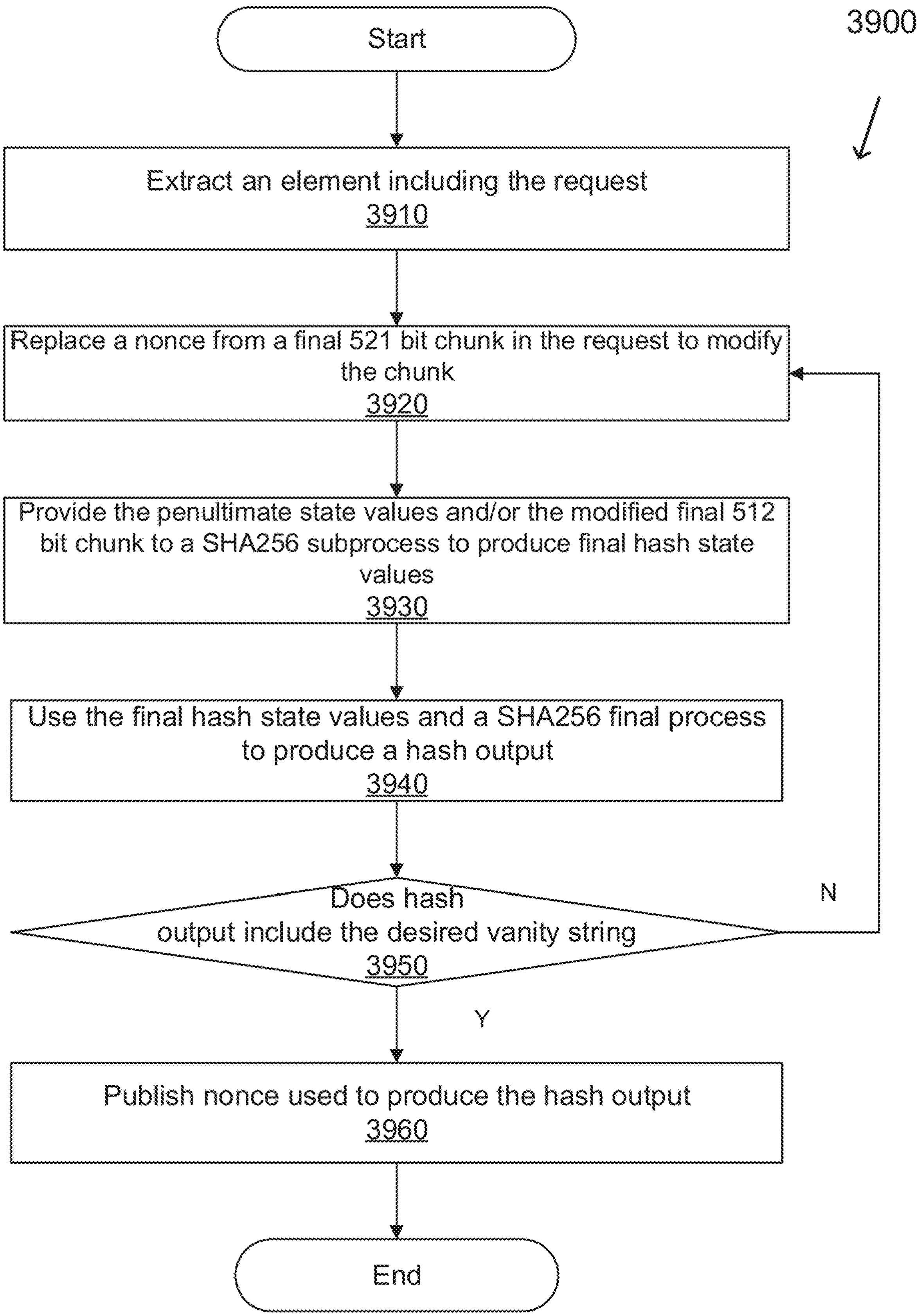
FIG. 39 provides an example of a method for processing a request in accordance with multiple embodiments of the invention.

FIG. 39 provides an example of a method for processing a request in accordance with multiple embodiments of the invention. The method is presented for illustrative purposes and not meant to be limiting.

In accordance with some embodiments, process 3900 may be an extension of the system described in FIG. 38. Process 3900 extracts (3910) an element including the request from a first party. The extracted element may be element 3830. The extracted element may include but is not limited to the penultimate state values from a prior hashing, a final 512 bit chunk, and/or a desired vanity string 3840. In accordance with some embodiments, the miner may extract the penultimate state values 3825, and the final 512 bit chunk 3818.

Process 3900 replaces (3920) a nonce from the final 512 bit chunk 3818 in the request to produce a modified final 512 bit chunk.

Process 3900 provides (3930) the penultimate state values and/or the modified final 512 bit chunk to a SHA256 subprocess. The SHA256 subprocess may constitute a final cycle of the SHA256 hashing process before producing the final hash state values.

The process 3900 uses (3940) the final hash state values and the SHA256 final process to produce a hash output.

Process 3900 examines (3950) the hash output to determine whether it includes the desired vanity string (e.g., 3840). When the hash output does not include the desired vanity string, process 3900 may return to step 3920, in which the nonce is altered. When the hash output does include the desired vanity string actions may proceed to step 3960, and the process 3900 publishes (3960) the nonce used to produce the hash output.

Thus the miner need only repeatedly process the last chunk with the state variables and current state of the initial hash values with altered nonces until the vanity name is obtained, and the miner never receives the content of the file, preserving the privacy of the first party's file.

In certain embodiments, the first party provides a state value S1 corresponding to the provision of an input FILE to the hash function, and the miner provides pk to the hash function with the provided state, and then stores the resulting state S2. By trying different inputs of R with the hash function instantiated with S2, the miner determines a value R for which the hash function output matches the request. When this happens, the value pk|R is provided as an output.

In multiple embodiments, this may cause the mining of a coin assigned to the public key pk, where this coin can be spent by generating a digital signature using a private key corresponding to pk.

In a number of embodiments, the first party may provide the state value S1 and a reward in the form of an amount of cryptocurrency and/or other digital assets such as amounts of tokens for smart contracts, which may subsequently only release the reward through a function call to the smart contract that provides the solution to the problem.

Figure 40:
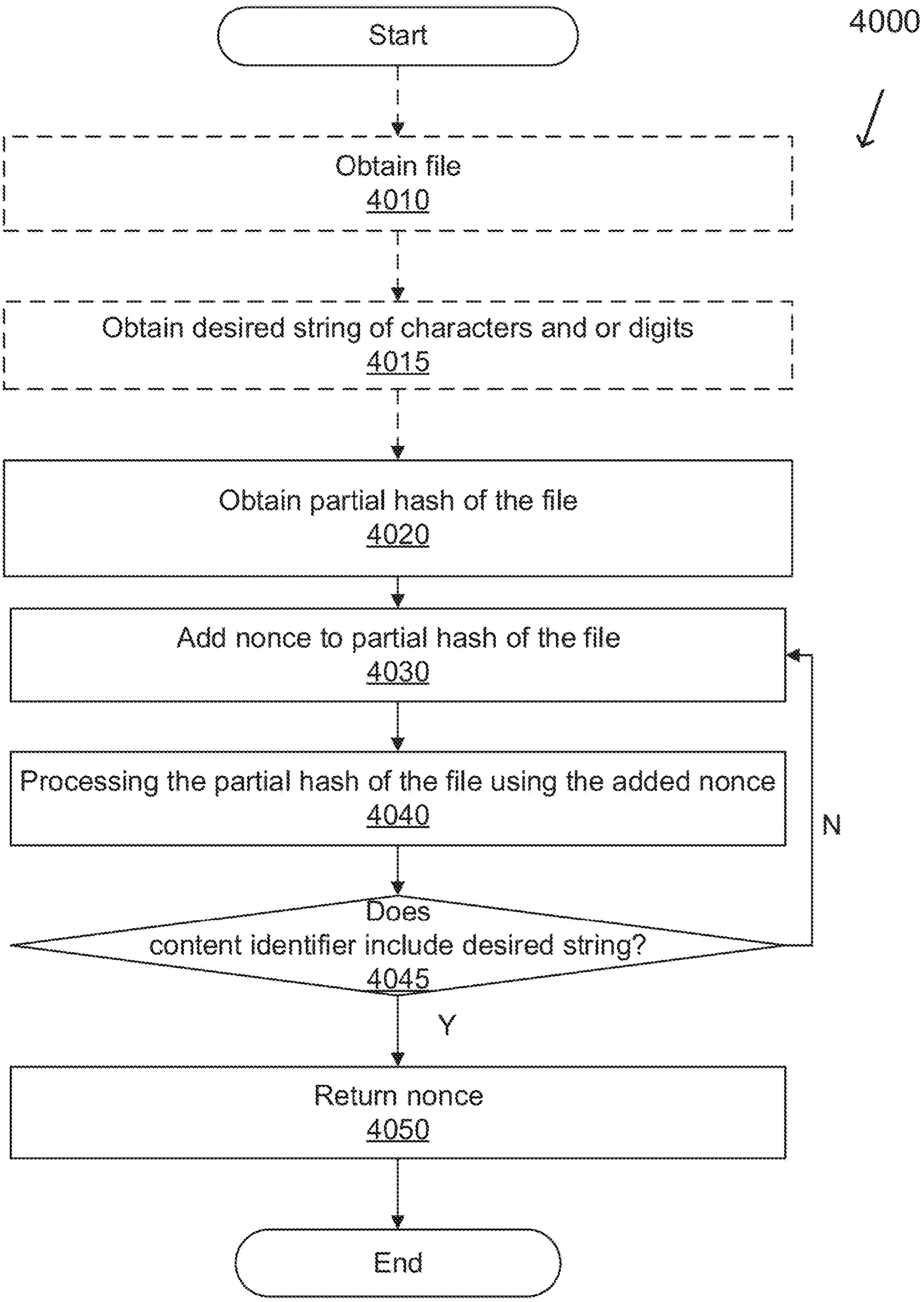
FIG. 40 illustrates a method performed in accordance with various embodiments of the invention, for finding nonces.

FIG. 40 illustrates a method performed in accordance with various embodiments of the invention, for finding nonces. Nonces may produce desired strings of characters and/or digits of a content identifier of files to be stored in content-based resource location filesystems. FIG. 40 illustrates the process 4000 includes step 4020 of obtaining a partial hash of the file, as described, for example, in FIG. 38. FIG. 40 also illustrates the method including step 4030 of adding a nonce to the partial hash of the file. The nonce is not previously used in connection with the file to be stored in the content-based resource location filesystem. FIG. 40 further illustrates the method including step 4040 of processing the partial hash of the file using the added nonce to produce a content identifier. The processing has been described and exemplified in detail above. In step 4050, the method 4000 includes returning the nonce when/when the produced content identifier includes a desired string of characters and/or digits.

FIG. 40 also illustrates the method optionally including a couple of steps. In an optional step 4010 the method includes obtaining the file. It may be that the entity that is performing the method is not creator and/or minter of the file and then the entity performing the method may obtain the file, e.g., by receiving it from a creator and/or minter of the file, retrieving the file from another file system etc. Note that these are just illustrative examples of how the file may be obtained. The method may additionally and/or alternatively includes step 4015 of obtaining the desired string of characters and/or digits. There may be several ways to obtain the desired string of characters and/or digits, e.g., by analyzing the file type, by receiving it from another entity, by retrieving it from another entity, database and/or file storage system.

Figure 41:
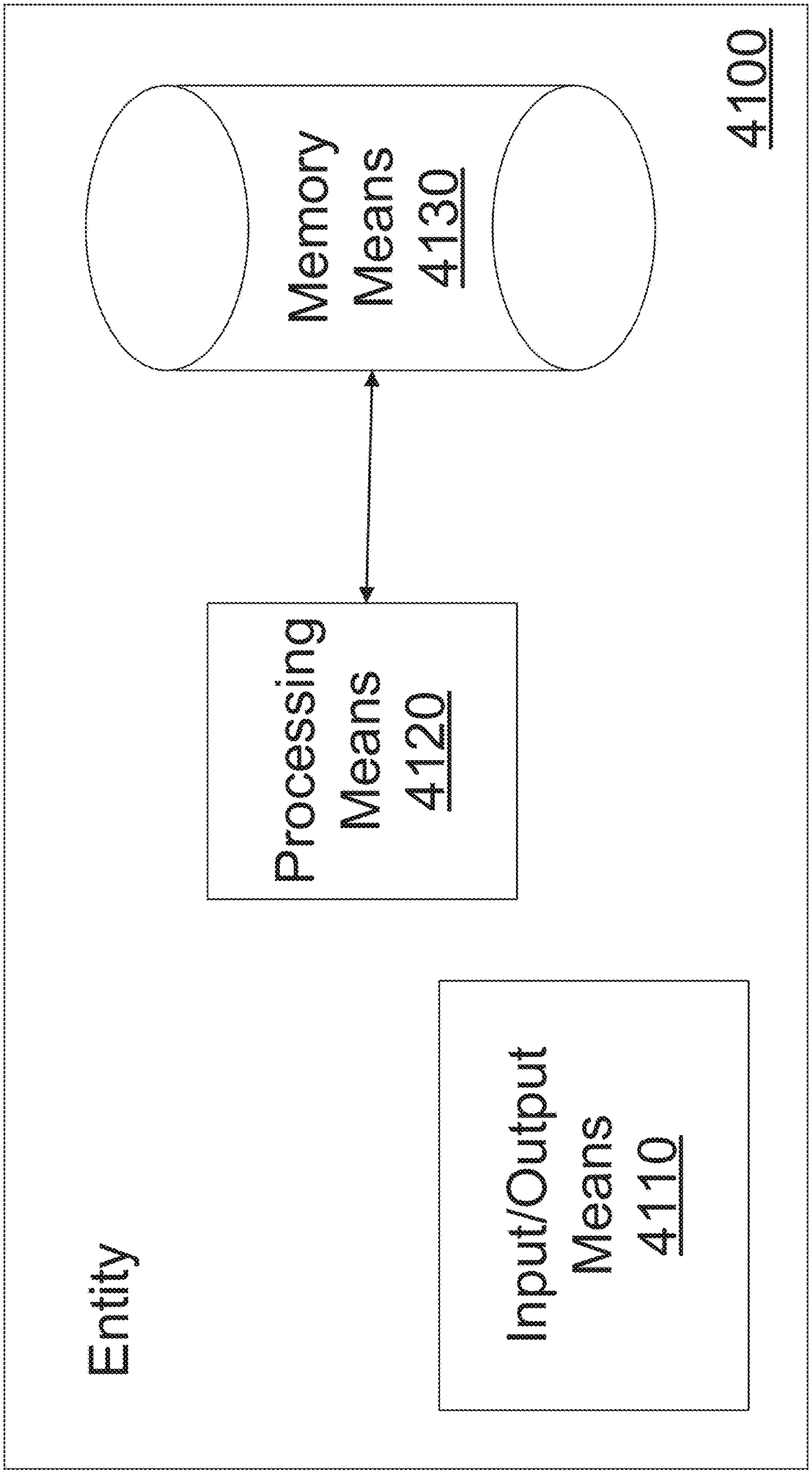
FIG. 41 models an entity configured in accordance with certain embodiments of the invention, for finding nonces.

FIG. 41 models an entity configured in accordance with certain embodiments of the invention, for finding nonces. The nonces found may produce desired strings of characters and/or digits of content identifiers of files to be stored. Entities 4100 may operate in content-based resource location filesystems. Entities may include input/output means 4110 including but not limited to receivers configured to receive information and/or transmitters configured to provide information to other Entities, devices and/or entities. FIG. 41 illustrates that Entities 4100 may include processing means 4120 and memory means 4130. The memory means 4130 may include instructions, which, when executed by the processing means 4120 causes the module unit 4100 to perform methods configured in accordance with certain embodiments of the invention. As suggested above, Entities may own other Entities configured in accordance with many embodiments of the invention.

While specific processes for content-based resource location are described above, any of a variety of processes can be utilized as appropriate to the requirements of specific applications. In some embodiments, steps may be executed or performed in any order or sequence not limited to the order and sequence shown and described. In various embodiments, some of the above steps may be executed or performed substantially simultaneously where appropriate or in parallel to reduce latency and processing times. In numerous embodiments, one or more of the above steps may be omitted.

Systems and methods for content-based resource location, operating in accordance with a number of embodiments of the invention are not limited to use within NFT platforms. Accordingly, it should be appreciated that the filesystems described herein can also be implemented outside the context of an NFT platform network architecture unrelated to NFTs. Moreover, any of the systems and methods described herein with reference to FIGS. 36-41 can be utilized within any of the NFT platforms described above.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method for assessing risk associated with nodes, the method comprising:

recovering security information on one or more characteristics of a peer-to-peer network node, wherein the security information corresponds to at least one selected from the group consisting of: node hardware, node software, node event history, and node functionalities;

deriving one or more characterizations of the peer-to-peer network node based on the security information, wherein each of the one or more characterizations:

reflect a state of a characteristic of the one or more characteristics; and are expressed as statements on a blockchain;

recovering, from an assertion unit, an assertion, wherein the assertion is a digitally-signed value comprising a time-stamped verification of the one or more characterizations of the peer-to-peer network node;

deriving a reputation score for the assertion unit, wherein the reputation score discloses estimates of verification accuracy for the assertion unit; and determining a risk score for the node based on the reputation score, the one or more characterizations, and the assertion, wherein the risk score corresponds to a degree of risk associated with performing an action, directed to a shared peer-to-peer network comprising the peer-to-peer network node and a plurality of communicatively-coupled additional nodes, using the peer-to-peer network node.

2. The method of claim 1, wherein the risk score is selected from the group consisting of a financial risk score, a security risk score, an unoriginality risk score, and an insurance risk score.

3. The method of claim 1, wherein a characterization of the one or more characterizations is associated with at least one selected from the group consisting of a digital rights module (DRM), a trusted execution environment (TEE), a security mechanism, and an operating system (OS).

4. The method of claim 1, wherein a characterization of the one or more characterizations is stored as an augmentation of the node.

5. The method of claim 4, wherein the characterization comprises at least one selected from the group consisting of:

an element included in the node;

a meta-token attached to the node;

a record stored externally to the node that is referenced by the node;

a record accessible by a public key associated with the node; and an independent token that depicts a representation of the characterization.

6. The method of claim 1, wherein determining the risk score comprises recovering, from the assertion unit, one or more additional characterizations of the node.

7. The method of claim 1, wherein:

a first characterization of the one or more characterizations corresponds to a particular characteristic and is time-stamped for a first timepoint;

a second characterization corresponds to the particular characteristic and is time-stamped for a second timepoint; and the second timepoint occurs after the first timepoint.

8. The method of claim 1, wherein the risk score is part of an array of risk scores wherein each risk score in the array of risk scores corresponds to a specific characterization of the one or more characterizations.

9. The method of claim 8, wherein each risk score in the array of risk scores corresponds to a different potential vulnerability of the node.

10. The method of claim 1, wherein:

the risk score is determined using a scoring entity;

the scoring entity is associated with a reputation score; and the reputation score discloses a reputation for accuracy held by the scoring entity.

11. A non-transitory computer-readable medium for assessing risk associated with nodes, wherein program instructions are executable by one or more processors to perform a process that comprises:

recovering security information on one or more characteristics of a peer-to-peer network node, wherein the security information corresponds to at least one selected from the group consisting of: node hardware, node software, node event history, and node functionalities;

deriving one or more characterizations of the peer-to-peer network node based on the security information, wherein each of the one or more characterizations:

reflect a state of a characteristic of the one or more characteristics; and are expressed as statements on a blockchain;

recovering, from an assertion unit, an assertion, wherein the assertion is a digitally-signed value comprising a time-stamped verification of the one or more characterizations of the peer-to-peer network node;

deriving a reputation score for the assertion unit, wherein the reputation score discloses estimates of verification accuracy for the assertion unit; and determining a risk score for the node based on the reputation score, the one or more characterizations, and the assertion, wherein the risk score corresponds to a degree of risk associated with performing an action, directed to a shared peer-to-peer network comprising the peer-to-peer network node and a plurality of communicatively-coupled additional nodes, using the peer-to-peer network node.

12. The non-transitory computer-readable medium of claim 11, wherein the risk score is selected from the group consisting of a financial risk score, a security risk score, an unoriginality risk score, and an insurance risk score.

13. The non-transitory computer-readable medium of claim 11, wherein a characterization of the one or more characterizations is associated with at least one selected from the group consisting of a digital rights module (DRM), a trusted execution environment (TEE), a security mechanism, and an operating system (OS).

14. The non-transitory computer-readable medium of claim 11, wherein a characterization of the one or more characterizations is stored as an augmentation of the node.

15. The non-transitory computer-readable medium of claim 14, wherein the characterization comprises at least one selected from the group consisting of:

an element included in the node;

a meta-token attached to the node;

a record stored externally to the node that is referenced by the node;

a record accessible by a public key associated with the node; and an independent token that depicts a representation of the characterization.

16. The non-transitory computer-readable medium of claim 11, wherein determining the risk score comprises recovering, from the assertion unit, one or more additional characterizations of the node.

17. The non-transitory computer-readable medium of claim 11, wherein:

a first characterization of the one or more characterizations corresponds to a particular characteristic and is time-stamped for a first timepoint;

a second characterization corresponds to the particular characteristic and is time-stamped for a second timepoint; and the second timepoint occurs after the first timepoint.

18. The non-transitory computer-readable medium of claim 11, wherein the risk score is part of an array of risk scores wherein each risk score in the array of risk scores corresponds to a specific characterization of the one or more characterizations.

19. The non-transitory computer-readable medium of claim 18, wherein each risk score in the array of risk scores corresponds to a different potential vulnerability of the node.

20. The non-transitory computer-readable medium of claim 11, wherein:

the risk score is determined using a scoring entity;

the scoring entity is associated with a reputation score; and the reputation score discloses a reputation for accuracy held by the scoring entity.

* * * * *